(12) United States Patent
Watanabe et al.

(10) Patent No.: US 10,706,177 B2
(45) Date of Patent: *Jul. 7, 2020

(54) APPARATUS AND METHOD FOR CHIP IDENTIFICATION AND PREVENTING MALICIOUS MANIPULATION OF PHYSICAL ADDRESSES BY INCORPORATING A PHYSICAL NETWORK WITH A LOGICAL NETWORK

(71) Applicant: Zentel Japan Corporation, Tokyo (JP)

(72) Inventors: Hiroshi Watanabe, Kanagawa-ken (JP); Takeshi Hamamoto, Hyogo (JP)

(73) Assignee: Hiroshi Watanabe, Yokohama-shi (JP)

( * ) Notice: Subject to any disclaimer, the term of this patent is extended or adjusted under 35 U.S.C. 154(b) by 300 days.

This patent is subject to a terminal disclaimer.

(21) Appl. No.: 15/638,564

(22) Filed: Jun. 30, 2017

(65) Prior Publication Data
US 2018/0232539 A1    Aug. 16, 2018

Related U.S. Application Data

(63) Continuation-in-part of application No. 15/430,650, filed on Feb. 13, 2017, now Pat. No. 10,581,841.

(51) Int. Cl.
*G06F 21/70* (2013.01)
*G06F 21/73* (2013.01)
(Continued)

(52) U.S. Cl.
CPC .............. *G06F 21/70* (2013.01); *G06F 7/588* (2013.01); *G06F 21/73* (2013.01); *G11C 7/24* (2013.01);
(Continued)

(58) Field of Classification Search
CPC ....... G06F 21/70; G11C 13/0059; G11C 8/20; G11C 7/24
See application file for complete search history.

(56) References Cited

U.S. PATENT DOCUMENTS 6,161,213 A * 12/2000 Lofstrom .............. H01L 23/544
                                                     257/E23.179
6,229,731 B1 * 5/2001 Kasai ..................... G11C 16/22
                                                     365/185.04
(Continued)

FOREIGN PATENT DOCUMENTS

JP      2005-123883 A    5/2005
JP      2009519473 A     5/2009
(Continued)

OTHER PUBLICATIONS

Fatemeh Tehranipoor, Nima Karimian, Kan Xiao and John Chandy, DRAM based Intrinsic Physical Unclonable Functions for System Level Security, 2015, 6 pages, Association for Computing Machinery (ACM), Philadelphia, PA, USA.

(Continued)

*Primary Examiner* — Mushfique Siddique
(74) *Attorney, Agent, or Firm* — Alan D. Kamrath; Karin L. Williams; Mayer & Williams PC

(57) ABSTRACT

A semiconductor device including a semiconductor chip having a cell array is provided. The cell array includes identification cells distributed in sub-blocks of the cell array. The identification cell has a cell address and the sub-block has a block address. The cell address is related to the block address. A portion of the block addresses include the cell address at which an identification cell exhibiting a predetermined characteristic is located. The predetermined characteristic is based on a physical randomness which is intrinsic of the semiconductor chip. The semiconductor chip further has a physical random number code including the portion of the block address. The physical random number code is secured by the semiconductor chip. This disclosure provides the technology to prevent malicious manipulation of physical addresses by artfully incorporating physical (Continued)

network with logical network, and to make the administration of hardware network more secure.

35 Claims, 44 Drawing Sheets

(51) Int. Cl.
    *G06F 7/58*     (2006.01)
    *G11C 8/20*     (2006.01)
    *G11C 7/24*     (2006.01)
    *G11C 13/00*     (2006.01)
    *G11C 11/4078*     (2006.01)

(52) U.S. Cl.
    CPC ............ *G11C 8/20* (2013.01); *G11C 11/4078* (2013.01); *G11C 13/0059* (2013.01)

(56) References Cited

U.S. PATENT DOCUMENTS

| | | | |
|---|---|---|---|
| 8,533,492 | B2 | 9/2013 | Kasuya |
| 9,292,710 | B2 | 3/2016 | Kim et al. |
| 10,176,127 | B2 * | 1/2019 | Watanabe ............... G06F 13/20 |
| 10,341,122 | B2 * | 7/2019 | Watanabe |
| 10,387,342 | B2 * | 8/2019 | Watanabe |
| 2008/0237506 | A1 | 10/2008 | Ophey et al. |
| 2011/0062240 | A1 * | 3/2011 | Anderson ............... G06F 21/73 235/492 |
| 2013/0047209 | A1 | 2/2013 | Satoh et al. |
| 2013/0101114 | A1 * | 4/2013 | Kim ........................ G06F 21/73 380/44 |
| 2013/0222013 | A1 * | 8/2013 | Feng .................... H03K 5/1534 327/3 |
| 2015/0033064 | A1 * | 1/2015 | Davis ................. G11C 29/4401 714/6.11 |
| 2015/0092939 | A1 * | 4/2015 | Gotze ....................... H04L 9/34 380/2 |
| 2015/0207627 | A1 | 7/2015 | Yamamoto et al. |
| 2016/0154979 | A1 | 6/2016 | Kim et al. |
| 2016/0254235 | A1 | 9/2016 | Leobandung |
| 2016/0301413 | A1 * | 10/2016 | Xiao .................... H03K 19/094 |
| 2016/0330191 | A1 * | 11/2016 | Watanabe ........... H01L 27/1052 |
| 2018/0019925 | A1 * | 1/2018 | Watanabe ............... G06F 7/588 |
| 2018/0123808 | A1 * | 5/2018 | Hung ................... H04L 9/0866 |
| 2018/0234413 | A1 * | 8/2018 | Watanabe ............. H04L 9/3239 |
| 2018/0270058 | A1 * | 9/2018 | Watanabe ............. H04L 9/3297 |

FOREIGN PATENT DOCUMENTS

| | | |
|---|---|---|
| JP | 2013131868 A | 7/2013 |
| JP | 2015139010 A | 7/2015 |
| JP | 2015201884 A | 11/2015 |
| WO | WO2011118548 A1 | 9/2011 |

OTHER PUBLICATIONS

Taher Elgamal, A Public Key Cryptosystem and a Signature Scheme Based on Discrete Logarithms,IEEE Transactions on Information Theory, Jul. 1985, 4 pages, vol. IT-31, No. 4, IEEE, USA.

R.L.Rivest, A. Shamir, and L. Adleman, A Method for Obtaining Digital Signatures and Public-Key Cryptosystems, Communications of the ACM, Feb. 1978, pp. 120-126, vol. 21, Issue 2, ACM, Inc., USA.

Yoshiki Higashikado et al., A study on certificate management in consortium chain, 2017 Symposium on Cryptography and Information Security, The Institute of Electronics, Information and Communication Engineers, Japan, Jan. 24 2017, 7 pages, Japan.

* cited by examiner

APPARATUS AND METHOD FOR CHIP IDENTIFICATION AND PREVENTING MALICIOUS MANIPULATION OF PHYSICAL ADDRESSES BY INCORPORATING A PHYSICAL NETWORK WITH A LOGICAL NETWORK

CROSS REFERENCE TO RELATED APPLICATIONS

This application is a continuation-in-part of U.S. patent application Ser. No. 15/430,650 filed on Feb. 13, 2017.

BACKGROUND OF THE INVENTION

1. Field of the Invention

The present invention generally relates to a semiconductor device, and more particularly, to a semiconductor device adapted for identifying devices connected on a network.

2. Description of the Related Art

The number of apparatuses connected to internet has increased in recent years along with development. The configuration of networks has become complicated and diversified. However, it may be roughly classified into two types: (1) the client-server (CS) type where servers have a specialized function playing roles of central nodes (stem nodes) and (2) the peer-to-peer (P2P) type where all nodes are connected on even ground without any stem nodes. However, there must be a smallest network unit in any types of network, as shown in FIG. 1.

Similarly, the network may generally have nominal points (nodes) and communication lines (links). In FIG. 1, a first node 2001 and a second node 2002 are linked by a signal transmission pathway 1000 serving as communication line. For example, the first node 2001 and the second node 2002 exchange a protocol data unit via the signal transmission pathway 1000. The first node 2001 and the second node 2002 treat the protocol data unit according to protocols sharing consistency to some extent, respectively.

The configuration of the network is generally complicated, and both ends of the signal transmission pathway must be terminated with nodes, respectively. FIG. 1 is the simplest example of such unit of network. Information to be input to the first node 2001 from a certain source may be converted (coded) to a protocol data unit according to a predetermined format and then transmitted to the second node 2002 via the signal transmission pathway 1000. The second node 2002 may inversely convert (decode) the received protocol data unit according to a predetermined format which has a certain consistency with the format that the first node 2001 subjected to, and then reproduce the original data before input to the first node 2001. Accordingly, a piece of data converted (coded) to the protocol data unit may be exchanged on the network. This is a basic configuration of data transfer.

As mentioned above in FIG. 1, two nodes terminating a signal transmission pathway 1000 (first node 2001 and second node 2002) must be subject to protocols having a certain consistency with each other. If the protocols are subject to an insufficient consistency, this signal transmission pathway may regard the first node 2001 and the second node 2002 as non-connected.

In the above, the unidirectional transmission of data from the first node to the second node is illustrated. However, the utilization method of protocol is free from the change of the direction of the transmission. In this case, first, information input to the second node 2002 is converted (coded) to a protocol data unit according to a predetermined format. Then, it is transmitted to the first node 2001 via the signal transmission pathway 1000. The first node 2001 inversely converts (decodes) the received protocol data unit to reproduce the original data before input to the second node 2002.

Moreover, in the case that the first node 2001 is a relay from any third node to the second node 2002, the first node 2001 may transfer protocol data unit to be received from the third node to the second node 2002 via the signal transmission pathway 1000 without decoding. Alternatively, it may be possible to be transferred to the second node 2002 via the signal transmission pathway 1000 after editing a portion of received protocol data unit (header for example). As a result of this edit, the protocol data unit is appended with a certain kind of code which indicates that it goes through the first node 2001 with or without intention. The second node 2002 inversely converts (decodes) protocol data unit to be received according to a predetermined format to reproduce data before input to any third node.

More concretely, a header corresponding to the protocol may be appropriately edited to include an address related to which the protocol data unit has gone through.

In the case that the first, second and third nodes are nodes having physical substances (physical nodes), the addresses are physical addresses. In the case that the first, second and the third nodes are nodes having no physical substances (logical nodes), the addresses are logical addresses.

It is self-evident that physical address and logical address are different as follows. For example, suppose that an electronic apparatus configuring the first node 2001 serving as a relay is replaced. In this case, the operating system of the electronic apparatus configuring the relay node before the replacement (old electronic apparatus) must be re-installed into the electronic apparatus configuring the relay node after the replacement (new electronic apparatus). Thus, the physical address which is the authentication being intrinsic of the electronic apparatus having physical substance must be replaced. On the other hand, the logical address being intrinsic to the operating system is taken over as the IP address of the third node even after the replacement. This is the reason why the logical network (TCP/IP network) has been extensively adopted.

FIG. 2 shows the relation between physical network and logical network in the communication hierarchy. There are physical nodes linked with each other under the physical layer at the bottom of the hierarchy, which includes LAN cable, optical or ADSL lines, or WiFi and so forth. The physical addresses are used to authenticate and link those physical nodes with each other in the physical layer. There is the datalink layer just above the physical layer. There is the logical layer-1 thereabove. The logical layer-1, for example, is subject to the TCP/IP protocol. There are logical nodes in the logical layer-1, above which the logical network is configured. The logical addresses (IP address and so forth) are used to authenticate and link those logical nodes with each other in the logical layer-1.

The datalink layer is between the logical network and the physical network and then the networks are associated by the datalink layer. However, this doesn't mean the linkage of logical nodes and physical nodes, because the physical addresses and the logical addresses are completely independent from each other.

The target to which malicious hackers attack is mainly the logical layer. Because the whole logical layer is administrated in the logical space, the attack is also completed only in the logical space. Accordingly, as long as the target is connected to the network, the hackers can always attack it even from the other side of the earth. As for the physical layer, it may also be possible to take over the physical addresses to hijack the apparatuses.

Once a vulnerability of the logical layer-1 is found and the security is broken, the logical layer-2 is developed to fix the vulnerability and then used in the network. Although not explained explicitly with illustrations since it is self-evident, the logical layer-2 is laminated on the logical layer-1 and the logical addresses are used in the logical layer-2. The logical nodes mutually recognize themselves in the logical layer-2 and then select and connect some of them to each other.

Once a vulnerability of the logical layer-2 is found and then the security is broken, the logical layer-3 is developed to fix the vulnerability and then used in the network. Although not explained explicitly with illustrations since it is self-evident, the logical layer-3 is laminated on the logical layer-2 and the logical addresses are used in the logical layer-3. The logical nodes mutually recognize themselves in the logical layer-3 and then select and connect some of them to each other.

By doing so, it is found that the attack by hackers and the lamination of logical nodes are limitless. Furthermore, no matter how many logical layers are laminated, the logical addresses and the physical addresses are not related. This means that hackers can still attack the physical layer even though security technologies are configured above the logical layers. In particular, the attack to the physical layer is significant in the Internet-of-Things (IoT) where nodes having physical substances configure a broad network.

In the network before IoT is developed, the protection of the logical nodes has been sufficient. However, since the era of IoT has begun, it may become a significant problem as to how to safely administrate connected apparatuses (such as industrial facilities, industrial robots, electric appliances, infrastructure facilities, auto-driving vehicles and so forth).

On the other hand, a significant revolution has come in security technologies for the logical layer recently, called blockchain. The blockchain is a public ledger which has been invented to disable the manipulation of transaction data of a crypto currency called bitcoin. Details will be described below, in short, it is a system in which unspecified large number of logical nodes connected in a certain logical layer mutually put themselves under surveillance, and then irregular manipulation and transaction are prohibited. As a result of blockchain, it may become possible to make a safe international or domestic remittance other than via any bank. In other words, the remittance fee is limitlessly close to zero because no bank is involved. Furthermore, governments or tax authorities become able to monitor all transaction on the network. In addition, no one can manipulate the transaction record.

The blockchain enables a substantial cost reduction and time saving of financial services which are completely executed in the logical layer. Thus, it can be regarded as a great reform since the birth of the internet which has realized the substantial cost reduction and time saving of information communication. FIG. 3 is a conceptual illustration that the blockchain is implemented into the communication hierarchy. There is the logical layer-3 on the blockchain layer and all of the logical nodes are further distributed thereon. The communication among those logical nodes is unable to be manipulated and is put under surveillance with the public ledger system configured by the blockchain. The tax authorities and intelligence agencies of various countries may also join the blockchain to surveil.

(Blockchain)

The blockchain is illustrated briefly below.

The blockchain is a public ledger system on the peer-to-peer (P2P) type network. In the configuration of P2P network, no server is assumed to play the central role. All of the nodes (nominal points) connected to the network are non-central and equal to each other. It is necessary to ensure the security of the network by mutually putting all of the nodes under surveillance. Therefore, the blockchain is able to provide applications which having been unable in the client-server type network which assumes servers taking central roles (core) in the network.

The remittance system of crypto currency called bitcoin is the most important application. In the bitcoin system, first, a record of past transactions and a name of an account initiating new transaction are combined and encrypted to form an electronic signature. The new transaction is executed by transferring the electronic signature to the destination node. By doing so, there is no bank involved in any stage of the transaction process. The updated and transferred transaction record is put under surveillance by the large number of other non-central nodes and then authorized in a similar manner to the majority decision.

The transfer of the transaction record is identical to the transfer of the remittance. The authorized transaction record is treated similarly as the currency. Thus, the transaction is continued without any specialized central role existence such as a bank.

The encryption to be used for electronic signature flowing on the network is a general one called public key encryption, which is famous with a metaphor of Alice and Bob. As shown in FIG. 4, Alice sends her public key to Bob in advance. The public key is permitted to be stolen by someone on the network. Bob encrypts a letter with Alice's public key and then sends it to Alice. A private key forming a unique pair with Alice's public key is necessary to decrypt the encrypted letter. Accordingly, as long as the encryption is not broken, the content of the letter cannot be read even though the letter has been stolen by someone, because only Alice has the private key. Alice can decrypt the encryption of Bob's letter with her own private key and then read it.

By doing so, the public key may be exposed to the network. Accordingly, parties to which Alice sends her public key are not only Bob. However, only Alice having the private key can decrypt the letter encrypted by the public key and read it, as long as the encryption is not broken. The public key and the private key must be generated as a pair to make it impossible to reproduce the private key from the public key.

Another important role of the public key is the address for sending a letter to Alice, that is, Alice's address on the network. Once Bob exposes the encrypted letter to the network, any receivers connected to the network can take it. However, they cannot read it as long as they cannot decrypt it. Having no way to read the letter is identical to not receiving the letter. Accordingly, only Alice can read the letter, which is identical to that the letter it is sent only to Alice. Thus, it is clarified that another role of the public key is the address on the network. Therefore, the public key used in the bitcoin system is a so-called bitcoin address.

FIG. 5 shows an example of a basic concept of a wallet to store crypto currency and so forth. This is a common composition for the crypto currencies like bitcoin and so forth. The address on the network is allocated to the wallet in advance. Something having monetary value (currencies or coins equivalent thereto) is stored in the content of the wallet. Furthermore, an electronic signature having the address and the content to the wallet may be attached with certain encryption technology.

For example, such a wallet may be used by installing a special application in hardware such as personal computers, tablets, smartphones, smart cards and so forth. In this case, the content of the wallet is saved as digital data in the storage of hardware in which the special application is installed. It is necessary for supervisors or owners of the hardware to manage such digital data in the electronic transaction such as the P2P, for example, with responsibility. In this regard, it is different from the client-server type network. In the client-server type network, for instance, financial organizations must have the obligation to deal with the digital data with responsibility. In the electronic transaction of the P2P network, the existence of such kind of financial organization having the function of the central role is unnecessary.

FIG. 6 shows a chain of transactions (N−2, N−1), (N−1, N), (N, N+1) . . . . The transaction (N−2, N−1) is the transaction from the wallet (N−2) to the wallet (N−1). The transaction (N−1, N) is the transaction from the wallet (N−1) to the wallet (N). The transaction (N, N+1) is the transaction from the wallet (N) to the wallet (N+1). However, N is an arbitrary natural number.

Assume that the content of the wallet, for example, is 1000 JPY remitted from somewhere. The sender of the 1000 JPY is assumed to be the wallet (N−2) and the electronic signature (N−2) is appended to the 1000 JPY. However, 1000 JPY is an example and not limiting. The content may be any digital information which is equivalent to or convertible to other monetary values. The wallet (N−1) has the contents of 1000 JPY, the private key (N−1) which is used for generating next electronic signature, and the public key (N−1) which forms a unique pair with the private key (N−1). As mentioned above, the public key (N−1) is the address of the wallet (N−1) on the network. As an example, it may be the bitcoin address.

Next, a hash value (N−1) is generated from the public key (N−1), the content of the wallet (N−1), and the electronic signature (N−2) by using hash function (SHA-256 as an example). On the other hand, the electronic signature (N−1) is generated by encrypting the public key (N) which is the address of the wallet (N) and the hash value (N−1) which is the content of the wallet (N) with the secret key (N−1). The hash value (N−1) is transferred to the wallet (N) together with the electronic signature (N−1), and the wallet (N) stores it as the content thereof.

Accordingly, the wallet (N) has the hash value (N−1), the electronic signature (N−1), and further a pair of intrinsic public key (N) and private key (N). Thus, the remittance of 1000 JPY from the wallet (N−1) to the wallet (N) is completed.

By doing so, the hash value (N−1) having the electronic signature (N−2) includes the information that this 1000 JPY comes from the wallet (N−1). However, since the hash is unable to be inversely transformed unlike encryption, it is impossible to read the information included into the hash value (N−1) by the inverse-transformation. Then, the electronic signature (N−1) is attached to the hash value (N−1). The electronic signature (N−1) is generated by collecting and encrypting the public key (N) and the hash value (N−1) with the private key (N−1). Accordingly, in order to confirm if the electronic signature really comes from the wallet (N−1), the electronic signature (N−1) may be decrypted with the public key (N−1) and then compared with the public key (N) and the hash value (N−1) which are stored in the wallet (N). As long as the encryption is not broken, it may be confirmed that the electronic signature (N−1) is certainly encrypted by the private key (N−1) if they are coincident. Otherwise, the electronic signature should be doubted. Otherwise, if they are coincident with the electronic signature (N−1) decrypted by another public key, public key (Q) for example, it may be found that a fraudulent transaction was made in the wallet (Q) whose address is the public key (Q).

However, another method is necessary to prove there is no fraudulent transaction in the transaction history. Because it is impossible to negate the possibility that a person regularly owning the private key (N−1) performs the fraudulent action only with the electronic signature. For example, it may be possible for the owner to abuse a private key. In the bitcoin system in the P2P type network, such a fraudulent action may be protected by "Proof-of-Work" (PoW). This is recognized to be generally progressing successfully. The Proof-of-Work" (PoW) is described below.

Generally in the client-server type network, an authentic third party is necessary to confirm the regularity of transactions. It may be, for example, a financial organization which is trustful and being a central node (server) in a reliable network. In other words, the owner of the wallet (N−1) is able to remit to the owner of the wallet (N) via a certain financial organization. However, there is no method to perfectly prove the reliability of those central nodes. Then, the confirmation requests are sent to the sender at every remittance. Some remittance may be executed across a plurality of financial organizations, which causes a large number of confirmation requests. In addition, each confirmation process has a certain cost. Thus, there is a certain minimum of the remittance fee. For example, suppose the minimum is 500 JPY. In this case, 500 JPY should be paid even for every remittance of less than 500 JPY. Thus, it is found that the client-server type network is not suitable for any business given that there are numerous small remittances.

Subsequently, in FIG. 6, the hash value (N) is generated from the public key (N), the content of the wallet (N) (such as the hash value (N−1)), and the electronic signature (N−1) by using hash function (SHA-256 as an example). In addition, the electronic signature (N) is generated by encrypting the public key (N+1) which is the address of the wallet (N+1) and this hash value (N) with the secret key (N). The wallet (N) sends the hash value (N) to the wallet (N+1) together with the electronic signature (N), and the wallet (N+1) stores it as the content of the wallet (N+1).

From the above, it is found that the transaction (N−1, N) from the wallet (N−1) to the wallet (N) is recorded by the hash value (N−1) in the wallet (N). Similarly, it is found that the transaction from the wallet (N) to the wallet (N+1) is recorded by the hash value (N) in the wallet (N+1). Thus, it is found that the content of any wallets includes the histories of all past transactions in a manner of chain reactions. In other words, the latest hash value represents the history of all past transactions.

On the other hand, the number of wallets remitting to another wallet is not limited to one, unlike the example shown in FIG. 6. Actually, in many cases, a plurality of wallets may remit to a wallet. Alternatively, a wallet may remit to a plurality of wallets. Thus, the transaction histories may be more complicated. Accordingly, it may cause extraordinary costs if any of those confirmation processes is executed in the client-server type network.

In order to record all past transactions in the P2P type network, any node may have to retroactively store all past transaction records all over the world. This may cause the storage of the hardware, in which the special application of wallet is installed, to be saturated. However, there is only one hash value including the latest transaction record. It is called root of Merkle. Accordingly, the history can be retroactively traced from the root of Merkle. It may configure a tree diagram where many branches come from the root of Merkle. This is called Merkle tree diagram, as shown in FIG. 7. For example, the hash value (ABCD), which is the root of Merkle, is connected to the histories corresponding to the hash value (AB) and hash value (CD). The hash value (AB) is further connected to the hash value (A) and hash value (B) which respectively correspond to the past records, i.e., the transaction (A) and transaction (B). The hash value (CD) is further connected to the hash value (C) and hash value (D) which respectively correspond to the past records, i.e., the transaction (C) and transaction (D).

However, it is impossible to trace the history of transactions by decoding hash values since they are unable to be inversely-transformed. For example, one of the methods to actually trace the history of the past transactions of the content of the wallet (N) (the hash value (N−1)) is by firstly selecting any other wallet (M), decoding the electronic signature (N) with the public key (M), and then comparing the decoded results with the public key (N) and the hash value (N−1). If they are not coincident, another wallet (M+1) is selected and then the similar procedure is performed by using the public key (M+1). If they are coincident, the transaction is turned out to be the remittance from the wallet (M). In this case, M is turned out to be identical to N−1. Subsequently, the public key (N−2) of the wallet (N−2) including the hash value (N−3) is traced to by repeating such procedure. Here, M and N are arbitrary natural numbers.

It is therefore logically possible to trace the history of past transactions, but it is generally unnecessary to do so one by one using the hash values. Instead, hundreds or thousands of transactions are collected together to form a block and then it may be preferred to approve that those transactions are real with a certain method. More specifically, the latest hash value (such as ABCD) may be adopted as a symbol while deleting the hash values other than the root of Merkle (such as ABCD). A group of transactions which are represented by a symbol is called a block. Thus, it may be possible to save the storages of hardware in which the special application of wallet is installed.

It is approved that a block of past transactions represented by a root of Merkle (the hash value (ABCD) in the above example) is real by sealing it with a timestamp. Thus, the authorized block is released on the network. Such release is an operation (work) similar to the date authentication that documents being carried to a notary public's office and sealed with date there. In bitcoin system, the release of a new block is called registering. A person registering a block is given a fixed reward for the compensation of authorization work. For the first 210,000 registrations, the reward is 50BTC per registration, where BTC is the unit of bitcoin. For the registrations from 210,001st to 420,000th, the reward is 25BTC. In other words, the reward is reduced by half for every 210,000 registrations and the reward becomes zero at the 6,929,999th registration. The reward is 25BTC per registration in June, 2016.

There is no notary public's office (an example of central node) in P2P type network. Then, unspecified large number of users of bitcoin who work in P2P type network may approve and seal a group of transactions for notarization. However, only a user may release (register) a new block by sealing it with timestamp at each registration. Accordingly, a plurality of users contends for the authorization work for the registration reward.

Taking FIG. 8 as an example, the authorization work is briefly shown. Firstly, some kind of hash value (block hash) related to an authorized past block may be obtained. Next, a group of unauthorized transactions existing on the network may be found and then the root of Merkle (hash value) of the group may be obtained. Those two hash values may be added with variable nonce values and then hashed to form a block hash. In this case, SHA-256 is used as the hash function in the bitcoin system. Of course, other hash function may be used to generate a block hash.

The nonce value is generally any value of 32 bits. The hash value generated with the nonce value (block hash here) added is a value of 256 bits. Two to the power of 256 is larger than 10 to the power of 77. Then, it turns out that block hash has huge freedom. First several bits are able to be made zero by adjusting the nonce value. For example, the probability that the first 16 bits are all zero in a newly generated block hash is one over two to the power of 16, i.e., 1/65,536. That is, it hardly occurs by chance. A suitable operation (work) is necessary to mine such nonce value.

However, the hash function is irreversible. Thus, it is generally impossible to find a nonce value to make the first several bits zero (16 bits in this example) by the inverse-transformation. That is, the hashing must be repeated while adjusting nonce value and continued until the first several bits of the hash value is made all zero. By doing so, it is turned out that a sufficient usage of computers is necessary to define a nonce value to generate a block. For the compensation, a fixed reward (bitcoin) is given. Since it is similar to mining gold, this operation is called mining. Users of bitcoin who mine for the reward are called miners.

In the P2P network, a node for mining differs from a node with special central function. Any node can perform the mining as long as it has a suitable resource of computers. Miners, more precisely, nodes that those miners used in the P2P network may perform a diallel search on the network while adjusting nonce value. Accordingly, they may find a group of unauthorized transactions, the hash value of the group is all zero in the first several bits. In other words, they may go around and mine throughout the network while adjusting nonce value. By doing so, it is generally unnecessary to adjust nonce value of a specialized group of unauthorized transactions.

Thus, if a block hash where the first several bits are all zero (16 bits in this example) is mined, the group of unauthorized transactions corresponding to this block hash is permitted to be linked as a newly approved block to the past block having been authorized. That is, it is the block linkage condition making the first several bits all zero in the hash value of the group. Thus, a miner who firstly mined the block hash to satisfy such condition is permitted to register. A plurality of blocks is linked by repeating this operation (mining) and then the block chain is formed.

As mentioned above, the reliability of a currency is identical to the reliability of transaction record in bitcoin. The blockchain ensures the reliability for the notary public. It becomes harder to manipulate the transaction record as the chain is lengthened. For example, once a portion of block data is edited, the linkage condition of neighboring blocks (first several bits are all zero in block hash) cannot be satisfied. Thus, the nonce values of those neighboring blocks must be revised to satisfy such condition. As mentioned above, since the hash function is irreversible, a sufficient calculation is necessary. However, once the nonce values of the neighboring blocks are adjusted, the nonce values of further neighboring blocks must also be adjusted. Lastly, all the nonce values of all blocks linked in blockchain must be adjusted to revise a portion of data. This certainly consumes further huge amount of computing ability. Thus, it becomes harder at exponential rate to manipulate the transaction record as the blockchain is lengthened.

The counterfeit of currency is the manipulation and irregular copy of the history of past transactions. Since the electronic signature is attached to the transaction record as the evidence that the confirmation of the transaction is successful, the counterfeit of currency is the counterfeit of electronic signature. As long as the encryption is not broken, only the owner of the sending wallet with the private key necessary for an electronic signature can generate the electronic signature. On the contrary, even though encryption is not broken, a regular user of the private key may still want to manipulate the past transaction record. As mentioned above, however, once the blockchain is established, it is difficult even for the regular user of the private key to manipulate all nonce values configuring the blockchain. That is, as the blockchain is sufficiently lengthened, it becomes hardly manipulated or edited by tracing the past transactions. This is the system of "Proof-of-Work" (PoW).

However, in the case that a new transaction is executed, there is a method that the regular user of the private key can perform an improper transaction. For example, while a regular transaction (N, N+1) is carried out from the wallet (N) to the wallet (N+1), the owner of the wallet (N) generates electronic signature (N') by maliciously using the private key (N) and then remits to the wallet (M) before such action is found. That is, it is identical to improperly issuing currency. This is the so-called double transaction problem.

As a result, the transaction (N, M) is improper. The owner of the wallet (M) may believe in the electronic signature (N') and then continue next transaction to remit to the wallet (M+1). The owner of the wallet (N+1) may also believe in the electronic signature (N) and then continue next transaction to remit to the wallet (N+2). The only improper transaction is the transaction (N, M), but after that, the transaction (M+1, M+2), the transaction (M+2, M+3) . . . may be continuously done. Thus, a new block collecting them may be formed.

However, the regular block not including the improper transaction (N, M) has been existing before the double transaction was made in the wallet (N). Accordingly, as long as the generation speed of blocks derived from the block including the improper transaction (N, M) does not surpass the generation speed of the regular block, the longer block should be regarded as the regular block. In the blockchain, the authentication is determined by the length of the chain.

However, when the computational ability of the malicious party dominates the computational ability distributed to the other miners all over the world, the chain including improper transaction may be longer than the regular chain. This is called "51% attack".

It is sometimes discussed that the 51% attack is unrealistic due to poor performance-cost. However, it may be an exceptional that the 51% attack is performed as a cyber-attack to weaken the financial base of a certain group. For example, suppose that the Fintech 2.0 on the base of blockchain has been extensively spread in a certain big country. A certain small country may invest the national defense expenditure into the mining in order to paralyze the financial system of the big country. This may cost less than the development of nuclear weapon. Moreover, some players may temporarily acquire the ability of 51% attack with the advanced in cloud mining.

This may force the big country to be attacked to join the blockchain. Then, there may be no problem when a plurality of countries joins the blockchain because no country can carry out the 51% attack. As a result, the blockchain may take such an additional advantage of international infrastructure of information communication, although it is P2P.

Such an idea of public ledger that the reliability is ensured by sharing the transaction histories on the network and leaving the authorization works to miners is expected to be extensively used as the infrastructure of information communication other than bitcoin, because it may actually disable the manipulation of past transactions with least cost. The database actually impossible to be manipulated may be, for example, demanded by healthcare to use the daily-increasing accumulative medical data, the stock exchange to use daily-increasing accumulative transaction data, and every possible information service to use daily-increasing accumulative big data. Thus, it gives rise to the world-wide trend of technological innovation called Fintech 2.0.

Another point to suppress the 51% attack is, first, to limit the number of attacking nodes. If addresses allocated to nodes are logical addresses like IP addresses, it is possible for attackers to acquire limitless number of attacking nodes. Accordingly, all nodes to be linked to P2P should be allocated with physical addresses to be linked to CPUs or other physical existences. This is called One-CPU-One-Vote (OCOV). For example, one-ballot-one-voter is an indispensable condition for a system like majority decision.

It is thus turned out to be necessary to associate the private key and the individual authentication having physical substance. However, private key is a product of software technology and then has no relation with physical substance. From the intention, the software is developed to work equally in any information appliances designed and manufactured with a same specification. Therefore, the software has no relationship with physical substances. However, the network is configured by an aggregate of numerous information apparatuses and wired or wireless signal transmission pathways to link those information apparatuses. It is self-evident that the signal transmission pathways are physical substances, so as the information apparatuses. There may be a hint to associate the private key and the physical substance.

More specifically, it is to link the public keys and the physical addresses with a certain method to preclude the manipulation.

Referring back to FIG. 3, the physical and logical addresses are still disconnected. This certainly tells that the merit of blockchain is powerless against the network of nodes having physical substances, that is, IoT, as well as the 51% attack. However, to solve this problem, the public ledger system is to be bringing into IoT while defending the 51% attack.

(Physical Address)

FIG. 9 briefly illustrates an example of the usages of media-access controller (MAC) address which has been most extensively used as a physical address.

The MAC addresses are allocated as intrinsic control numbers to Ethernet cards installed in information apparatuses. A typical Ethernet card 3000, for example, includes an arithmetic processor chip 3020 for MAC and a non-volatile memory chip 3010 to record the MAC address.

As shown in FIG. 10, the MAC address is standardized by the Institute of Electrical and Electronic Engineers (IEEE) to be an assembly of numeral sequence with the length being 48 bits (6 bytes), and the information quantity is about 280 trillion. The upper 24 bits (the left half in the example of FIG. 10) is called vendor code 3071 and allocated to every vendor. The lower 24 bits (the right half in the example of FIG. 10) is called serial number 3072 and allocated without duplication by every vendor. The last 2 bits in the vendor code 3071 are UL bit and IG bit. Thus, the MAC address is represented by dividing a numeral sequence of 48 bits including UL bit and IG bit by every 8 bits to be written in hexadecimal notation.

If the MAC address is a global address, the UL bit is 1. Otherwise, the UL bit is 0. That is, in the case of global address (UL bit=1), the MAC addresses must be allocated without duplication all over the world.

In the case of IG bit=0, the communication is unicast communication. Otherwise, the communication is multicast communication. The unicast communication is to send data (frame) to a uniquely selected destination on the network of information apparatuses. In contrast, the multicast communication is to send data (frame) to multiple-selected destinations on the network of information apparatuses.

Thus, 46 bits left by excluding 2 bits of UL bit and IG bit from 48 bits is the actual freedom of MAC address, which is estimated to be about 70 trillion.

It should be noted here that the MAC addresses should be allocated across information apparatuses not only ones that are currently being used but also discarded ones and lost ones all over the world without duplication. At present, the MAC address has not dried up yet. However, in the coming era of IoT, the number of physical nodes to be actively connected to the network is expected to be more than 10 trillion. However, since MAC address is editable, it is able to re-use MAC addresses not being used due to certain reason. It thus appears to be able to avoid the dry-up. However, it is a fact that the edit of MAC address enables the falsification and the capture of MAC address.

Accordingly, MAC address is a code written in a non-volatile memory chip 3010 and then allocated to an Ethernet card 3000 including the non-volatile memory chip 3010, in accordance with the format showing in FIG. 10. Thus, the MAC address is editable and cannot ensure One-CPU-One-Vote.

(Uneditable Physical Address)

Thus, it is obvious that "uneditable physical address" is necessary to replace the MAC address. The method of realizing may be performed by software, network, hardware, and so on. Anyway, there may be an identification device to be realized by software technology, network technology, hardware technology or a designed combination of those technologies; and then it may be sufficient to incorporate the identification device into a chip having a physical substance.

SUMMARY OF THE INVENTION

The present invention is provided in view of the circumstances mentioned above and aims to provide the technology to prevent malicious manipulation of physical addresses by artfully incorporating physical network with logical network, and to make the administration of hardware network more secure.

The present invention adopts the following solutions for above-mentioned problems.

The present invention provides a semiconductor device including a semiconductor chip having a cell array. The cell array may have a group of row lines and a group of column lines. The group of row lines and the group of column lines may intersect and may form cross-points. The cell array may include a plurality of identification cells distributed at the cross-points. Each row line in the group of row lines may be respectively assigned with a row number and each column line in the group of column lines is respectively assigned with a column number. The cell array may be divided into a plurality of sub-blocks. Each of the plurality of sub-blocks respectively may include a portion of the plurality of identification cells. Each of the plurality of identification cells may have a cell address defined by a set of the row number and the column number of the cross-point at which the identification cell is located. Each of the plurality of sub-blocks may have a block address defined by sets of the row numbers and the column numbers of the cross-points encompassed in the sub-block. The cell address may be related to the block address and an inner address of a sub-block. The inner address may be related to the block address. A portion of the block addresses may include at least one of the cell address at which an identification cell exhibiting a predetermined characteristic is located. The predetermined characteristic may be based on a physical randomness which is intrinsic of the semiconductor chip. The semiconductor chip may further have a physical random number code including the portion of the block address. The physical random number code may be secured by the semiconductor chip. Accordingly, it becomes able to prevent malicious manipulation of physical addresses by artfully incorporating physical network with logical network. Furthermore, it becomes able to make the administration of hardware network more secure.

Additionally, the present invention also provides various solutions follows. A correspondence relationship between the cell address and the block address may be recorded in a cell block address correspondence list. A fail bit may be assigned to a cell address at which an identification cell exhibiting a characteristic with a deviation more than a predetermined range is located. The sub-block may be a fail sub-block if the sub-block includes the cell address assigned with the fail bit, and the sub-block may be a regular sub-block if the sub-block does not include the cell address assigned with the fail bit. The cell array may include a plurality of fail sub-blocks and a plurality of regular sub-blocks. A portion of the plurality of sub-blocks may belong to a first block, and the rest of the plurality of the sub-blocks may belong to a second block. The sub-blocks in the first block and the sub-blocks in the second block may be scanned independently, and if any of the plurality of fail sub-blocks is found in the first block, the block address of the found fail sub-block may be replaced with the block address of any of the sub-blocks in the second block. A quantity of the sub-blocks in the first block may be greater than or equal to a quantity of the sub-blocks in the second block. The plurality of fail sub-blocks and the plurality of regular sub-blocks may be physically randomly distributed in the first block. An aggregation of block addresses of the plurality of fail sub-blocks may be coded as a physical random number code. The physical random number code may be secured by the semiconductor chip.

Moreover, the semiconductor chip may further include an area for a peripheral circuit. The area for the peripheral circuit may have a peripheral controller, the cell block address correspondence list, and an inner special memory. The first block and the second block may be arrayed along a column direction and share a column decoder. A first row decoder may be corresponding to the first block and a second row decoder may be corresponding to the second block. The peripheral controller may control at least one of the first row decoder and the second row decoder while referring to the cell block address correspondence list. The inner special memory may record an aggregation of block addresses of the plurality of fail sub-blocks. The semiconductor chip may receive a fetch code for a redundancy mode from an external input. The fetch code for the redundancy mode may include an access mode, the cell address, and an operation mode. The access mode may include a first access mode, a second access mode, and a third access mode. In a preferred implementation, the first access mode may access any of the plurality of identification cells in the first block and the second block according to an arbitrarily selected column number, or may access any of the plurality of identification cells in the first block according to an arbitrarily selected column number. The second access mode may access any of the plurality of identification cells in the second block according to an arbitrarily selected column number. The third access mode may read the block address of the sub-block to which the accessed identification cell in the first block with the first mode belongs, according to the cell block address correspondence list. If the block address corresponds to a fail sub-block, the block address may be replaced with the block address of any of the sub-blocks in the second block, and then the cell address of the access identification cell in the second block may be accessed. If the block address corresponds to a regular block, the cell address of the accessed identification cell may be accessed. In another preferred implementation, the first access mode may designate at least a first row decoder, and the second access mode designates a second row decoder. The first row decoder may be corresponding to the first block and the second row decoder may be corresponding to the second block.

Furthermore, in another preferred implementation, the first access mode may be assigned and arbitrary cell addresses being able to be selected may be written with a first value, the second access mode may be assigned and arbitrary cell addresses being able to be selected may be written with a second value, the third access mode may be assigned and data of the identification cell at the cell address being accessed may be read. The first access mode, the second access mode, and the third access mode may be repeatedly assigned while changing the cell address being arbitrarily selected. If the data is written with the second value, an aggregation of the block addresses respectively corresponding to the selected cell addresses of the accessed identification cell may be coded as a physical random number code. In another preferred implementation, the first access mode may be assigned and the cell address of the identification cell being accessed may be written with a first value, the second access mode may be assigned and the cell address of the identification cell being accessed may be written with a second value, the third access mode may be assigned and, referring to the cell block address correspondence list, data of the identification cell at at least one cell address at an arbitrarily block address may be read. The first access mode, the second access mode, and the third access mode may be repeatedly assigned while changing the block address being arbitrarily selected, and wherein if the data is written with the second value, an aggregation of the selected block addresses may be coded as a physical random number code. The inner address may be designated, and the inner address may designate a cell address in an arbitrarily selected sub-block. In another preferred implementation, the first access mode may be assigned and arbitrary cell addresses being able to be selected may be written with a first value, the second access mode may be assigned and arbitrary cell addresses being able to be selected may be written with a second value, the third access mode may be assigned and the data of the identification cell at the inner address in the block address of the arbitrarily selected sub-block may be read. The first access mode, the second access mode, and the third access mode may be repeatedly assigned while changing the block address being arbitrarily selected. If the data is written with the second value, an aggregation of the selected block addresses may be coded as a physical random number code.

Additionally, in another preferred implementation, the third access mode may be assigned and arbitrary cell addresses being able to be selected may be written with a first value, the second access mode may be assigned and arbitrary cell addresses being able to be selected may be written with a second value, the third access mode may be assigned and the data of the identification cell at the cell address being accessed may be read. The second access mode and the third access mode may be repeatedly assigned while changing the cell address being arbitrarily selected. If the data is written with the second value, an aggregation of the block addresses respectively corresponding to the selected cell addresses may be coded as a physical random number code. In another preferred implementation, the third access mode may be assigned and arbitrary cell addresses being able to be selected may be written with a first value, the second access mode may be assigned and arbitrary cell addresses being able to be selected may be written with a second value, the third access mode may be assigned and, referring to the cell block address correspondence list, data of the identification cell at at least one cell address at an arbitrarily block address may be read. The second access mode and the third access mode may be repeatedly assigned while changing the block address being arbitrarily selected. If the data is written with the second value, an aggregation of the selected block addresses may be coded as a physical random number code. In another preferred implementation, the inner address may be designated, and the inner address may designate a cell address in an arbitrarily selected sub-block. The third access mode may be assigned and arbitrary cell addresses being able to be selected may be written with a first value, the second access mode may be assigned and arbitrary cell addresses being able to be selected may be written with a second value, the third access mode may be assigned and the data of the identification cell at the inner address in the block address of the arbitrarily selected sub-block may be read. The second access mode and the third access mode may be repeatedly assigned while changing the block address being arbitrarily selected. If the data is written with the second value, an aggregation of the selected cell addresses may be coded as a physical random number code.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 48 shows an example of the physical random number code of the present invention in binary.

FIG. 50 shows an example of the distribution of the fail sub-blocks of the present invention.

DETAILED DESCRIPTION OF THE INVENTION

As mentioned above, the present invention provides an identification device realizing "Uneditable physical address" with network technology, software technology, hardware technology, or a combination of those technologies. As an example, the identification device of the present invention may be a semiconductor chip. As another example, the identification device of the present invention may include such a semiconductor chip. As a further example, the identification device of the present invention may include a portion of semiconductor chip and then be incorporated into the semiconductor chip. Anyway, the identification device of the present invention is a certain kind of semiconductor device.

By precisely designing the configuration to use such properties, it becomes possible to apply excellent functions of public ledger which is powerful on the network of logical nodes (logical network) to the network of physical nodes (physical network). The detailed illustration is provided below with references to drawings.

First Embodiment

Figure 11:
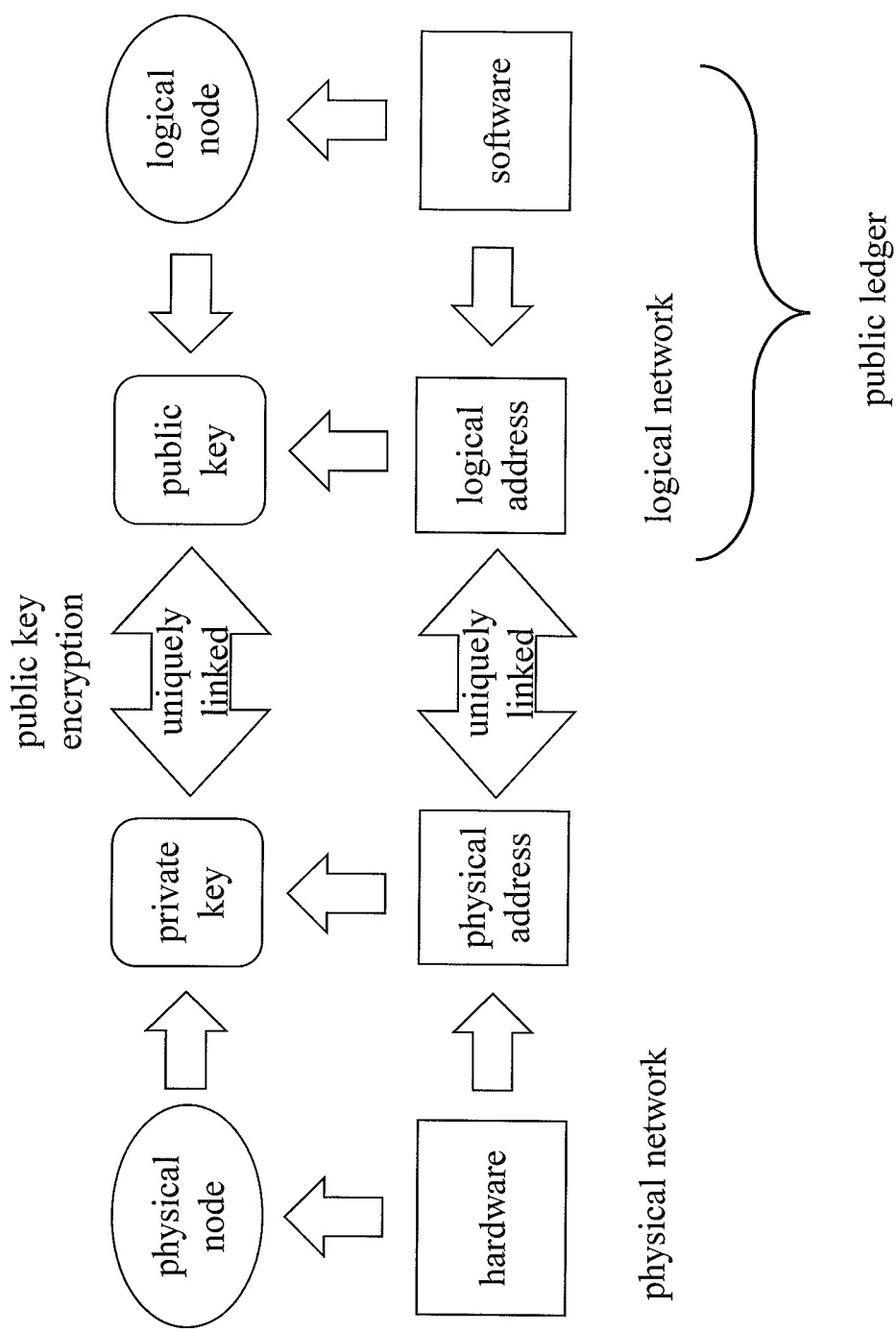
FIG. 11 shows an example of the concept to associate physical network and logical network.

FIG. 11 shows the configuration of a physical network having hardware with identification devices of the present invention and logical network in which public ledger is utilized. The hardware has physical substances which are nodes forming physical network and then regarded as physical nodes. The "uneditable" physical address of the present invention is intrinsic of a physical node and forms a unique linkage with a secret key in a certain manner. The logical node having the logical address further forming a unique linkage with the secret key by a public key encryption may form a unique linkage with the physical node or hardware corresponding thereto. Accordingly, the communication layer in which the logical address and the physical address form a unique linkage may be called identification layer.

Figure 12:
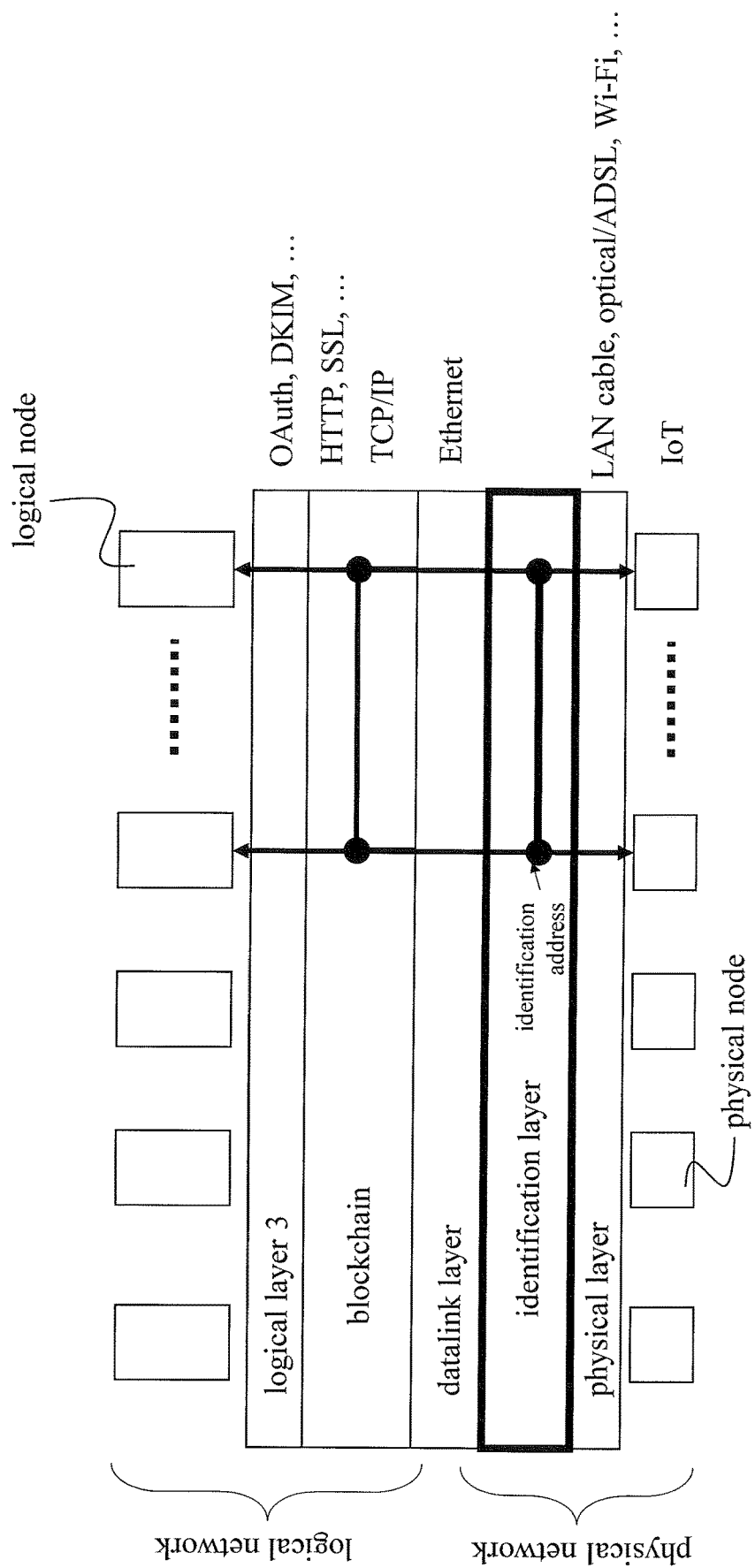
FIG. 12 is a drawing showing that the identification layer of the present invention is inserted.

As shown in FIG. 12, the identification layer exists in between the datalink layer and the physical layer. In addition, the logical address and the physical address are linked with the method mentioned above. Thus, the logical address and the physical address are related to each other in the identification layer. As an example, FIG. 11 shows a secret key corresponding to a logical address. The logical nodes above the logical layer and the physical nodes beneath the physical layer are respectively linked while the linkage is impossible to be modified.

Suppose the physical address (N−1), which is the physical address of a physical node forming a unique linkage with the logical node (N−1), is modified. The secret key (N−1), which forms a unique linkage with the physical address (N−1), also forms a unique linkage with the public key (N−1), which is the logical address of the logical node (N−1). Accordingly, to modify the physical address (N−1) is to modify the public key (N−1).

Figure 1:
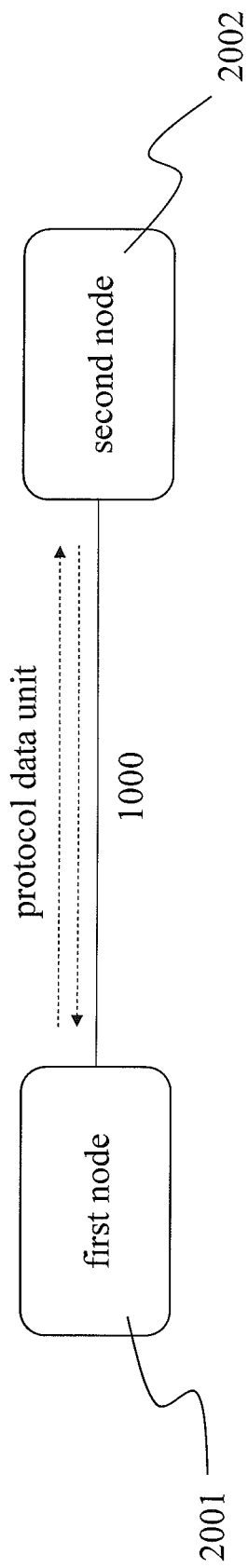
FIG. 1 is a diagrammatic view of smallest unit of network system.
Figure 2:
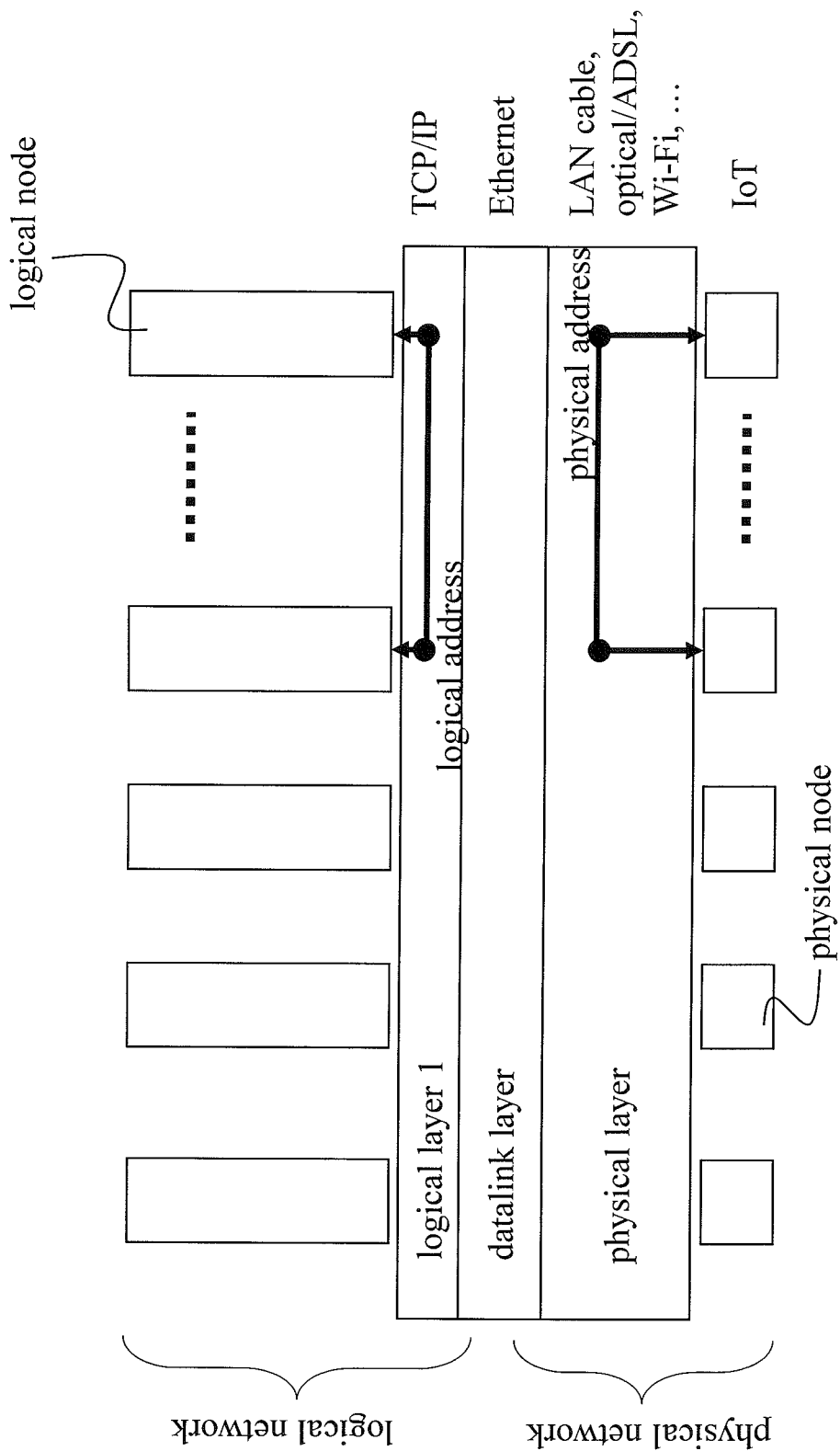
FIG. 2 shows the relationship between logical network and physical network.
Figure 3:
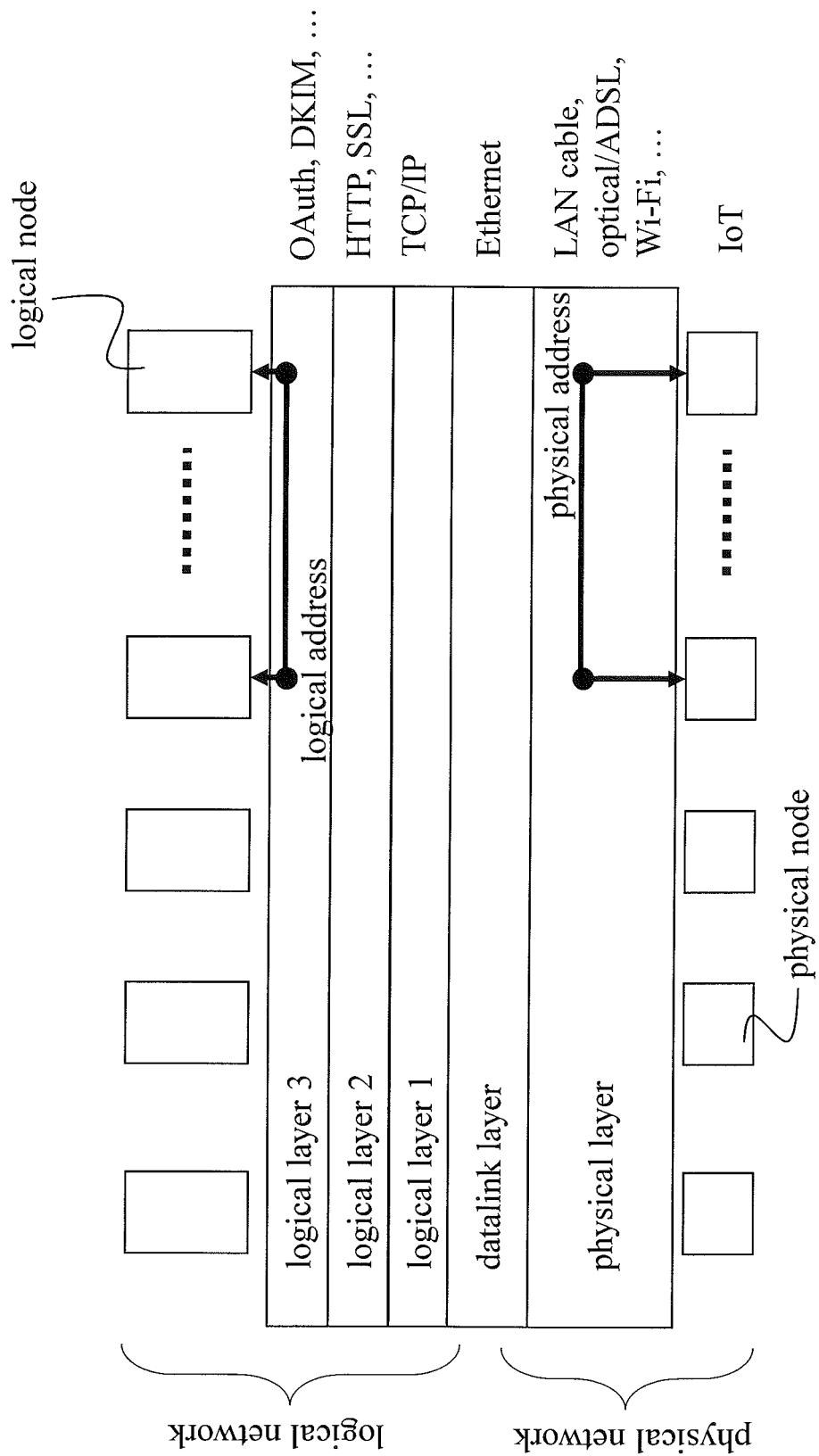
FIG. 3 shows the relationship between logical network and physical network.
Figure 4:
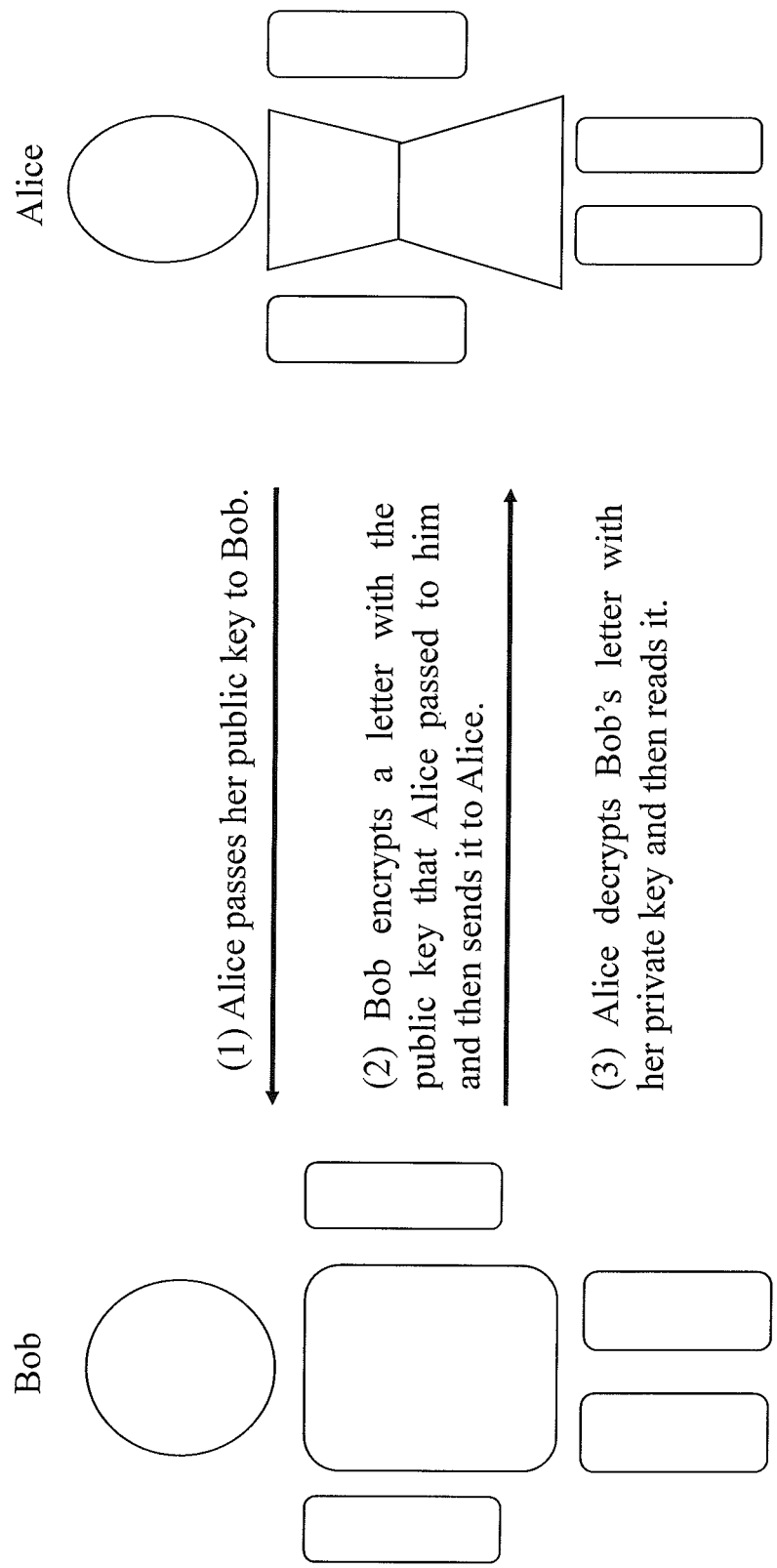
FIG. 4 is a diagrammatic view of the configuration of public key encryption.
Figure 5:
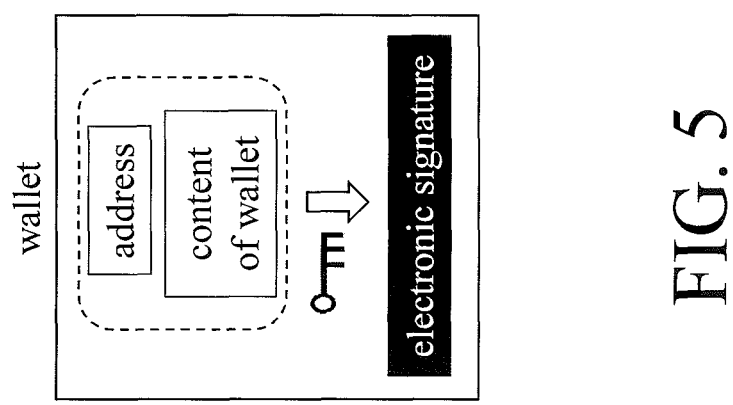
FIG. 5 is a diagrammatic view of the configuration of encryption currency.
Figure 6:
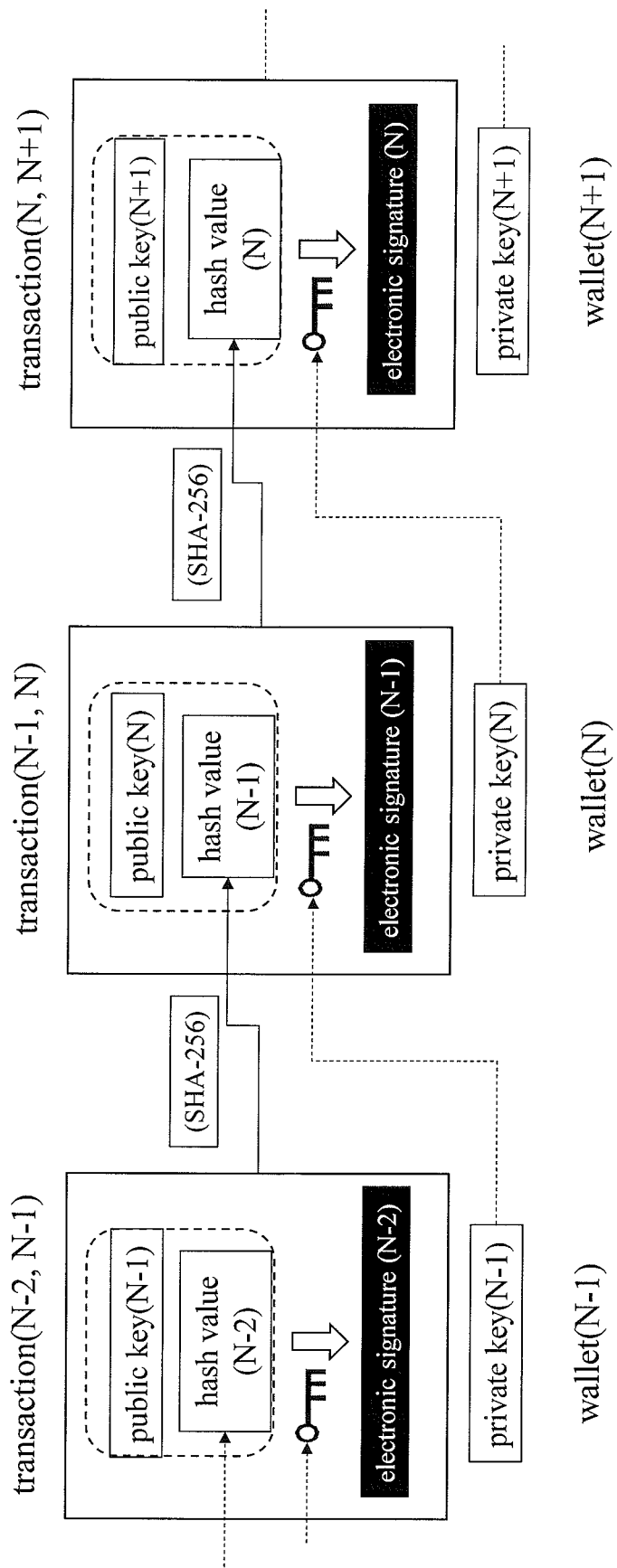
FIG. 6 is shows the configuration of remittance of encryption currency.
Figure 7:
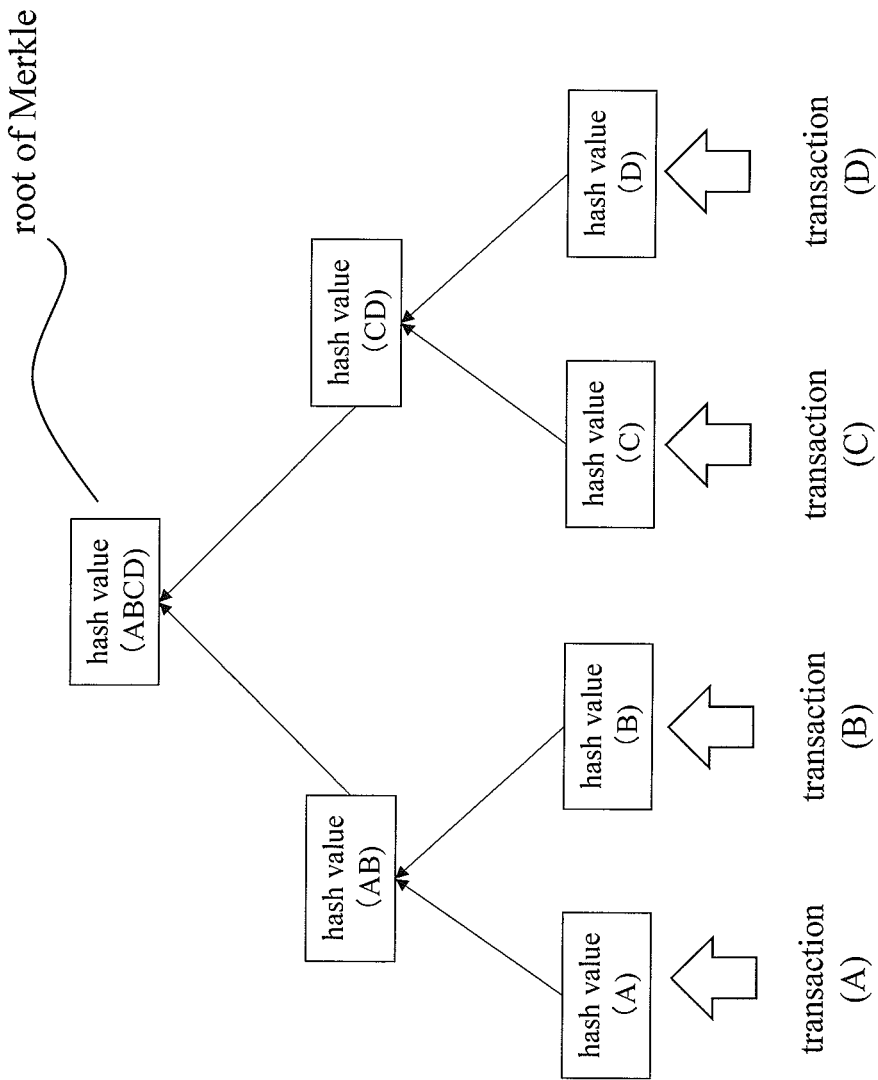
FIG. 7 is a drawing to illustrate Merkle Tree diagram.

As shown in FIG. 6, the hash value (N−1) is modified if the public key (N−1) is modified. The hash value (N) is also modified if the hash value (N−1) is modified. Thus, the latest hash value serially links to them is modified. That is, to modify even a portion of a Tree of Merkle is to modify the Root of Merkle.

Figure 8:
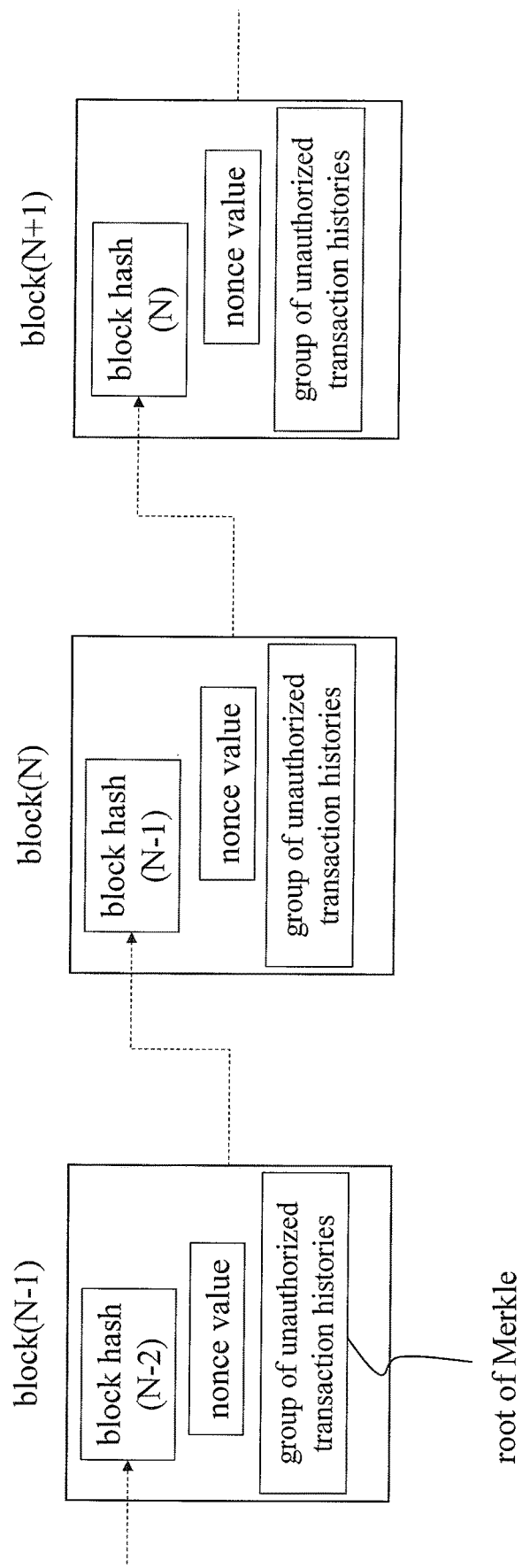
FIG. 8 is a drawing to illustrate the configuration of blockchain.
Figure 9:
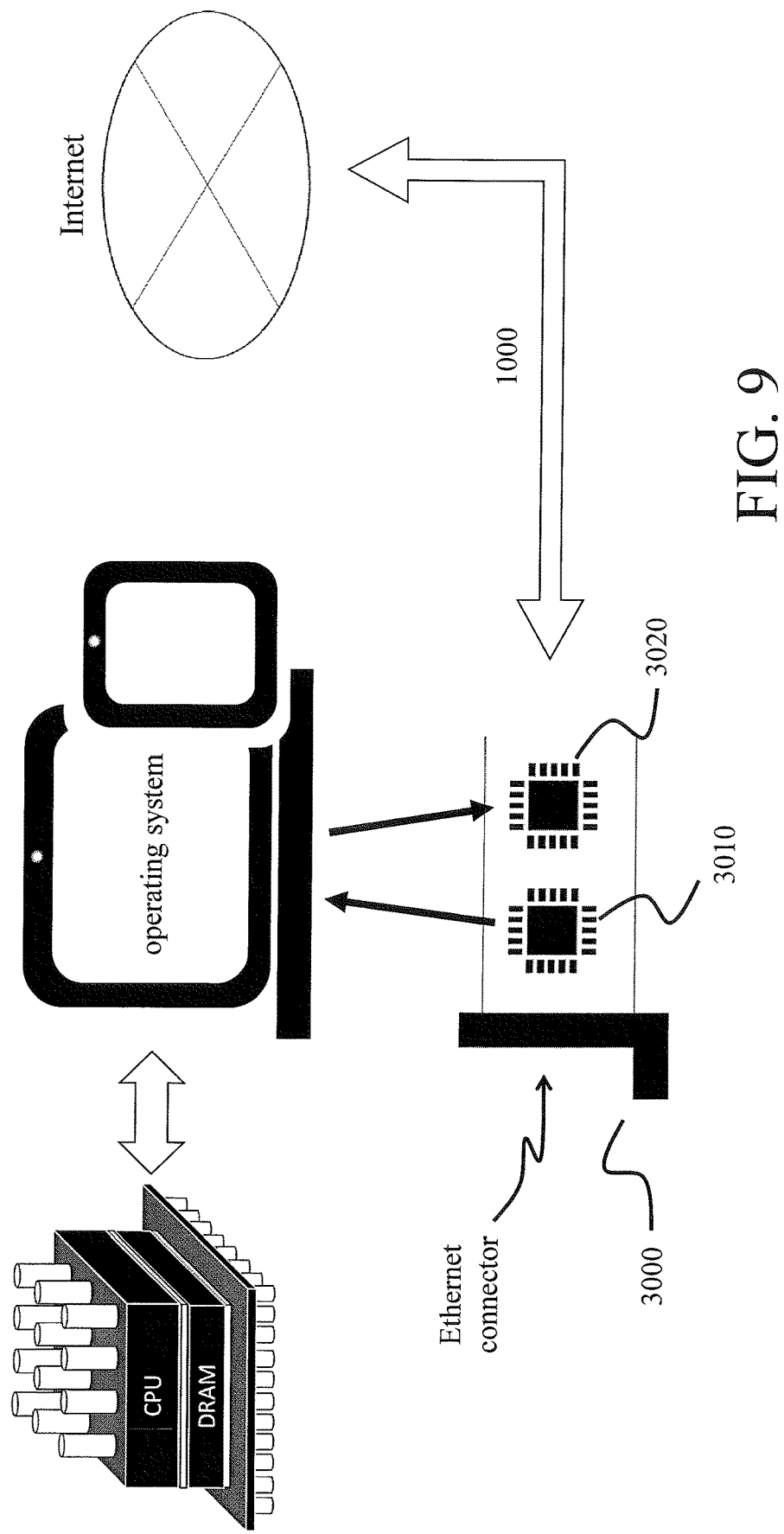
FIG. 9 is a drawing to illustrate the configuration to utilize MAC address.
Figure 10:
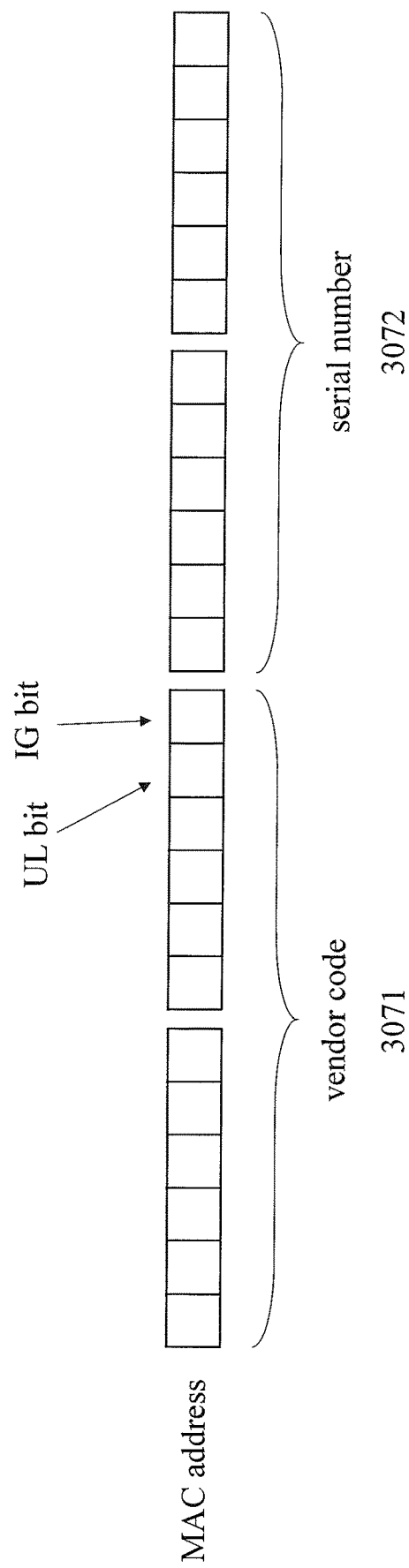
FIG. 10 is a diagrammatic view of the format of MAC address.

As shown in FIG. 8, the block hash (N−1), which forms the content of the block (N) is formed by hashing the whole block (N−1). The block hash (N−1) includes the Root of Merkle (N−1). If the Root of Merkle is modified as mentioned above, the linkage condition between the block (N−1) and the block (N) is broken. Accordingly, to recover the linkage condition, the nonce value of the block (N−1) is re-tuned. For example, it is necessary to re-calculate the nonce value to make all of the first 16 bits of the block hash (N−1) zero. However, the computation ability is necessary to be more than a designed load, since the hash function is irreversible.

Even though succeeding in making all of the first 16 bits of the block hash (N−1) zero by tuning the nonce value, the bits following those first 16 bits may be modified as long as the Root of Merkle is modified. At last, the block hash (N−1) is modified and then the linkage condition between the block (N) and the block (N+1) is broken. In similar way as mentioned above, the computation ability more than the designed load is necessary to recover this linkage condition. In addition, the linkage condition between the block (N+1) and the block (N+2) is broken. Accordingly, as long as the block chain is long enough, more calculation is limitlessly necessary to recover the broken linkage conditions.

Then, as long as a sufficiently long blockchain is formed, it is practically impossible to modify even a portion of physical addresses on the network. Thus, (Uneditable physical address) is possible to be realized by using the physical address connecting to the secret key with the public ledger technology such as blockchain and so forth.

Second Embodiment

Figure 13:
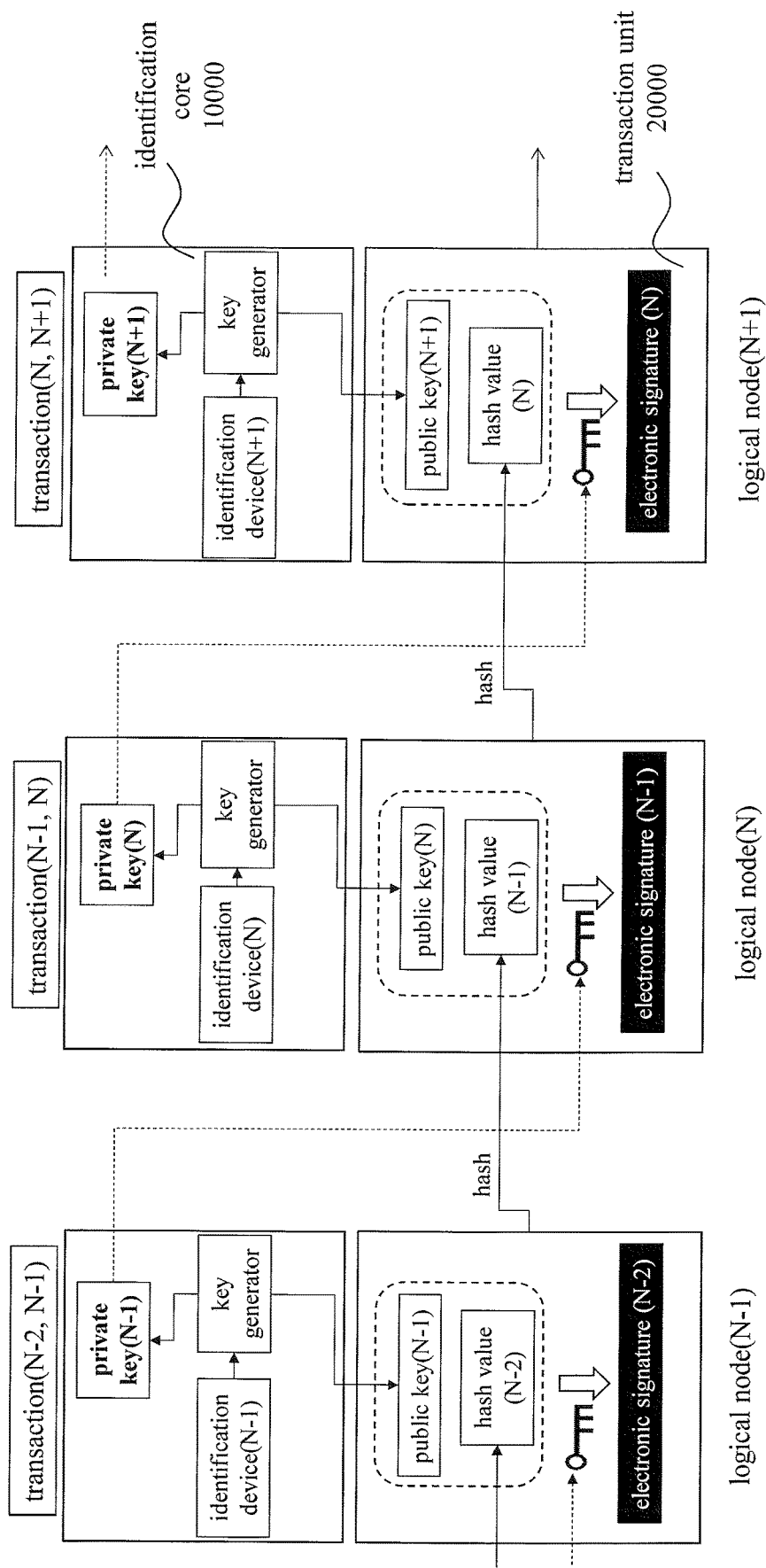
FIG. 13 shows an example of the method of implementing the identification core of the present invention.

FIG. 13 shows an example in which the transaction (N−2, N−1) is executed from the wallet (N−2) to the wallet (N−1), the transaction (N−1, N) is executed from the wallet (N−1) to the wallet (N), and the transaction (N, N+1) is executed from the wallet (N) to the wallet (N+1), where N is arbitrary integer allocated to physical nodes connecting to the network with a predetermined method. The wallet (N) is equivalent to the logical node (N). In each logical node, a transaction unit 20000 includes a public key, a hash value and an electronic signature. On the contrary, an identification core 10000 includes a key generator, an identification device and a secret key.

Except that the secret key is included in the identification core 10000, the operation method of transaction unit is identical to that shown in FIG. 6. Accordingly, the present invention is fully compatible to the conventional blockchain.

A decisive difference from FIG. 6 is the identification core 10000. The public keys included in the transaction units 20000 in the bottom line are generated in a predetermined physical generation process with the identification core 10000 in the upper line. Furthermore, the identification cores 10000 have at least secret keys, respectively.

Subsequently, the operation method of the identification core of the present embodiment is described as follow.

In the identification core 10000, an output from the identification device is input to the key generator to form a unique pair of the secret key and the public key. Moreover, it is difficult, at least, to reproduce the secret key from the public key. There is at least an algorithm to generate key like this. An example may be illustrated with Rivest-Shamir-Adelman (RSA) method. (See non-patent literature 1.) Hereinafter, a method to generate a unique pair of the secret key and the public key with a key generator may be called RSA-type.

[Non-Patentable Literature 1] Rivest, Ronald L. Shamir, Adi. Adelman, Len M. (1977-07-04), "A Method for Obtaining Digital Signature and Public-key Cryptosystems", MIT-LCS-TM-082 (MIT Laboratory for Computer Science).

In the RSA method, an appropriate positive natural number, e, may be given. Usually, it may be preferred to adopt the summation of one and two to the power of 16 (1+2^16), but also possible to give another positive natural number. Next, a set of large prime numbers {p, q} is generated in a certain manner to calculate the product of those numbers, n (=pq). Thus, {e, n} is a public key. Subsequently, a positive natural number is found, such that the remainder of dividing it by (p−1)(q−1) is one. A secret key d is generated by dividing this positive natural number by e. However, if {p, q} is known besides {e, n}, it may be easy to reproduce d with some calculations. Thus, {p, q} must be disposed or confined in an identification core 10000 with no leakage. As long as the set of prime numbers {p, q} is stored with no leakage, the set of {d, p, q} may be regarded as a secret key. Anyway, such a secret key may be regarded as a physical address which is secured by a semiconductor chip and be confined within an identification core 10000. Thus, only the public key may be passed to the transaction unit.

Figure 14:
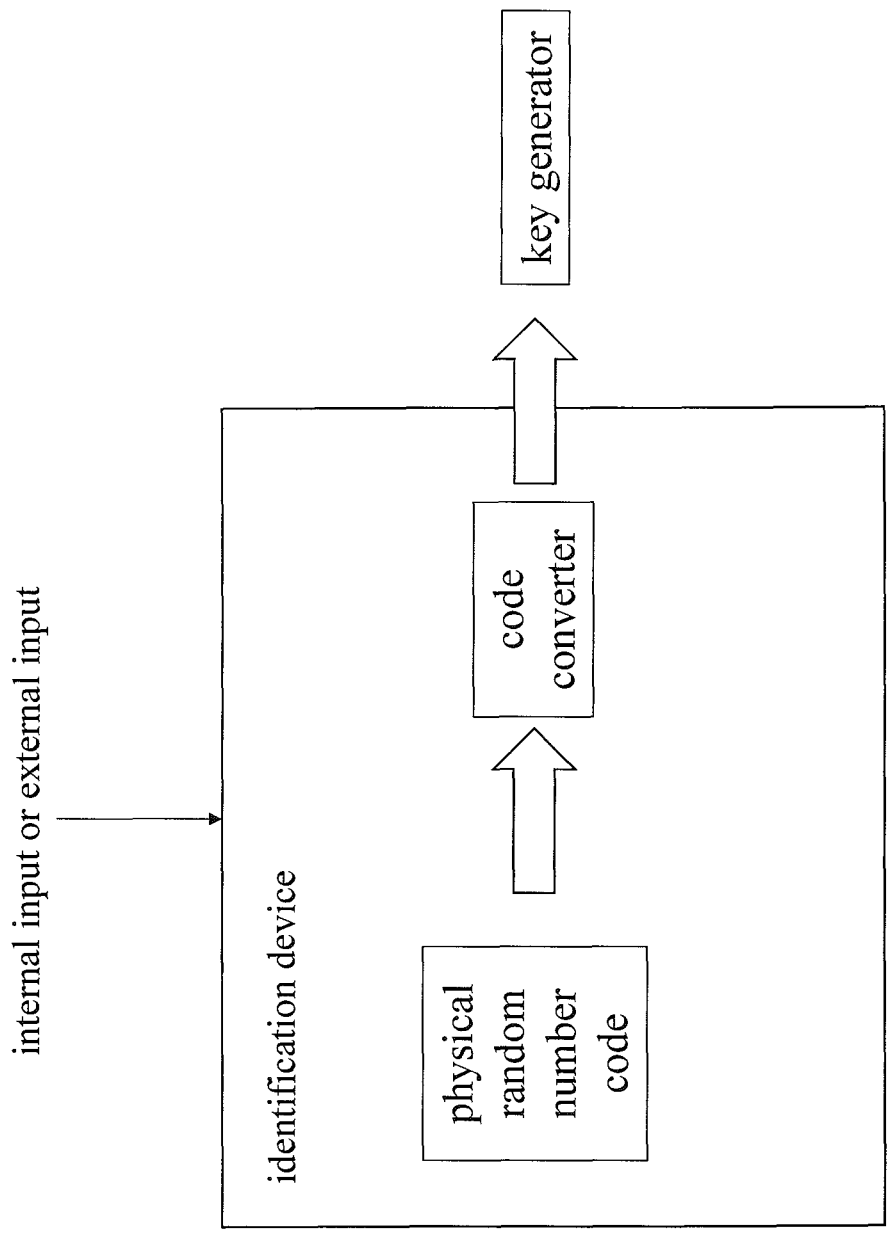
FIG. 14 shows an example of the configuration of the identification device of the present invention.

In the present invention, as shown in FIG. 14, the code converter in the identification device converts the physical random number code to generate a variable to be input to the key generator. This physical random number code is included in a semiconductor chip and secured by the semiconductor chip. Additionally, the physical number code is secured by the identification device forming the semiconductor chip. As an example, the above-mentioned prime numbers {p, q} to be used in the RSA method is generated. It may be possible that an appropriately given positive integer e is input as an external input from the external input or as an internal input from another portion of the internal of the code convertor or the identification device. Alternatively, the appropriately given positive integer e may be extracted from a portion of physical random code. For example, the e can be obtained by adding the unity to several bits cut out from a physical random number code. The remaining code (not cut out) may be input to the code converter. Or, the e may be generated by adding the unity to a physical random number code. Moreover, it may also form the e without using external and internal inputs.

A method of generating the prime number {p, q} from a physical random number, as an example, to subtract the unity from or add it to the physical random number and then it may be checked if the obtained number is prime number or not. If it is not prime number, the unity is subtracted from or added to the obtained number and then it may be checked if the newly obtained number is a prime number or not. By repeating this procedure, a prime number may be at last defined. After obtaining a prime number p, another prime number q may also be obtained by repeating a similar procedure. Thus, the prime number {p, q} may be obtained.

Another example of the method of defining a prime number q is to subtract two from or add it to a physical random number and then it may be checked if the obtained number is a prime number or not. If it is a prime number, it may be a prime number q. Otherwise, two is further subtracted from or added to it, and then it may be checked if the newly obtained number is a prime number or not. By repeating this procedure, a prime number q may be obtained.

The number to be subtracted from or added to a physical random number code may not only be the unity or two but also arbitrary integer (e.g., k). In this case, the k may be a security parameter. For example, a security parameter k may be randomly extracted from a given range of integers by using random number generator or pseudo-random number. Or, it may also be possible to repeatedly combine a physical random number code and k in a certain manner, until the combined number becomes a prime number. Anyway, as long as the physical random number code is sufficiently large numeric, both p and q to be generated may be large enough. This makes the selection of k various.

The physical random number generator to generate physical random number may be included in the identification device, or may be an eternally set up. In the latter case, a random number may be given to the identification device from the external. It may be a similar case that the software generates a pseudo-random number for a physical random number. However, the combining method of physical random number code and k may all be arithmetic operations like the four operations and any combinations thereof. Otherwise, it may be any possible bit operations. Anyway, as long as the physical random number code or the external input is sufficiently large numeric, both p and q to be generated may be large enough.

Figure 15:
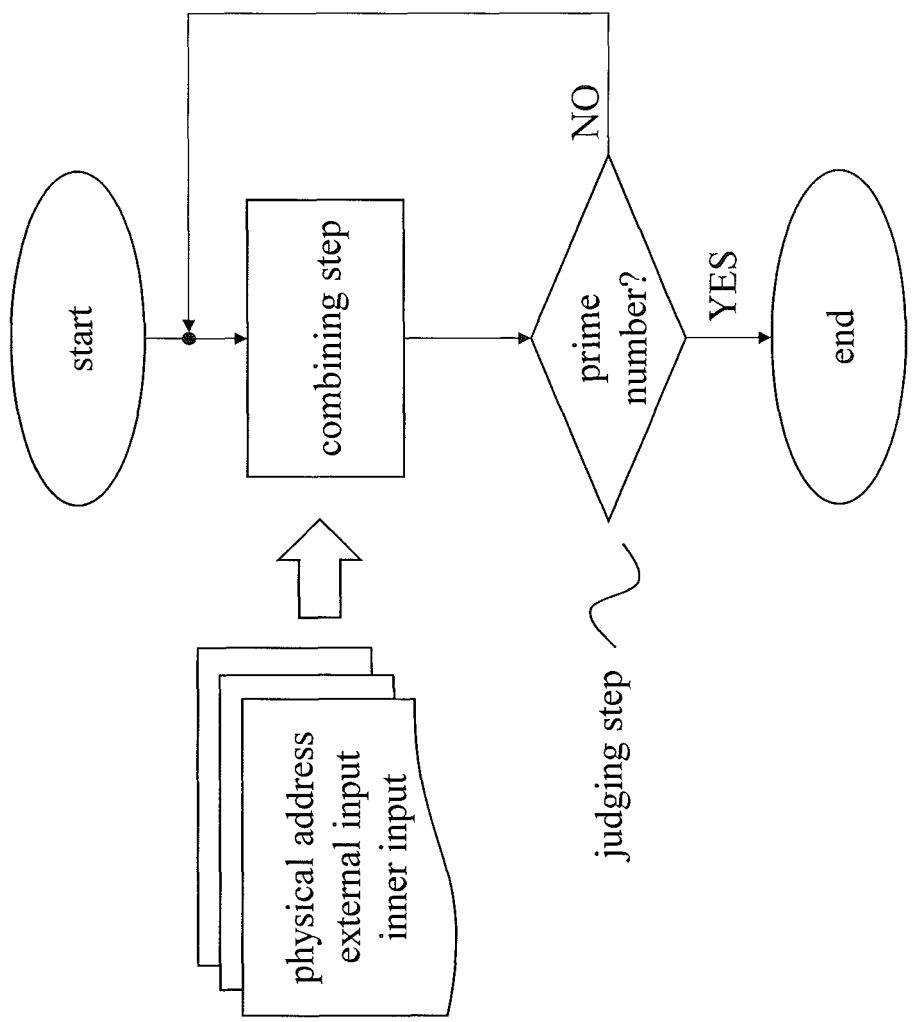
FIG. 15 shows an example of the method of generating prime numbers of the present invention.

Anyway, as an example, a method of obtaining a prime number {p, q} from a physical random number code includes the combining step to combine a physical random number code with an appropriately given variable and the judging step to judge if the compound number is a prime number or not. Then, the combing step and the judging step may be repeated until a prime number is actually obtained, as shown in FIG. 15.

Third Embodiment

Furthermore, as shown in FIG. 14, an external input is input to the identification device in the previous embodiment so as to change a generated pair of the secret key and the public key. The present embodiment is useful for family and friends to share a same terminal. That is, the identification address may be different if the external inputs are different, even though a same terminal is used. Alternatively, the identification address may be different if a different terminal is used, even though an identical external input is used.

As an example, the external input to boot a certain application executing on the network may be a passcode, a digital code information such as a PIN code, a barcode, and a QR code, a certain biometric information to identify the regular user of the application such as a finger print information, a finger vein information, a retina information, a DNA information, and so forth, a voice and image information extracted from the voice and the picture of the regular user to identify an individual, a physical information extracted from physical characteristics of the regular user to identify an individual, or other personal information to identify a regular user.

As another example, the external input that a certain application executing on the network requires users to input as necessary may be a passcode, a digital code information such as a PIN code, a barcode, and a QR code, a certain biometric information to identify the regular user of the application such as a finger print information, a finger vein information, a retina information, a DNA information, and so forth, a voice and image information extracted from the voice and the picture of the regular user to identify an individual, a physical information extracted from physical characteristics of the regular user to identify an individual, or other personal information to identify a regular user.

As a further example, the external input to boot information terminal into which a certain application executing on the network is installed may be a passcode, a digital code information such as a PIN code, a barcode, and a QR code, a certain biometric information to identify the regular user of the application such as a finger print information, a finger vein information, a retina information, a DNA information, and so forth, a voice and image information extracted from the voice and the picture of the regular user to identify an individual, a physical information extracted from physical characteristics of the regular user to identify an individual, or other personal information to identify a regular user.

As an even further example, the external input is a fetch code for redundancy mode to obtain a physical random number generated through a certain physical process in a manner which the physical random number secured by of a semiconductor chip forming an identification device. However, the fetch code for redundancy mode is a code to designate at least access mode to inner data of chip, address, and operation mode.

Alternatively, the external input may be configured with a combination of the above-mentioned plurality of external inputs, where N is an arbitrary integer to represent node number in the above description. In another method, both external and inner inputs may be used.

As an example, the physical random number code and the external input may be combined in a certain method. The combining method may be the four operations or combinations thereof, or any possible bit operations. The unity is subtracted from or added to the integer combination here. The obtained number may be checked if it is a prime number of not. If it is a prime number, it may be p. Otherwise, the unity is subtracted from or added to this number, and then the newly obtained number may be checked if it is a prime number of not. By repeating this procedure, a prime number may be obtained at last. After obtaining a prime number p, a similar procedure is performed to obtain another prime number q. Thus, the prime numbers {p, q} can be obtained.

Another example to determine a prime number q is to combine the physical random number code and the external input in a certain method, as mentioned above. The combining method may be the four operations or combinations thereof, or any possible bit operations. Two is subtracted from or added to the integer combination here. The obtained number may be checked if it is a prime number of not. If it is a prime number, it may be q. Otherwise, two is subtracted from or added to this number, and then the newly obtained number may be checked if it is a prime number of not. By repeating this procedure, a prime number q may be obtained at last. However, other than the unity or two, it may be possible that an arbitrary integer (j) is added to or subtract from an integer (i) to be obtained by combining a physical random number code and an external input, in order to obtain prime number p or q. Alternatively, it may also be possible to repeat the combination of i and j until the compound number becomes a prime number.

The combining method may be any arithmetic operations like four operations and combinations thereof, or any possible bit operations. Anyway, as the physical random number code or the external input is sufficiently large numeric, both p and q may be sufficiently large. Anyway, the method of obtaining prime numbers p and q from the physical random number code, as an example, includes the combining step to combine the physical random number code and an appropriately given variable, and the judging step to judge if the compound number is a prime number or not. The combining step and the judging step may be repeated until actually obtaining a prime number, as shown in FIG. 15.

In the above, the RSA method of generating a secret key and a public key is adopted to explain (Second embodiment) and (Third embodiment). However, these are just examples and not limiting. Any kind of algorithm of key generation may be adopted, as long as a key generator generates a secret key and a public key by receiving a certain input from an identification device.

Fourth Embodiment

Figure 16:
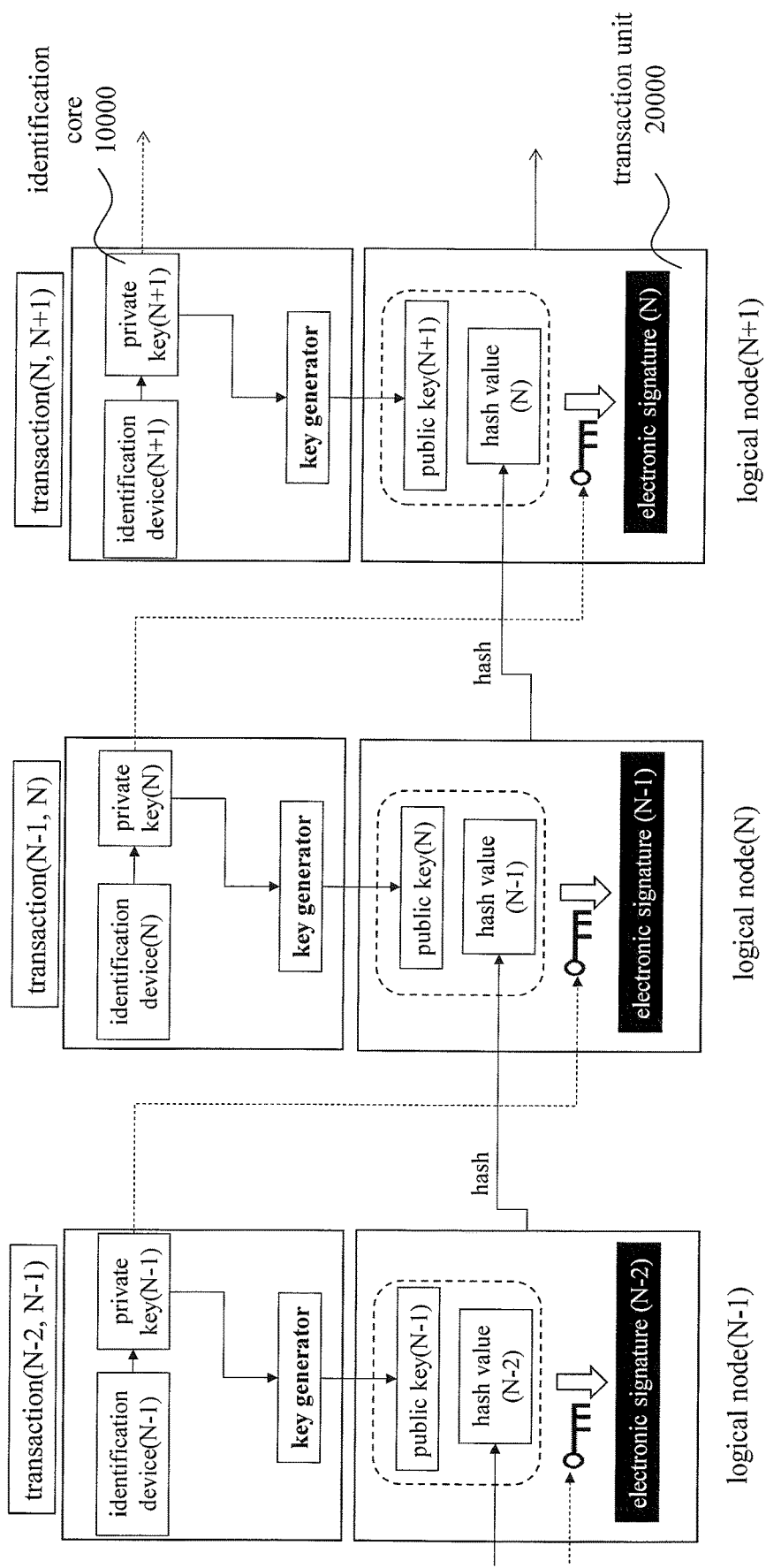
FIG. 16 shows an example of the method of implementing the identification core of the present invention.

FIG. 16 shows another example of the identification core.

In the identification core 10000 of the present embodiment, the secret key output from the identification device is input to the key generator so as to generate the public key. In this case, the secret key and the public key form a unique linkage. Moreover, it is practically impossible to generate the secret key from the public key. There may be at least one algorithm of key generation like this. Among them, the most famous one may be the ElGamal method. (See non-patent literature 2.) Hereinafter, the method that the key generator generates a public key from a secret key may be called ElGamal type.

[Non-Patentable Literature 2] A Public-Key Cryptosystem and a Signature Scheme Based on Discrete Logarithms, Taher ElGamal, IEEE Transactions on Information Theory, v. IT-31, n. 4, 1985, pp. 469-472.

In the ElGamal method, at first, a large prime number p and its primitive root g may be given. The prime number p and the primitive root g may be selected according to the designed specification and then may be stored in the key generator or in another module of the identification core. The other operations may be similar to (Second embodiment). Thus, the detailed explanation is omitted for the simplicity. Next, a non-negative integer x smaller than p−1 may be randomly selected to be a secret key. In the present embodiment, as an example, it may be possible for an appropriate code conversion to obtain a secret key from a physical random number of an identification device. Thus, the secret key may be regarded as the physical address proper to a semiconductor chip and then not to be exposed to the external of the identification core. Subsequently, the public key may be the remainder of dividing g to the power of x by p and then forwarded to a transaction unit.

FIG. 14 shows an example of the identification device. The identification device generates a secret key by converting a physical random number code with the code converter. The physical random number code is included in a semiconductor chip and secured by the semiconductor chip. In the present embodiment, as an example, a secret key may be the remainder of dividing the physical random number code of the identification device by p−1. This may be input to a key generator to generate a public key.

In the present invention, a secret key may be the remainder of dividing a compound number of a physical random number code of an identification device and an inner input or an external input with a certain operation method by p−1. This may be input to a key generator to generate a public key in the above-mentioned method.

The combining method may be various. For example, it may be the addition, the subtraction, the multiplication and the division, combinations thereof, logical operations, and any possible bit operations.

As an example to define a prime number p, at first, a physical random number code and an external input or an inner input may be combined with a certain method to obtain an integer. The combining method may be the four operations and combinations thereof, or any possible bit operations. For example, the unity may be subtracted from or added to this integer and then it may be checked if the obtained number is a prime number. If it is a prime number, it may be the prime number p. Otherwise, the unity may be subtracted from or added to it and then it may be checked if the newly obtained number is a prime number or not. By repeating this procedure, a prime number p may be given.

Another example to define a prime number p is, at first, to combine a physical random number and an external input or an inner input with a certain method to obtain an integer, as mentioned above. Two may be subtracted from or added to this integer and then it may be checked if the obtained number is a prime number. If it is a prime number, it may be the prime number p. Otherwise, two may be subtracted from or added to it and then it may be checked if the newly obtained number is a prime number or not. By repeating this procedure, a prime number p may be given.

Other than the unity or two, it may be possible that an arbitrary integer (j) is added to or subtract from an integer (i) to be obtained by combining a physical random number code and an external input or an inner input, in order to obtain a prime number p or q. Alternatively, it may also be possible to repeat the combination of i and j until the compound number becomes a prime number.

The combining method may be any arithmetic operations like four operations and combinations thereof, or any possible bit operations. Anyway, as a physical random number code, an external input or an inner input is sufficiently large numeric, both p and q may be sufficiently large.

Any method among the above or another different methods may generate a sufficiently large prime number p.

Furthermore, as an example, a primitive root g may be an external input. Otherwise, as another example, a primitive root g may be a combined number of an external input and an inner input. The combining method may be any arithmetic operations such as the four operations and combinations thereof, or any possible bit operation.

In the above, the ElGamal method of generating a secret key and a public key is adopted to explain the present embodiment. However, these are just examples and not limiting. Any kind of algorithm for key generation may be adopted, as long as a public key is generated by inputting a secret key to a key generator.

Fifth Embodiment

The physical random number (the physical random number code as shown in FIG. 14 as an example) may be generated with some kind of physical randomness extracted from a cell array in a semiconductor chip having physical substance. Such kind of chip may be called an identification chip.

Figure 17:
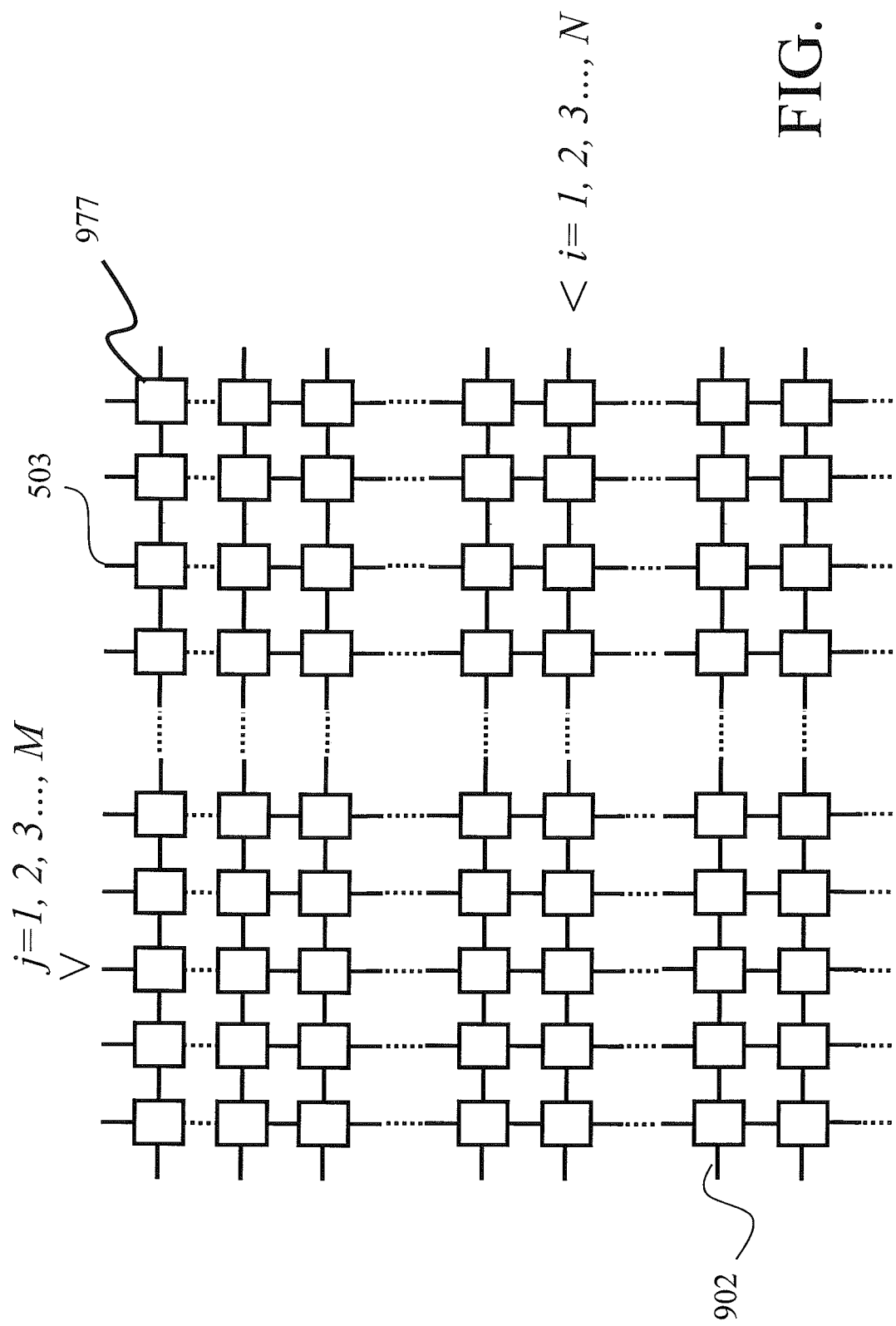
FIG. 17 shows an example of the identification cell of the present invention.
Figure 18:
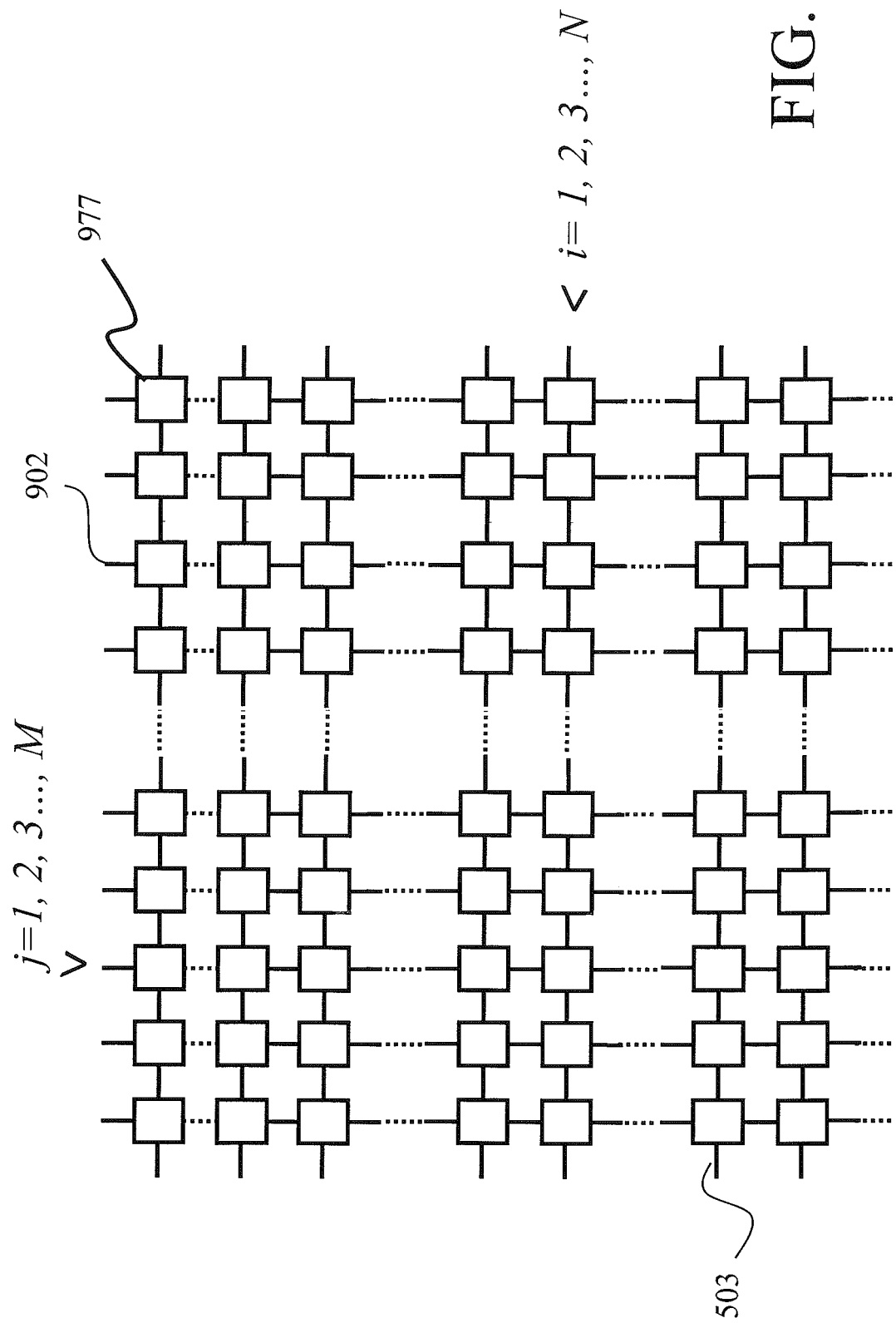
FIG. 18 shows an example of the identification cell of the present invention.

FIG. 17 shows an example of cell array including word lines 503 and bit lines 902. There are plurality of identification cells 977 at cross-points of the bit lines 902 and word lines 503 (cell addresses). In this example, the bit lines 902 are the row lines arrayed along the row axis. The word lines 503 are the column lines arrayed along the column axis. The word lines 503 and the bit lines 902 intersect and form cross-points. Each of the bit lines 902 is respectively assigned with a row number and each of the word lines 503 is respectively assigned with a column number. The total number of row lines (bit lines) is N, which is the number of the row lines forming the group of row lines. The total number of columns (the number of word lines) is M, which is the number of the column lines forming the group of column lines. In FIG. 18, the word lines and bit lines are replaced with each other to be along the row and column axes, respectively. In this case, the number of rows (word lines) is N and the number of columns (bit lines) is M.

As an example, an identification cell has at least two terminals (the first terminal and the second terminal). One of a word line 503 and a bit line 902 connects to the first terminal and the other connects to the second terminal.

Figure 19:
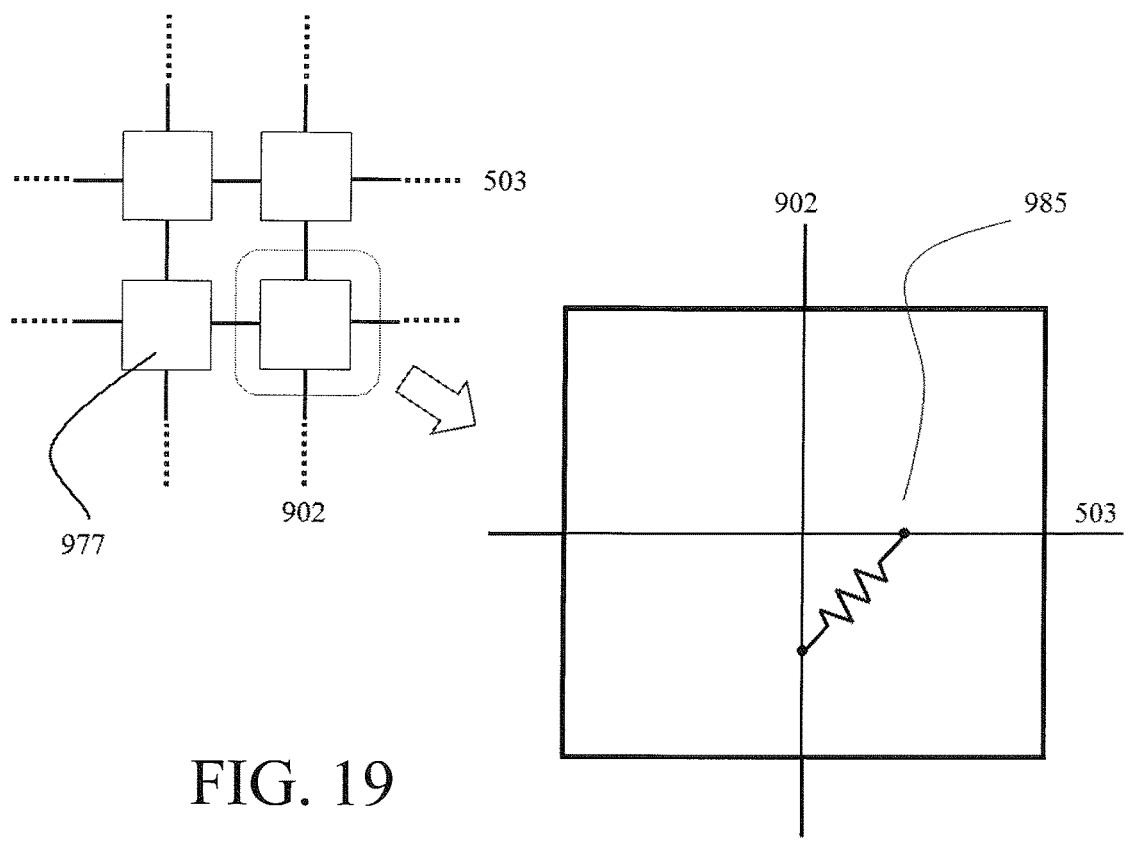
FIG. 19 shows an example in which the identification cell of the present invention is a resistor.
Figure 20:
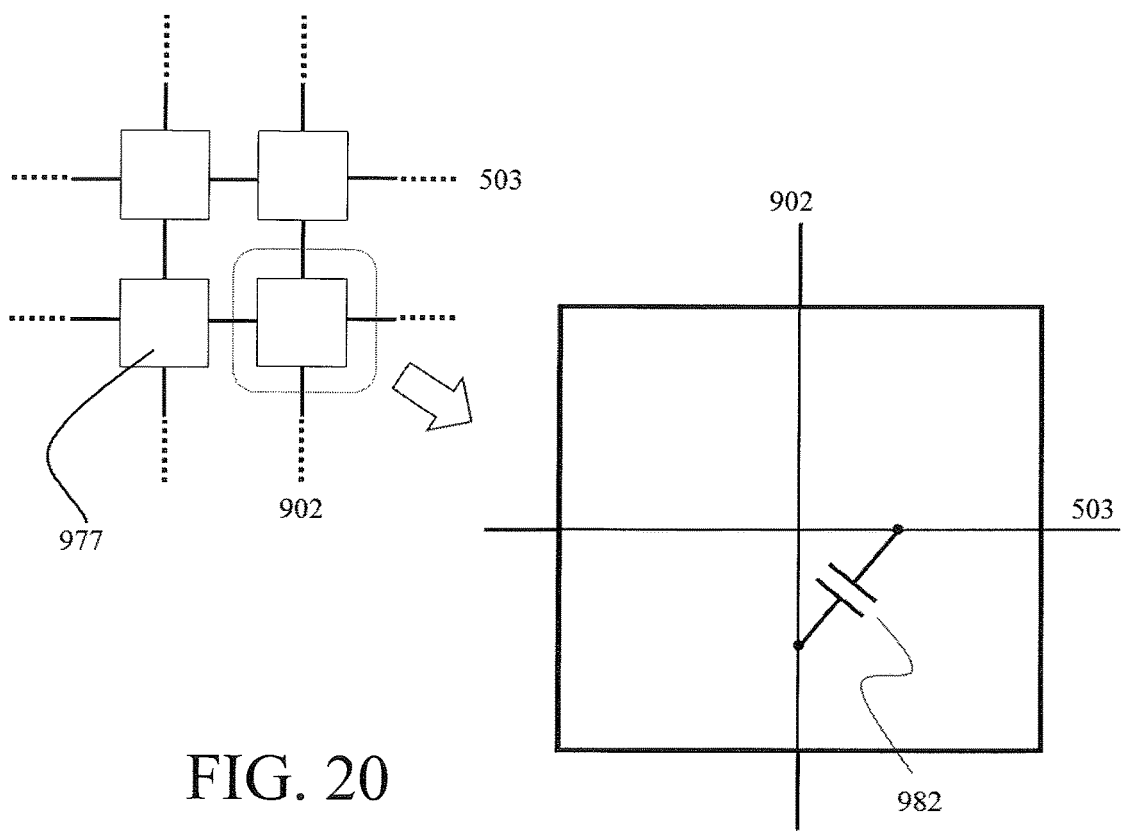
FIG. 20 shows an example in which the identification cell of the present invention is a capacitor.
Figure 21:
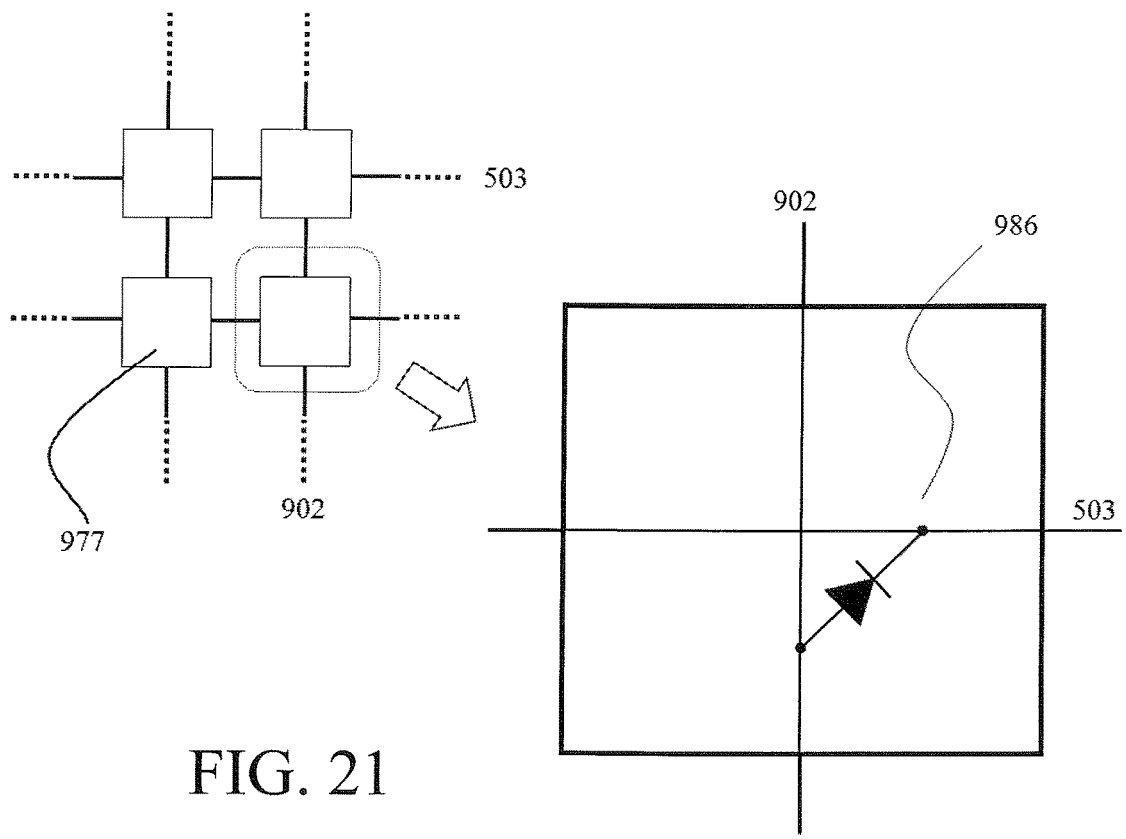
FIG. 21 shows an example in which the identification cell of the present invention is a PN junction.
Figure 22:
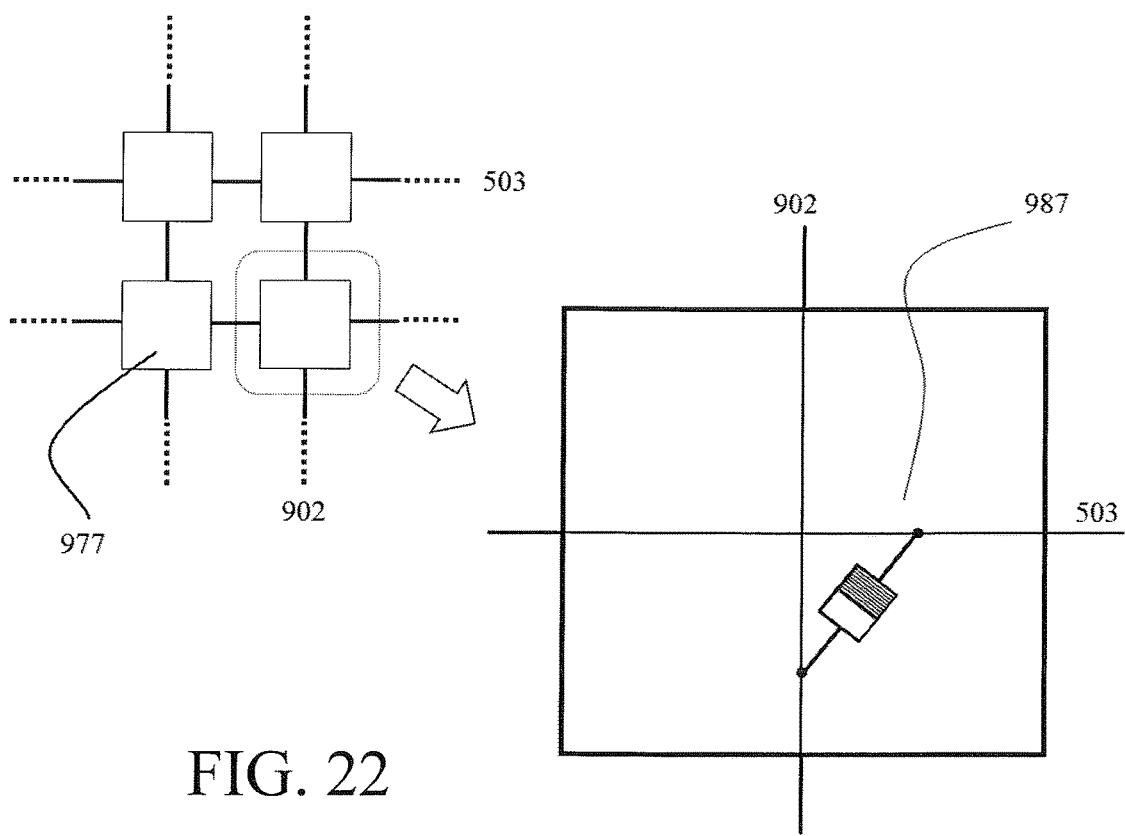
FIG. 22 shows an example in which the identification cell of the present invention is a Schottky junction.
Figure 23:
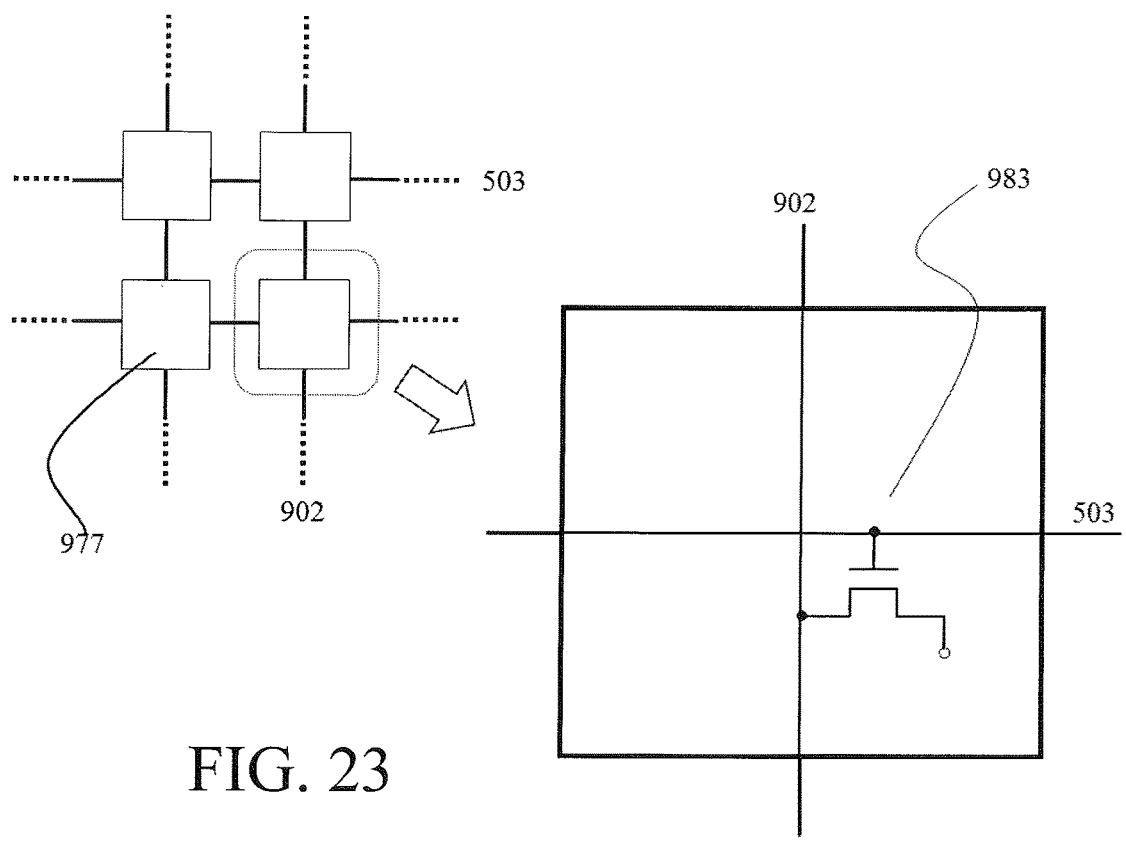
FIG. 23 shows an example in which the identification cell of the present invention is a transistor.
Figure 24:
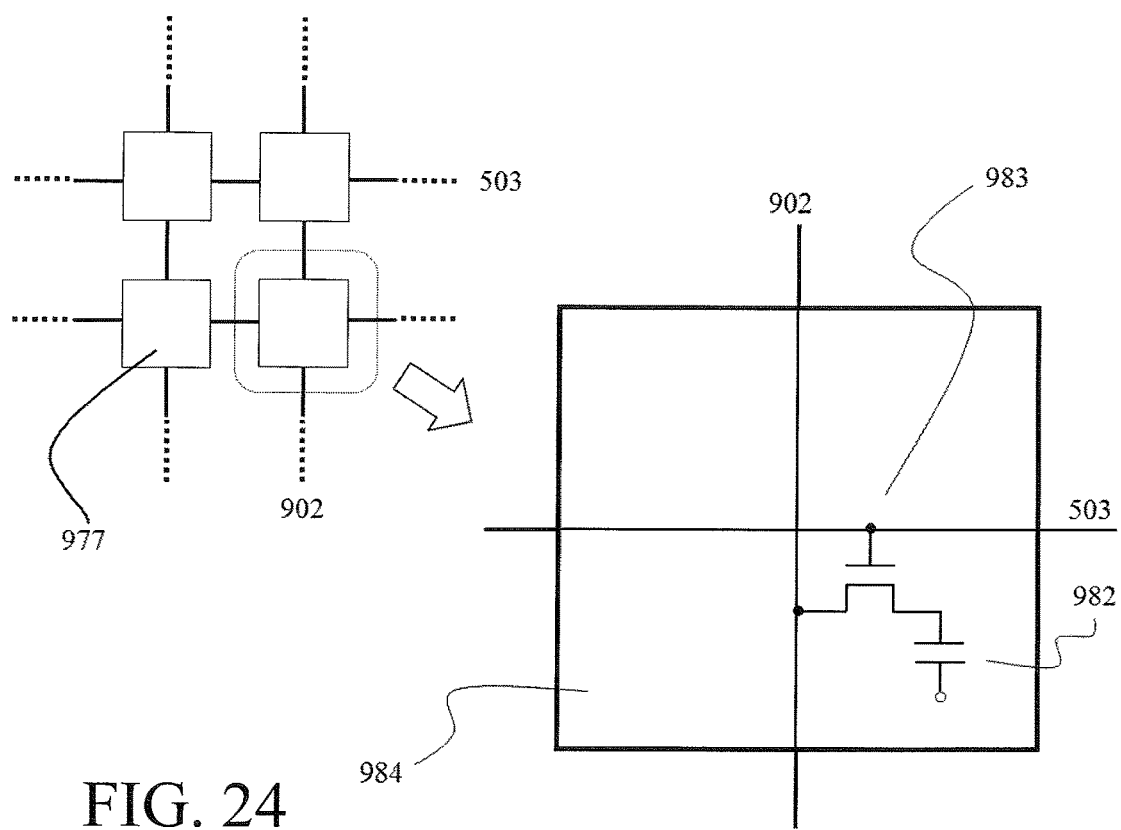
FIG. 24 shows an example in which the identification cell of the present invention is a DRAM memory cell having a transistor and a capacitor.
Figure 25:
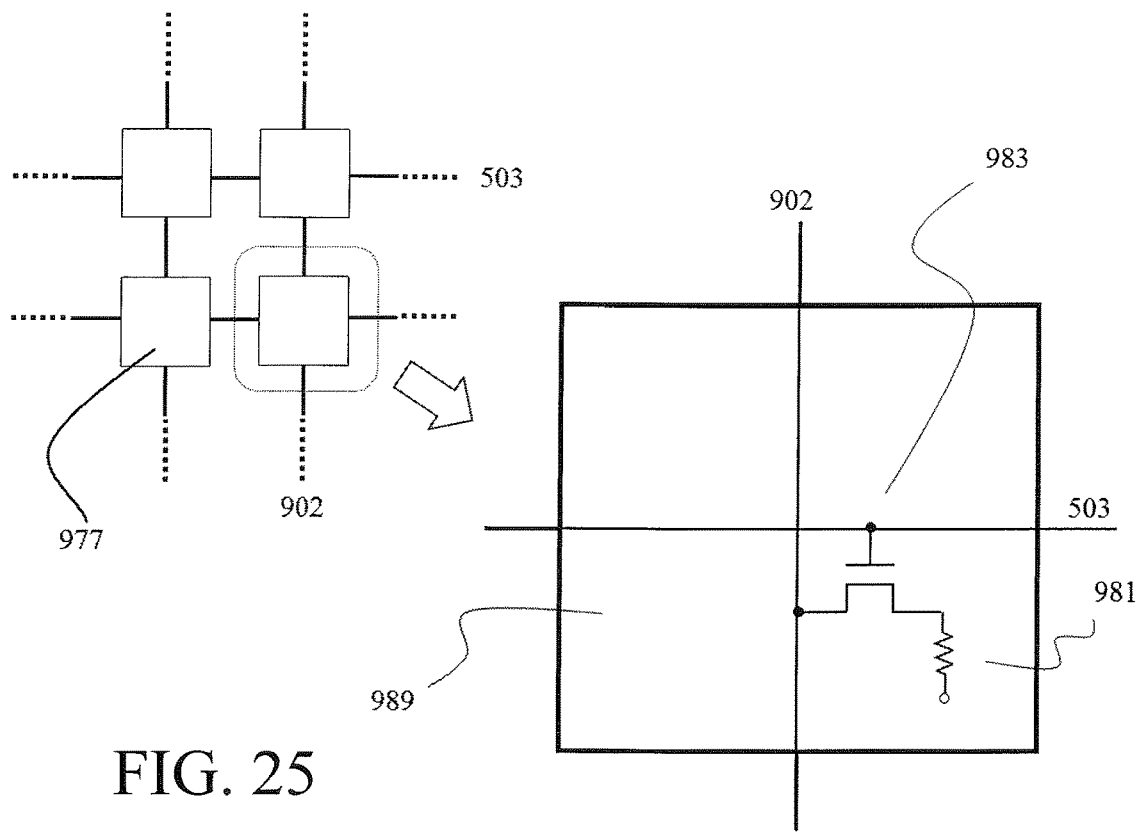
FIG. 25 shows an example in which the identification cell of the present invention is a variable resistance memory cell having a transistor and a variable resistor.
Figure 26:
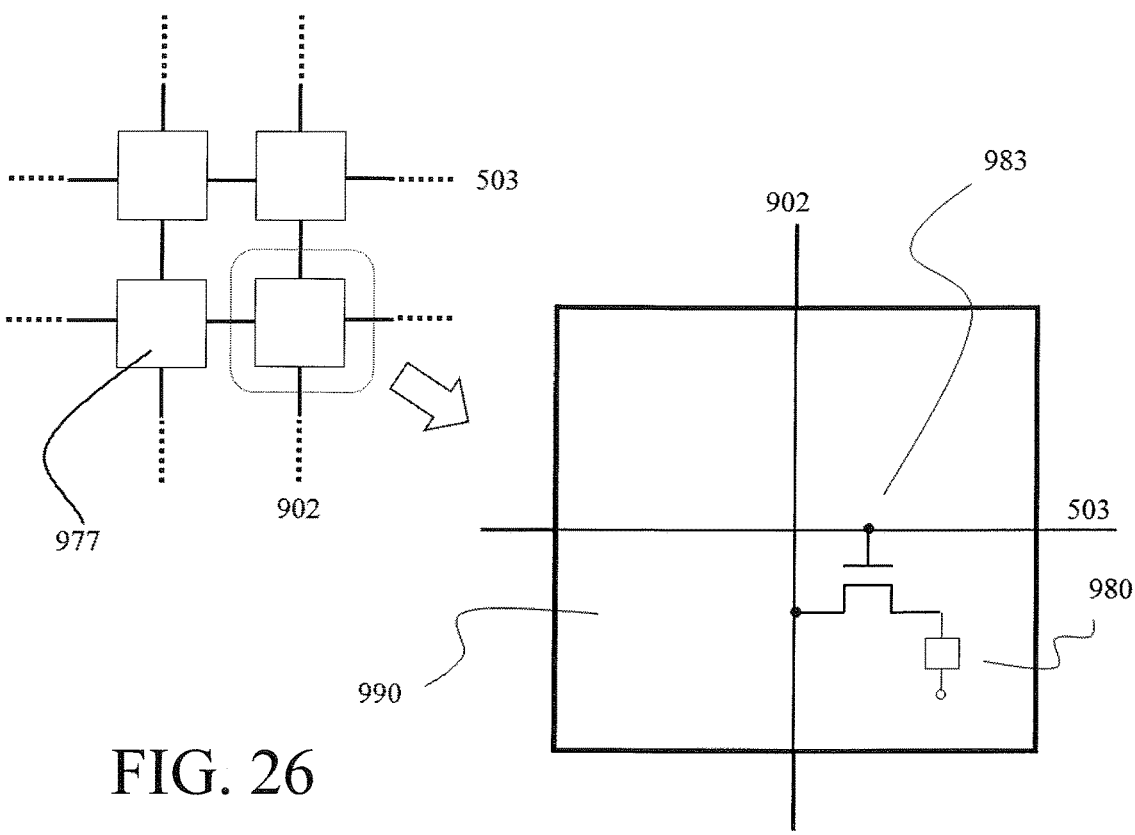
FIG. 26 shows an example in which the identification cell of the present invention is a magnetic resistance memory cell having a transistor and a magnetic resistor.
Figure 27:
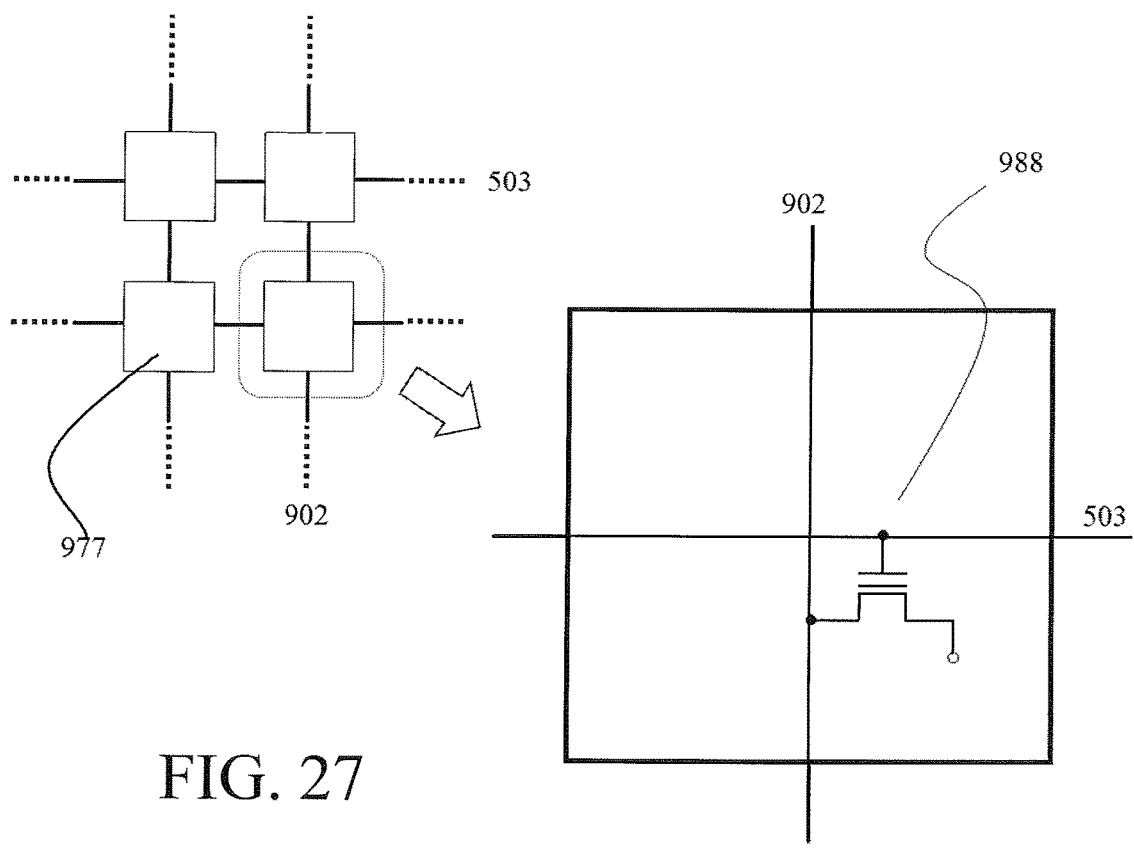
FIG. 27 shows an example in which the identification cell of the present invention is a nonvolatile memory cell having a charge storage layer.

An identification cell 977 is a resistor 985, as shown in FIG. 19. The resistor 985 is a resistor cell having resistance with measurable resistivity, or a conductor cell having conductance with measurable conductivity. Alternatively, as shown in FIG. 20, it is a capacitor 982. The capacitor 982 has a structure in which a dielectric with measurable permittivity is sandwiched between conductive components. Otherwise, as shown in FIG. 21, it is a PN junction 986. The PN junction 986 is a certain kind of semiconductor cells having the rectification of junction between p-m type semiconductor and n-type semiconductor. Alternatively, as shown in FIG. 22, it is a Schottky junction 987. The Schottky junction 987 is a certain kind of semiconductor cells of junction between metal and semiconductor. Otherwise, as shown in FIG. 23, it is a transistor 983. The transistor 983 is a certain kind of solid-state amplifiers having a gate capacitor between source and drain regions. Alternatively, it is a bipolar type solid-state amplifier having base region between emitter and collector regions. Otherwise, as shown in FIG. 24, it is a DRAM cell having a transistor 983 and a capacitor 982. Alternatively, if the dielectric film in FIG. 20 is replaced with a ferroelectric film, it is a ferroelectric memory cell (FeRAM). Otherwise, as shown in FIG. 25, it is a variable resistance memory cell 989 having a transistor 983 and a variable resistor 981. If this variable resistor 981 is controllable with voltage application, the variable resistance memory cell 989 is ReRAM. Alternatively, if the variable resistor 981 is controllable with heating, the variable resistance memory cell 989 is PCRAM. Otherwise, as shown in FIG. 26, it is a magnetic resistance memory cell 990 having a transistor 983 and a magnetic resistor 980. If the magnetic resistor is a GMR film, the magnetic resistance memory cell 990 is MRAM. Alternatively, if the magnetic resistor is a STT film, the magnetic resistance memory cell 990 is STT-MRAM. Otherwise, as shown in FIG. 27, it is a nonvolatile memory cell having charge storage layer 988, in which the charge storage layer may be a charge trapping layer or a floating gate.

Figure 28:
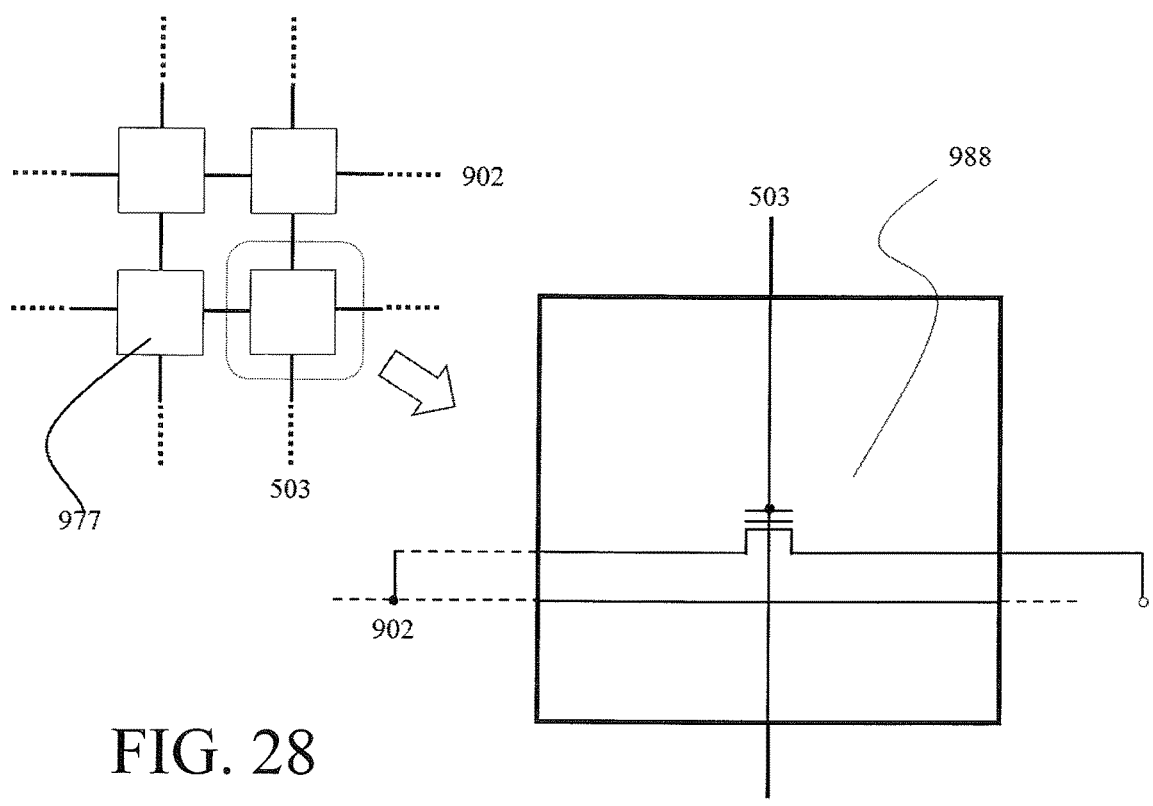
FIG. 28 shows an example in which the identification cell of the present invention is a nonvolatile memory cell having a charge storage layer and distributed on NAND-type cell array.
Figure 29:
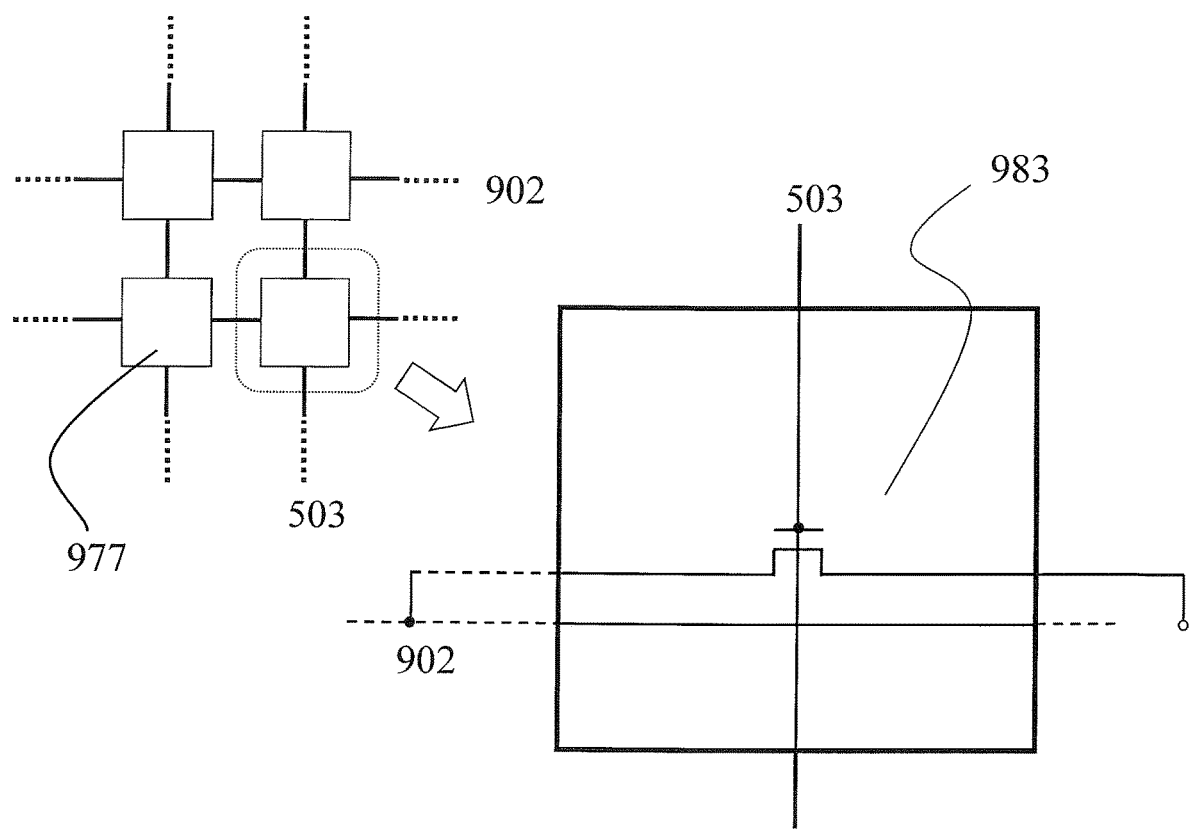
FIG. 29 shows an example in which the identification cell of the present invention is a transistor and distributed on NAND-type cell array.

Alternatively, the identification cell 977 is a nonvolatile memory cell having charge storage layer 988, with a plurality of which is distributed on NAND-type cell array with a bit contact being intentionally removed from between cells, as shown in FIG. 28. Otherwise, it is a transistor 983, with a plurality of which is distributed on NAND-type cell array with a bit contact being intentionally removed from between cells, as shown in FIG. 29. However, even though bit contacts are removed from between cells, the bit lines are not removed. Accordingly, even in NAND-type cell array, there is no change in the cell layout in which the identification cells 977 are distributed at cross-points at which the bit lines and the word lines intersect.

Figure 30:
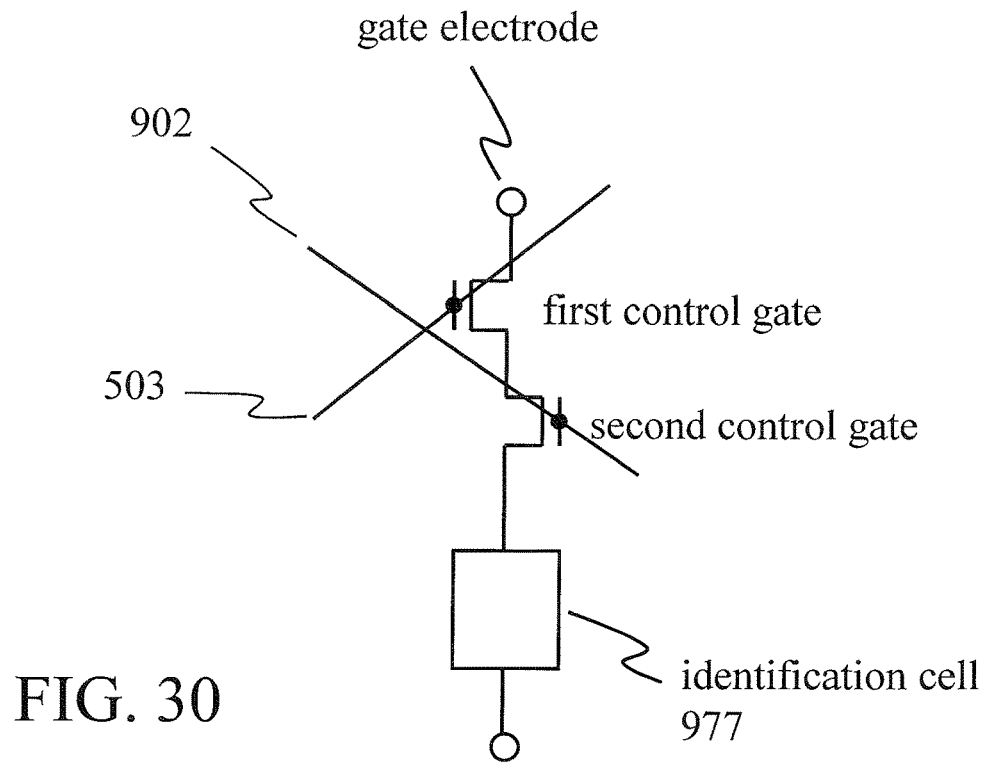
FIG. 30 shows an example of the method of accessing the identification cell of the present invention.
Figure 31:
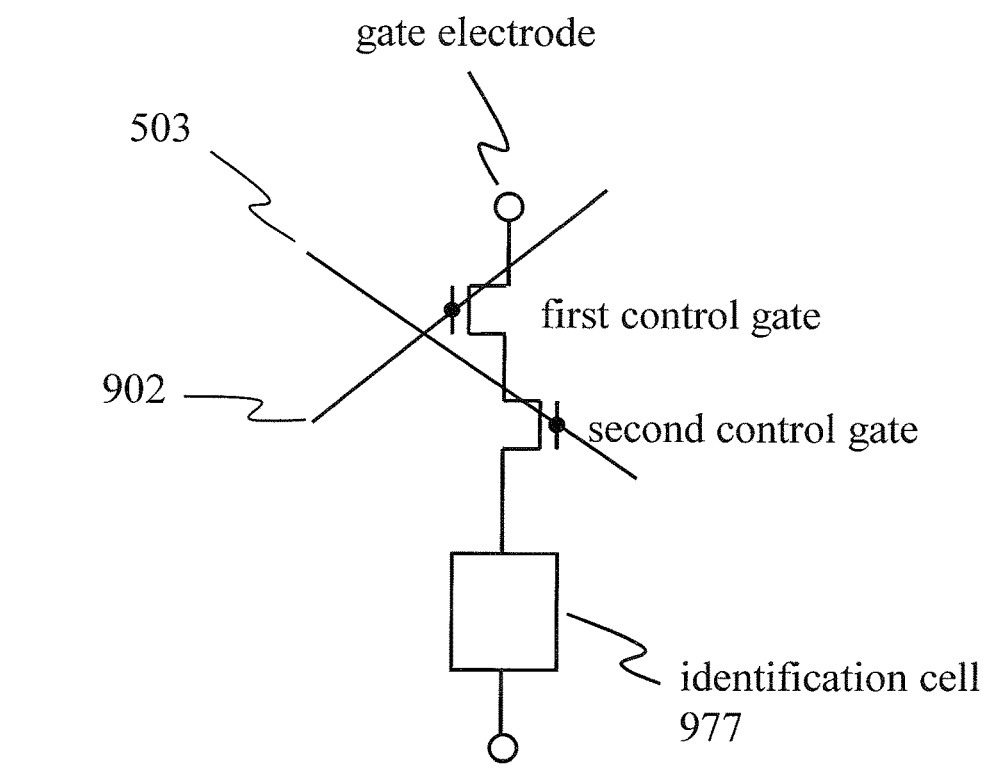
FIG. 31 shows an example of the method of accessing the identification cell of the present invention.

FIGS. 30 and 31 are other examples for accessing the identification cell 977 by using a bit line 902 and a word line 503. In FIG. 30, the second control gate connecting to the selected bit line 902 is turned on and the first control gate connecting to the selected word line 503 is turned on. Thus, the identification cell 977 on the cell array may be selected. In FIG. 31, the first control gate connecting to the selected bit line 902 is turned on and the second control gate connecting to the selected word line 503 is turned on. Thus, the identification cell 977 on the cell array may be selected. Anyway, the concrete examples of the identification cell 977 here are similar to the above and then the detailed description may be omitted.

Anyway, a physically-random identification which is secured by a semiconductor chip may be obtained from a cell array having identification cells 977, word lines 503 and bit line 902 like this.

An example of this is concretely described below.

At first, a word line is selected by a word line decoder. A bit line is selected by a bit line decoder. An identification cell associated to the selected word line and bit line is a selected cell. As shown in FIG. 17, if the word lines are along the column direction and the bit lines are along the row direction, the word line decoder is a column decoder and the bit line decoder is a row decoder. As shown in FIG. 18, if the word lines are along the row direction and the bit lines are along the column lines, the word line decoder is a row decoder and the bit line decoder is a column decoder.

Figure 32:
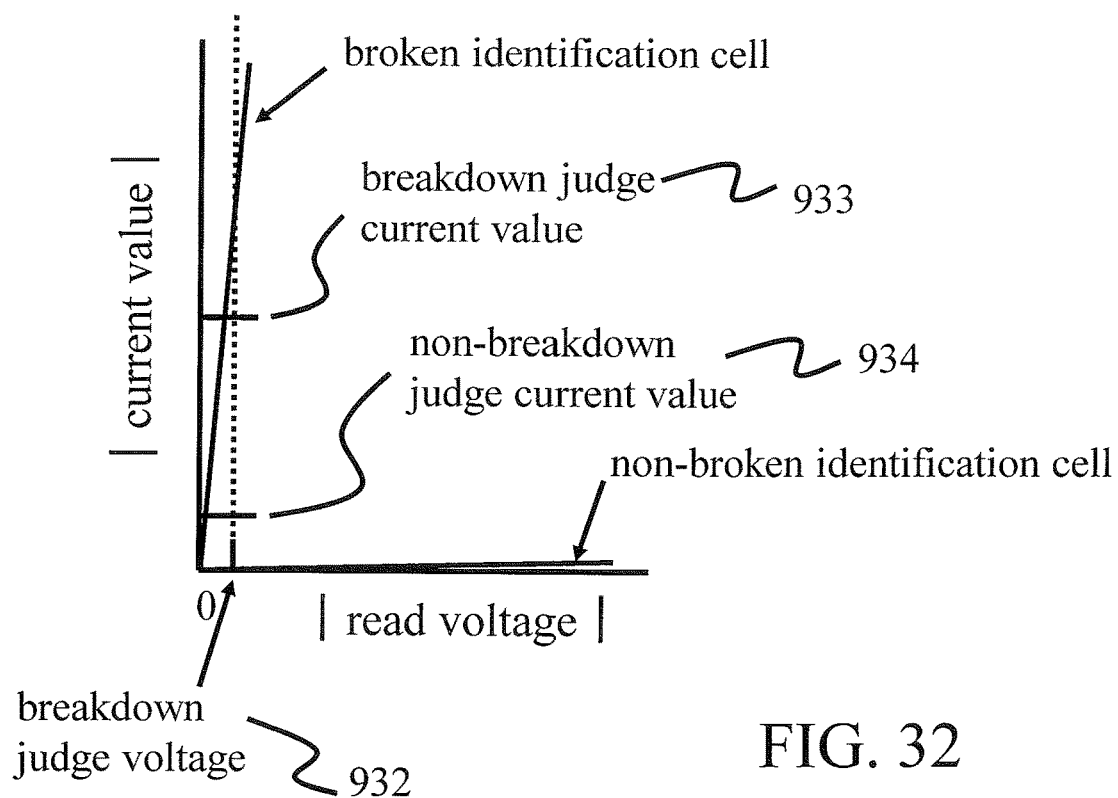
FIG. 32 shows an example of the method of judging if the identification cell is broken or non-broken.

There are two types of identification cells. In the first kind, as shown in FIG. 32, if a cell is broken, the current flows easily through the cell when a read voltage is applied. Otherwise, the current flows hardly through. Accordingly, to judge if the cell is broken or not, it may be checked if the absolute value of the current flowing through the cell is higher than the breakdown judge current value 933 or lower than the non-breakdown judge current value 934 when the breakdown judge voltage 932 is applied.

Figure 33:
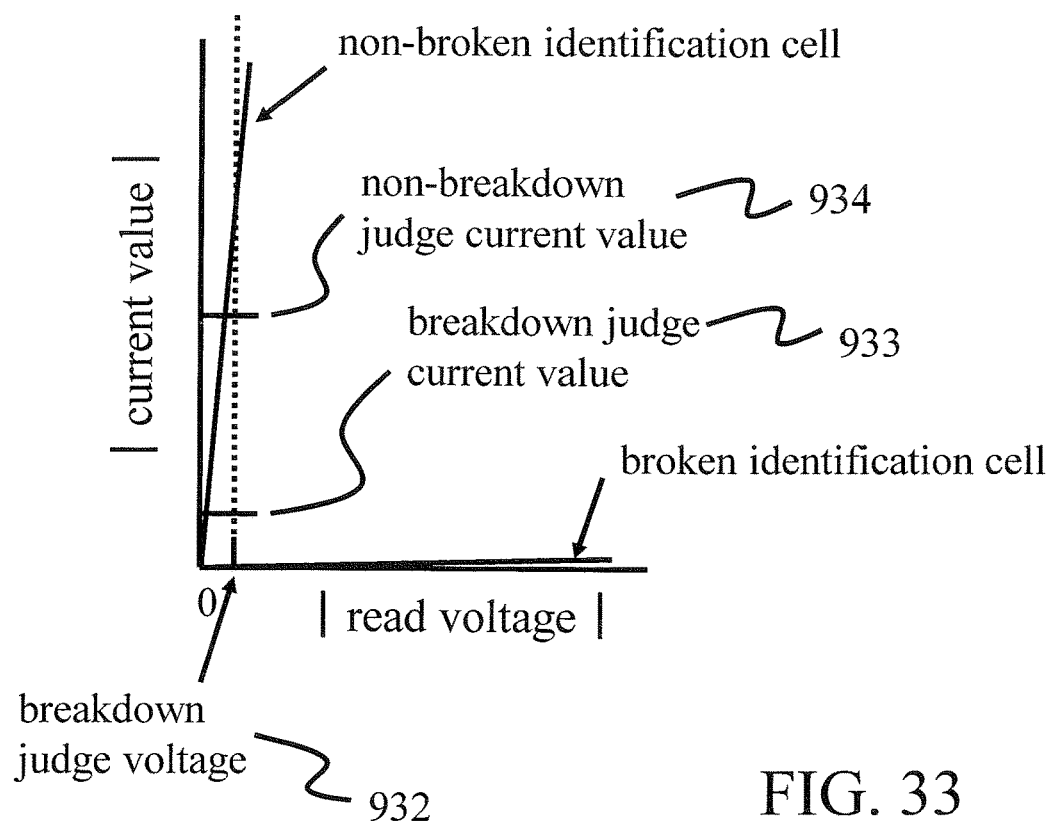
FIG. 33 shows an example of the method of judging if the identification cell is broken or non-broken.

In the second kind, as shown in FIG. 33, if a cell is broken, the current flows hardly through the cell when a read voltage is applied. Otherwise, the current flows easily through. Accordingly, to judge if the cell is broken or not, it may be checked if the absolute value of the current flowing through the cell is higher than the non-breakdown judge current value 934 or lower than the breakdown judge current value 933 when the breakdown judge voltage 932 is applied.

The address of the bit cell having an identification cell judged as broken (broken bit) is a sequence with word line number and bit line number. (In FIGS. 17 and 18, it may be represented by a set of the row number i and the column number j, (i, j).) In general, a plurality of broken bits may be found by selecting a plurality of cells from a group of identification cells on the cell array and reading them with the manner shown in FIG. 32 or 33. A code (physical random number code) is obtained by expressing the aligned addresses of those broken bits by code. For example, it may be (i1, j1) (i2, j2) (i3, j3) . . . . Alternatively, it may be aligned binary notation of the row numbers and the column numbers. As long as the generation of broken bits is physically random, a physical random number code may be obtained, which is secured by a semiconductor chip and physically random.

The number of broken bits is R and the number of selected cells is Q, where R is an integer smaller than Q. The number of cases of physical random number code is identical to the number of cases of selecting R among Q. In other words, the number of cases of physical random number code may be extremely large, if Q is sufficiently large and the ratio of broken bits is not ignorably small. The physical random number code may be converted to, in an appropriate format, a physical address of an identification chip. Alternatively, the physical random number code itself may be a physical address of an identification chip.

The Q is 1 G (one billion) and the R is 1 K (one thousand). The number of cases of physical random number code may be about 2.5 times 10 to the power of 6,432. It is noted that the number of cases of physical random number code is identical to the number of cases of physical addresses. When one trillion identification chips (10 to the power of twelves) are manufactured, which is necessary for trillion nodes, the to possibility that any two different identification chips have an identical physical address by chance will be the inverse of 2.5 times 10 to the power of 6,420 (4E-6,421). Even if the number of the identification chips is increased to be 100 trillion, the possibility that any two different identification chips have an identical physical address by chance would be four times 10 to the power of −6,419 (4E-6,419). This is practically almost zero.

Moreover, 1 G Q and 1 K R is identical to the failure rate of one over one million. That is, even if the bit failure rate of the identification chip is lower than the six sigma (less than 3.4/one million), the possibility that any two different identification chips have an identical physical random number code by chance is regarded as almost zero.

Moreover, according to the idea of the six sigma (less than 3.4/one million), there may not be any problem that 1 K bits are used for a different aim, which is equivalent to one over one million in 1 G bits chip products. Accordingly, 1 K bits may be allocated to identification cells. A half of those cells may be broken by applying a certain stress to the cell array for the identification cells. In this case, the number of cases of physical random number code is 2.7 times 10 to the power of 299. It is noted that the number of cases of the physical random number code is identical to the number of cases of physical addresses. Even if 100 trillion identification chips are distributed, the possibility that any two different identification chips have an identical physical address by chance would be 2.7 times 10 to the power of −285 (3.7E-286). This is practically almost zero.

The stress may be various such as including electrical stress, optical stress, mechanical stress, electro-magnetic stress, and so forth.

In an example that electrical stress is applied, at first, the whole cell array for the identification cells is selected simultaneously and then all of those cells are given a first high voltage pulse. Next, each cell is read. If the number of non-broken bits is smaller than the number of broken bits, only the non-broken bits are selected and a second high voltage pulse may be applied to them. This procedure may be repeated until the number of non-broken bits is identical to the number of broken-bits.

In an example that optical stress is applied, x-ray or ultra-violet ray may be irradiated to the cell array for identification cells before the assembling. The quantity of irradiation may be tuned to make the numbers of non-broken and broken bits are almost identical. However, the stress may also be applied to the cell arrays other than that of identification cells. It may be a useful method, if the whole chip is used for the cell array of identification cells.

In an example that mechanical stress is applied, an identification chip may be bent. However, the stress may also be applied to the cell arrays other than that of identification cells. It may be a useful method, if the whole chip is used for the cell array of identification cells.

In an example that electro-magnetic stress is applied, the identification chip may be exposed to a strong electro-magnetic field. However, the stress may also be applied to the cell arrays other than that of identification cells. It may be a useful method, if the whole chip is used for the cell array of identification cells.

Moreover, it may be preferred to tune the process target in semiconductor chip manufacturing process, such that more failures are generated. As an example, in the case that an identification cell has a transistor, as shown in FIGS. 23-29, the channel resistance may be increased by tuning the ion implantation condition to increase the threshold voltage (Vth). Alternatively, in example that an identification cell has a transistor, as shown in FIGS. 23-29, the gate capacitance of the transistor may be increased. For example, the thickness of gate insulating film may be increased, a dielectric having lower dielectric constant may be inserted into the gate capacitor, the gate area may be decreased and so forth. Alternatively, in the case that another capacitor is also included in the identification cell with a transistor, as shown in FIG. 24, the capacitance of the capacitor may be decreased. For example, the thickness of the insulating film may be increased, a dielectric having lower dielectric constant may be inserted into the capacitor, the capacitor area may be decreased and so forth.

Moreover, in the case that an identification cell has a transistor, as shown in FIGS. 23-29, it may be preferred to vary circuit parameters of circuits to be printed in a semiconductor chip, such that more failures are generated. As an example, a switching resistance of an identification cell may be reduced by decreasing a potential of a selected line such as a word line. Alternatively, the generation rate of failures may be increased by shortening the duration to detect data to be read. Anyway, the addresses where those failures are to be generated may be stored in an inner special memory.

Anyway, as long as an identification cell breaks probabilistically, the physical random number code is physically-randomly generated. In addition, as long as the possibility that any two different identification chips have an identical physical random number code is practically zero, those identification chips are valid. Such a physical random number code may be adopted in the identification device, as shown in FIG. 14.

Like this, it may be possible to generate a physical random number code by intentionally randomly breaking the identification cells. This physical random number code is adopted in FIG. 14 to generate a physical address with a certain method. More concretely, a secret key generated from this random number code may be regarded as a physical address.

Sixth Embodiment

Among some memory chip products, taking into account that fail bits occur among memory cells with a rate lower than a designed rate, a redundant bit line is saved to take a place of a bit line which has fail bit. The reason for fail bits like this is various and diverse such as, the manufacturing variation in manufacturing process or the components' dispersion spontaneously generated during forming process. Those redundant bit lines is not included into the bit quantity of the memory products usually. Meanwhile, a bit is defined as information quantity which is equivalent to 2-values. If an identification cell may have a value of 0 or 1, the identification cell may have information quantity by 1-bit. The fail bit means that it is unable to read the information quantity of 1-bit from the identification cell under consideration owing a certain reason.

Strictly speaking, the broken bits having been artificially generated should be distinguished from the fail bits that may or may not be generated artificially. However, they are similar in that they are different from neither broken bits nor fail bits. In short, a bit may be called a fail bit which is generated artificially or non-artificially, as long as it exhibits the characteristic with a deviation more than a predetermined range.

It is not always necessary to replace a bit line with a fail bit by a redundant bit line, as mentioned above. For example, the cell array is divided into a plurality of sub-blocks so as to replace a sub-block with another.

Figure 34:
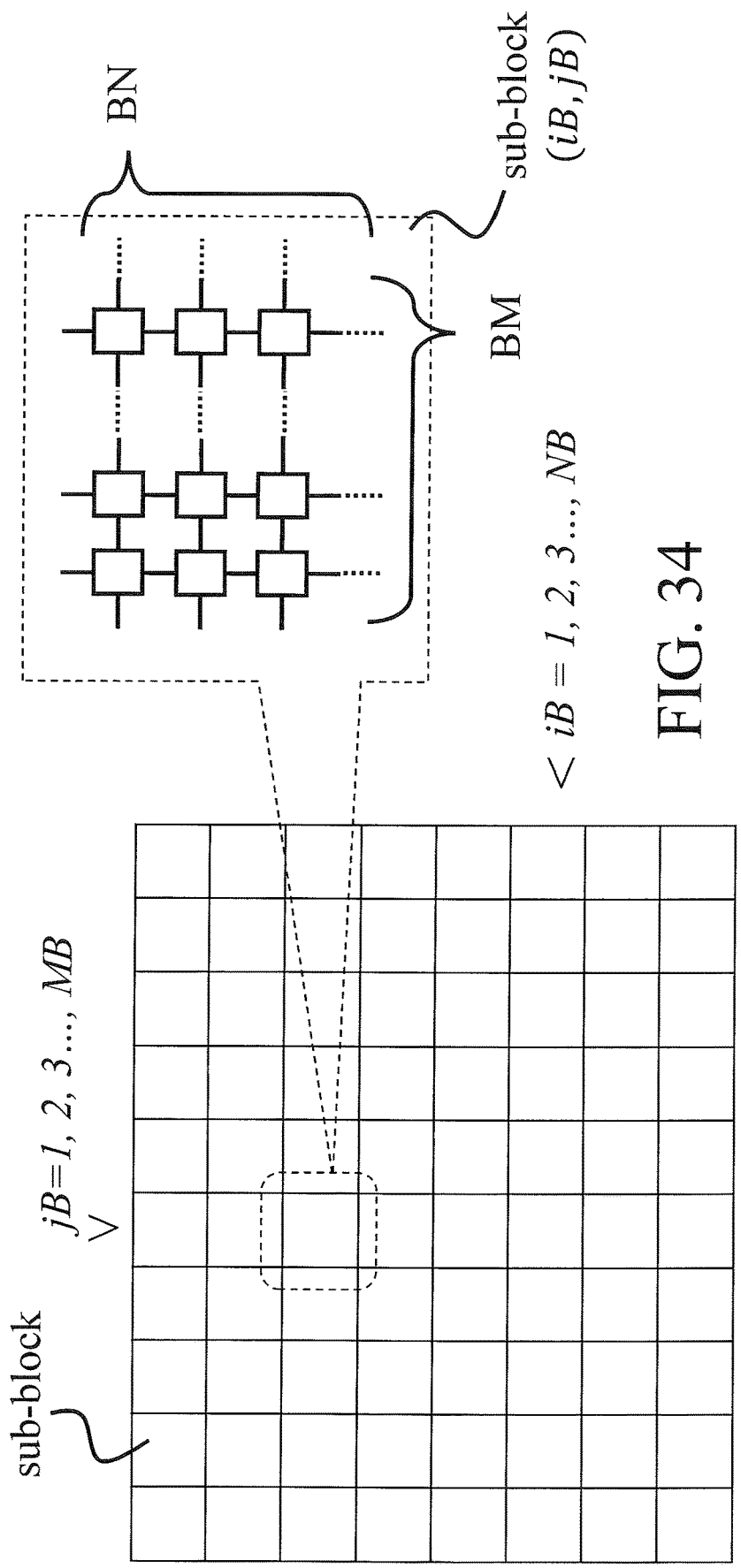
FIG. 34 shows an example of the method of dividing the cell array into a plurality of sub-blocks.
Figure 35:
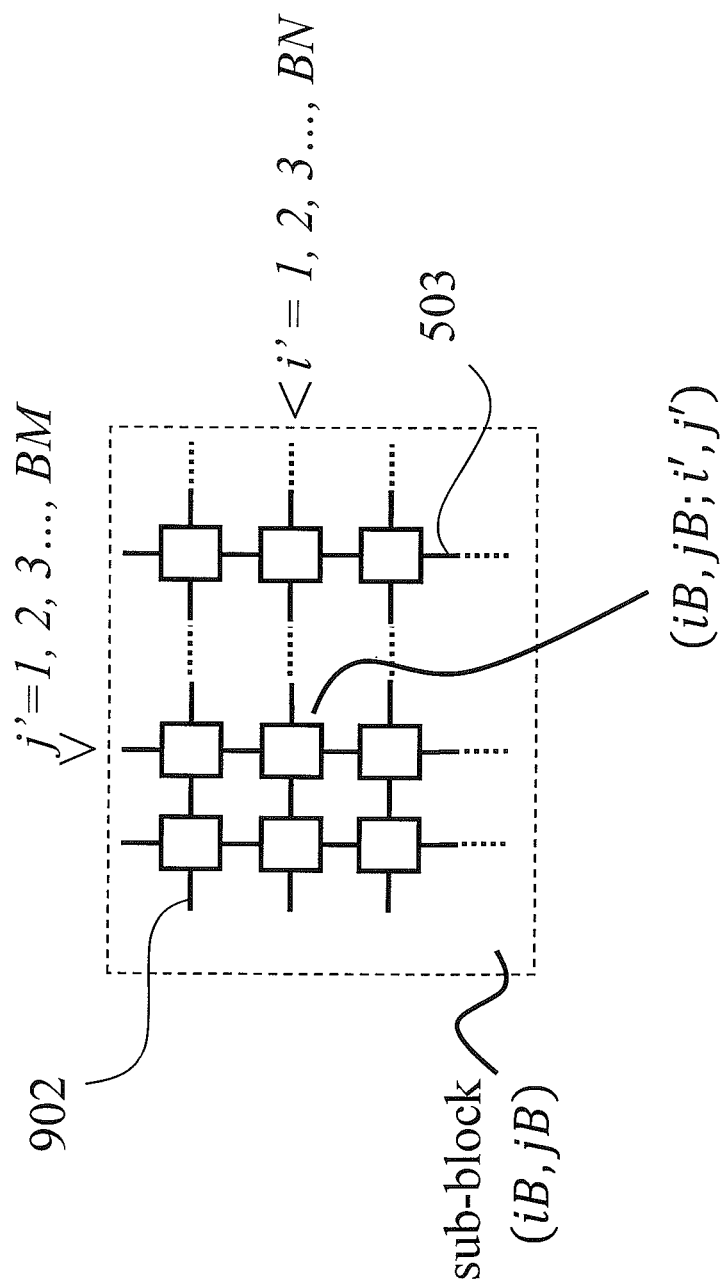
FIG. 35 shows an example of the configuration of sub-block.

As shown in FIG. 34, the cell array in FIG. 17 or 18 (N rows and M columns) in which the identification cells of the present disclosure are arrayed may be divided into a plurality of sub-blocks having BN rows and BM columns. Those sub-blocks respectively include a designed number of identification cells (the multiplication of BN and BM). The row lines which respectively correspond to the addresses of the sub-block (block address) are called block row lines and the number of the block row lines is NB. The column lines which respectively correspond to the addresses of the sub-block are called block column lines and the number of the block column lines is MB. The group of the block row lines and the group of the block column lines together form a block array, and the group of the block row lines and the group of the block column lines intersect and from crosspoints. That is, there are a plurality of sub-blocks on the cell array having the NB row lines and the MB column lines. To select a block address is to designate the corresponding row and column numbers. However, the multiplication of NB and BN is N. The multiplication of MB and BM is M. Similar to FIG. 17, in the case that the bit lines are along the row axis and the word lines are along the column axis, the bit lines are along the row axis and the word lines are along the column axis also in the sub-block, as shown in FIG. 35. Similar to FIG. 18, in the case that the bit lines are along the column axis and the word lines are along the row axis, the bit lines are along the column axis and the word lines are along the row axis also in the sub-block, as shown in FIG. 36.

Figure 36:
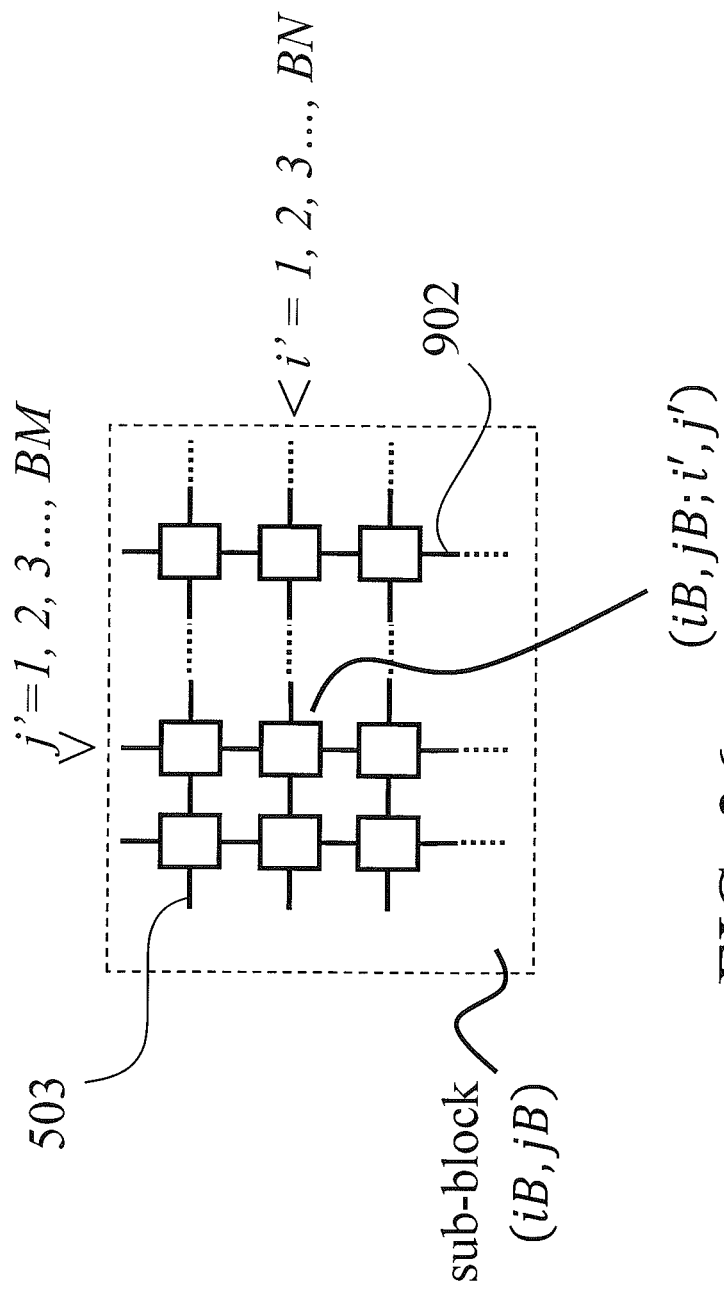
FIG. 36 shows an example of the configuration of sub-block.
Figure 37:
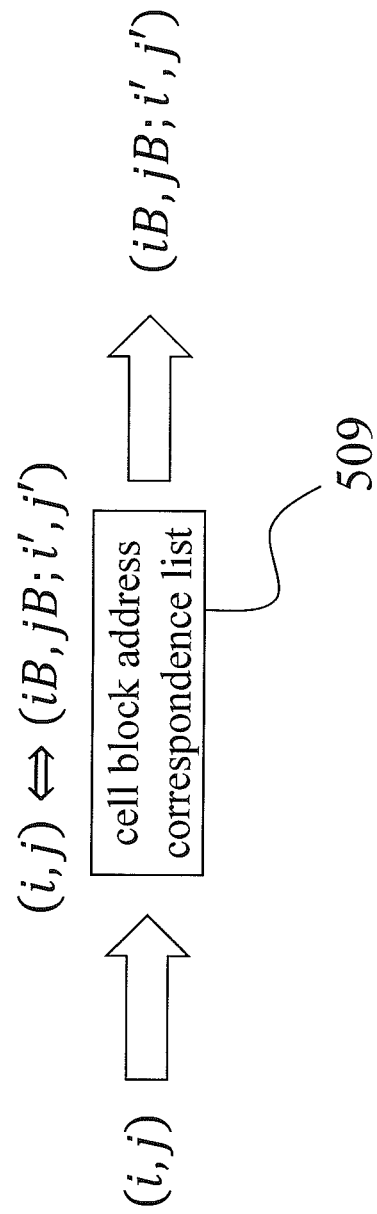
FIG. 37 shows an example of the cell block address correspondence list.

The location of the sub-block is represented by the block address (iB, jB), as shown in FIGS. 35 and 36. The inner address in sub-block (i', j') thus corresponds to (iB, jB; j') throughout the cell array. The address defined like this must uniquely correspond to the address on the cell array, that is, the cell address (i, j). The correspondence may be stored in the cell block address correspondence list 509, as shown in FIG. 37. It is preferred that the cell block address correspondence list 509 is inside the identification device of FIG. 14. Alternatively, it is preferred that the cell block address correspondence list 509 is in the identification core 10000 of FIGS. 13 and 16.

Figure 38:
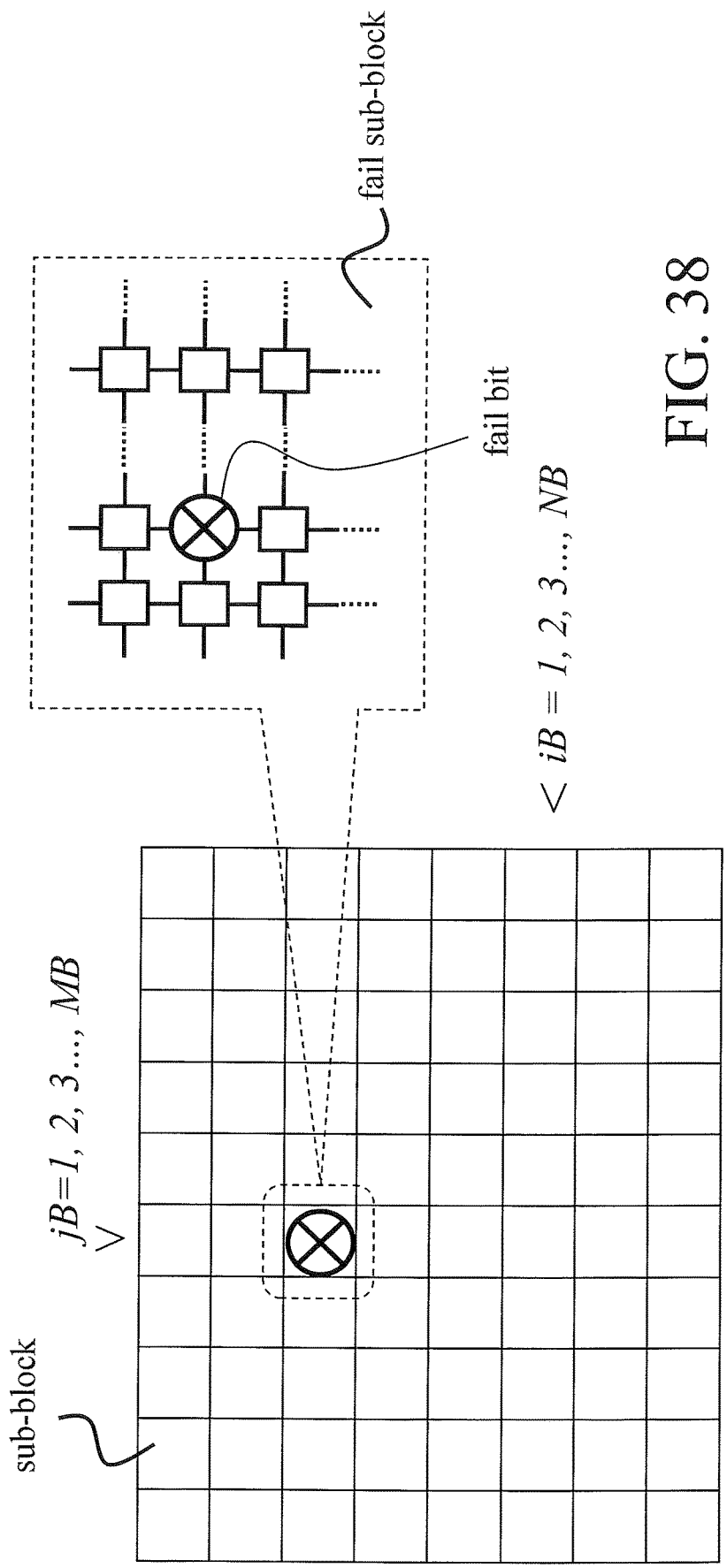
FIG. 38 shows an example of fail sub-block.
Figure 39:
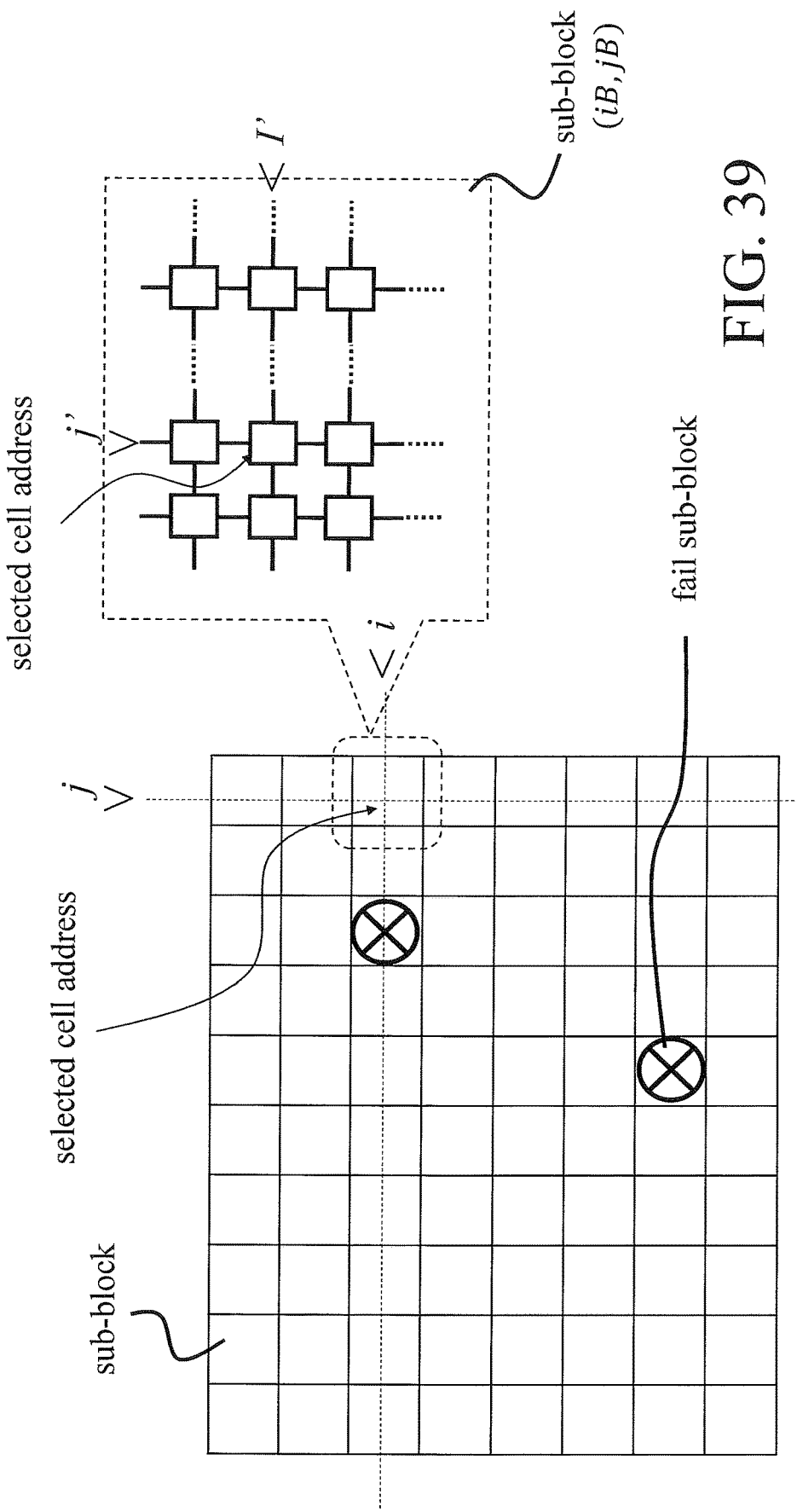
FIG. 39 shows an example of accessing an address in a sub-block.
Figure 40:
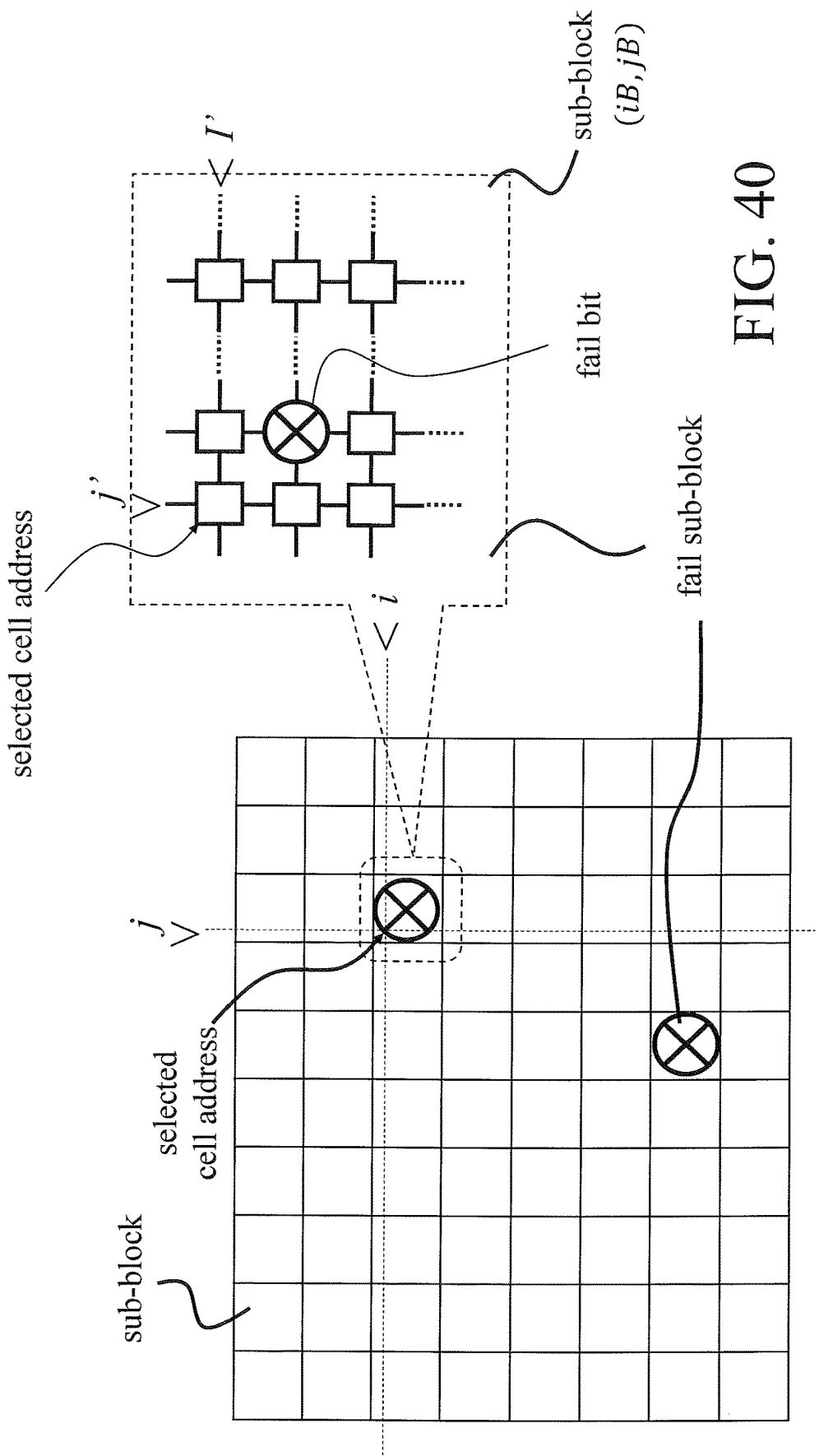
FIG. 40 shows an example of accessing an address in a sub-block.
Figure 41:
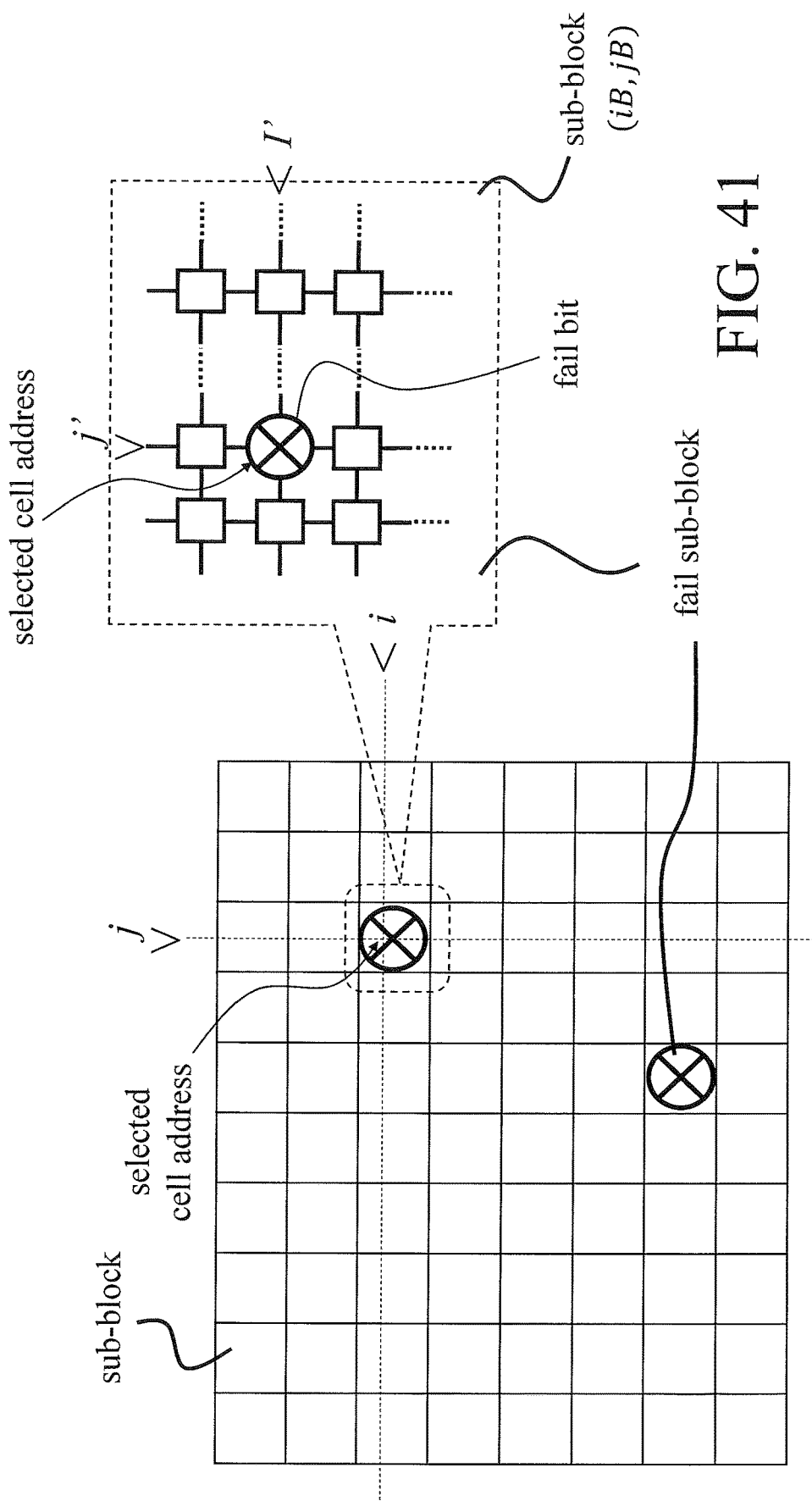
FIG. 41 shows an example of accessing an address in a sub-block.

In the case that a fail bit is found at the cell address (i, j) on the cell array, the cell address is included in a sub-block (iB, jB) by chance. The sub-block located at the block address (iB, jB) is a fail sub-block. FIG. 38 shows the example in which a fail sub-block exists. FIGS. 39-41 are the examples in which two fail sub-blocks exist. Although not explicitly described since it may be self-evident, the number of fail sub-blocks may be larger than two, as long as it is smaller than or equal to the multiplication of MB and NB.

In FIG. 39, a cell address (i, j) is selected on the cell array. According to the cell block address correspondence list 509, this cell address (i, j) corresponds to (iB, jB; i', j'). That is, the inner address (i', j') of the sub-block (iB, jB) is selected. It is noted that this sub-block has no fail bit therein. The sub-block like this (with no fail bit) is called a regular sub-block.

In FIG. 40, a cell address (i, j) is selected on the cell array. According to the cell block address correspondence list 509, this cell address (i, j) corresponds to (iB, jB; i', j'). That is, the inner address (i', j') of the sub-block (iB, jB) is selected. It is noted that this sub-block has a fail)) bit at another inner address in the sub-block. Even though a fail bit is not selected, this sub-block is a fail sub-block.

In FIG. 41, a cell address (i, j) is selected on the cell array. According to the cell block address correspondence list 509, this cell address (i, j) corresponds to (iB, jB; j'). That is, the inner address (i', j') of the sub-block (iB, jB) is selected. It is noted that the selected identification cell is a fail bit. Thus, with or without another fail bit at another inner address in the sub-block, this sub-block is a fail sub-block.

Figure 42:
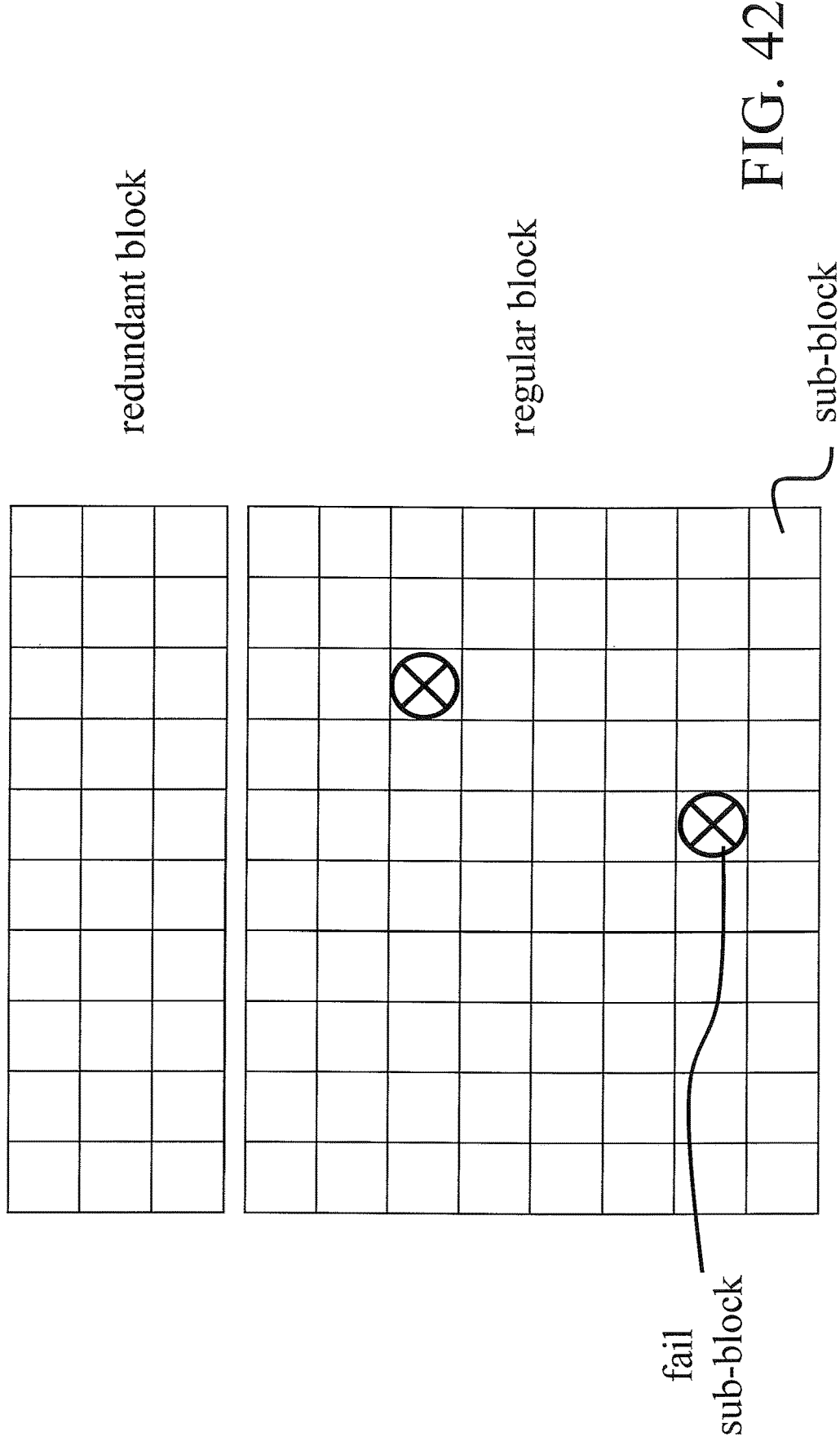
FIG. 42 shows an example of the cell array having redundant sub-blocks and regular sub-blocks.

In the case that there is a fail sub-block in the cell array, the group of sub-blocks is divided into the redundant block and the regular block, as shown in FIG. 42. The redundant block is not included into the bit quantity of chip products having the cell array. The bit quantity of this chip product is evaluated with the number of bits included only into the regular block.

If a fail bit is found in the regular block in the pre-shipment inspection, which may or may not be generated artificially as long as it exhibits the characteristic with a deviation more than a predetermined range, a block address of a sub-block including a fail bit, (iB, jB), may be allocated to a block address (redundant iB, redundant jB) of a sub-block in the redundant block (redundant sub-block). That is, in the case that a cell address included in the fail sub-block (iB, jB; j') is selected, the inner address of the redundant sub-block allocated corresponding to the fail bit (redundant iB, redundant jB; j') is re-selected. This procedure is called the replacement.

As a result of the pre-shipment inspection, the number of the replaced sub-blocks is not always one. Then, those replaced ones may be numbered according to the order of the replacement. As an example shown in FIG. 43, the scanning method of sub-blocks in the regular block may be in the order regarding as a single stroke from the top-left therein. The scanning method of sub-blocks in the redundant block may be in the order regarding as a single stroke from the bottom-left therein. In FIG. 44, the replacements are numbered according to this scanning method.

Figure 45:
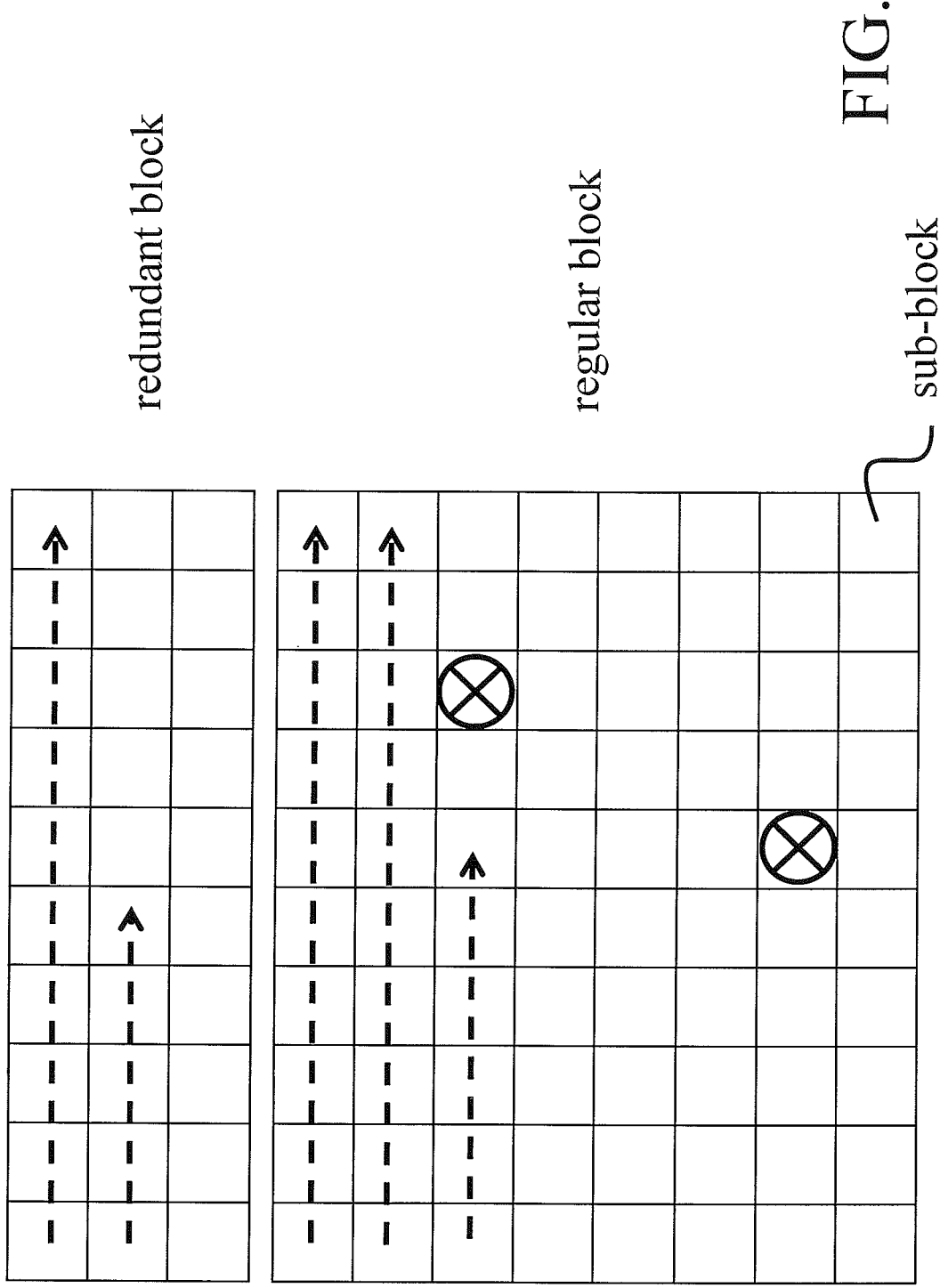
FIG. 45 shows an example of respectively scanning the redundant block and the regular block.
Figure 46:
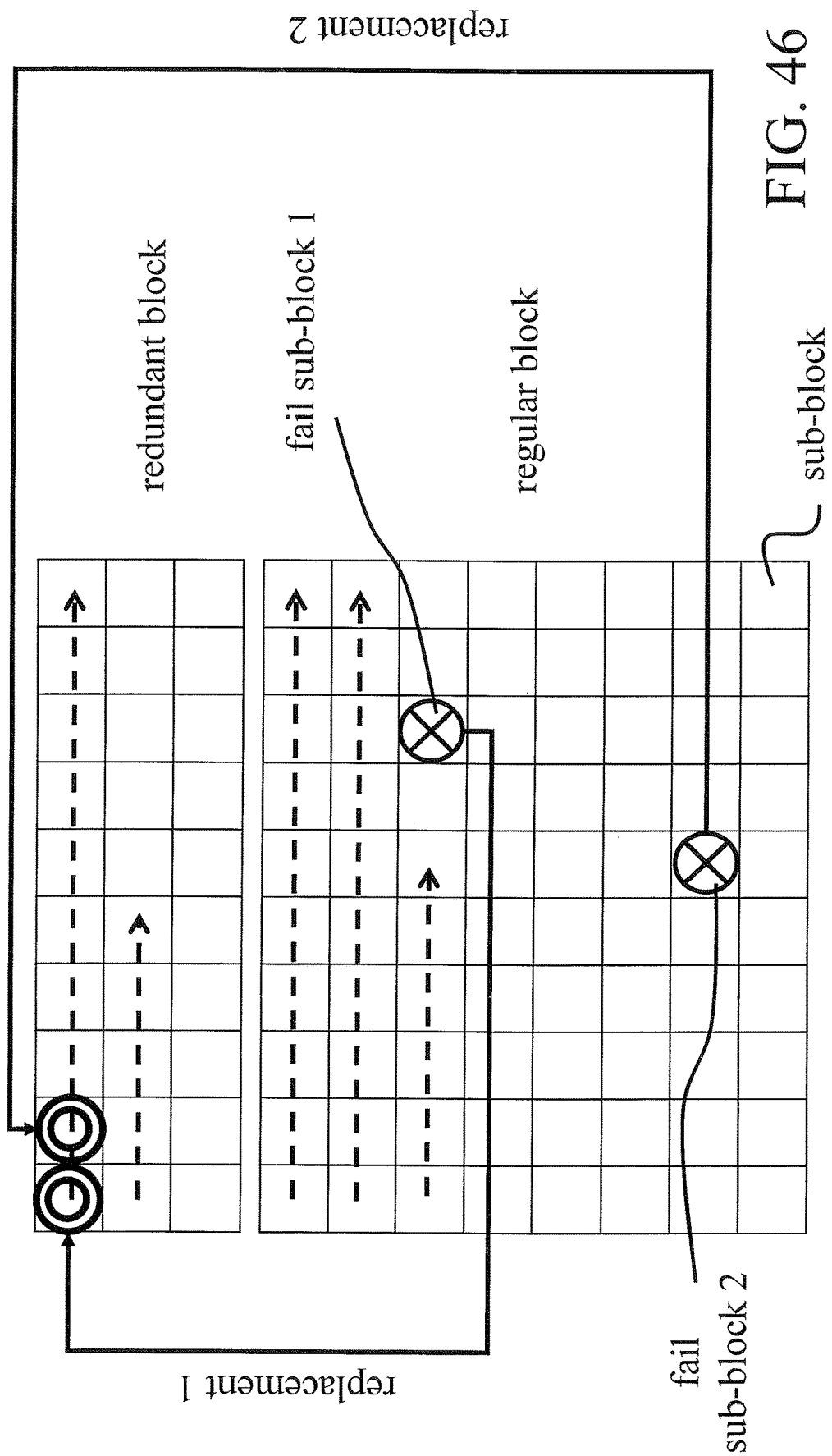
FIG. 46 shows an example of replacing a fail sub-block in the regular block to a sub-block in the redundant block.

As another example shown in FIG. 45, the scanning method of sub-blocks in the regular block may be in the order along the row axes therein. The scanning method of sub-blocks in the redundant block may be in the order along the row axes therein. In FIG. 46, the replacements are numbered according to this scanning method.

Actually, the number of fail sub-blocks is not always two. It may be less or equal to the number of the redundant sub-blocks in the redundant block. However, the number of the redundant sub-block in the redundant block is assumed to be smaller than the number of sub-blocks in the regular block.

Figure 43:
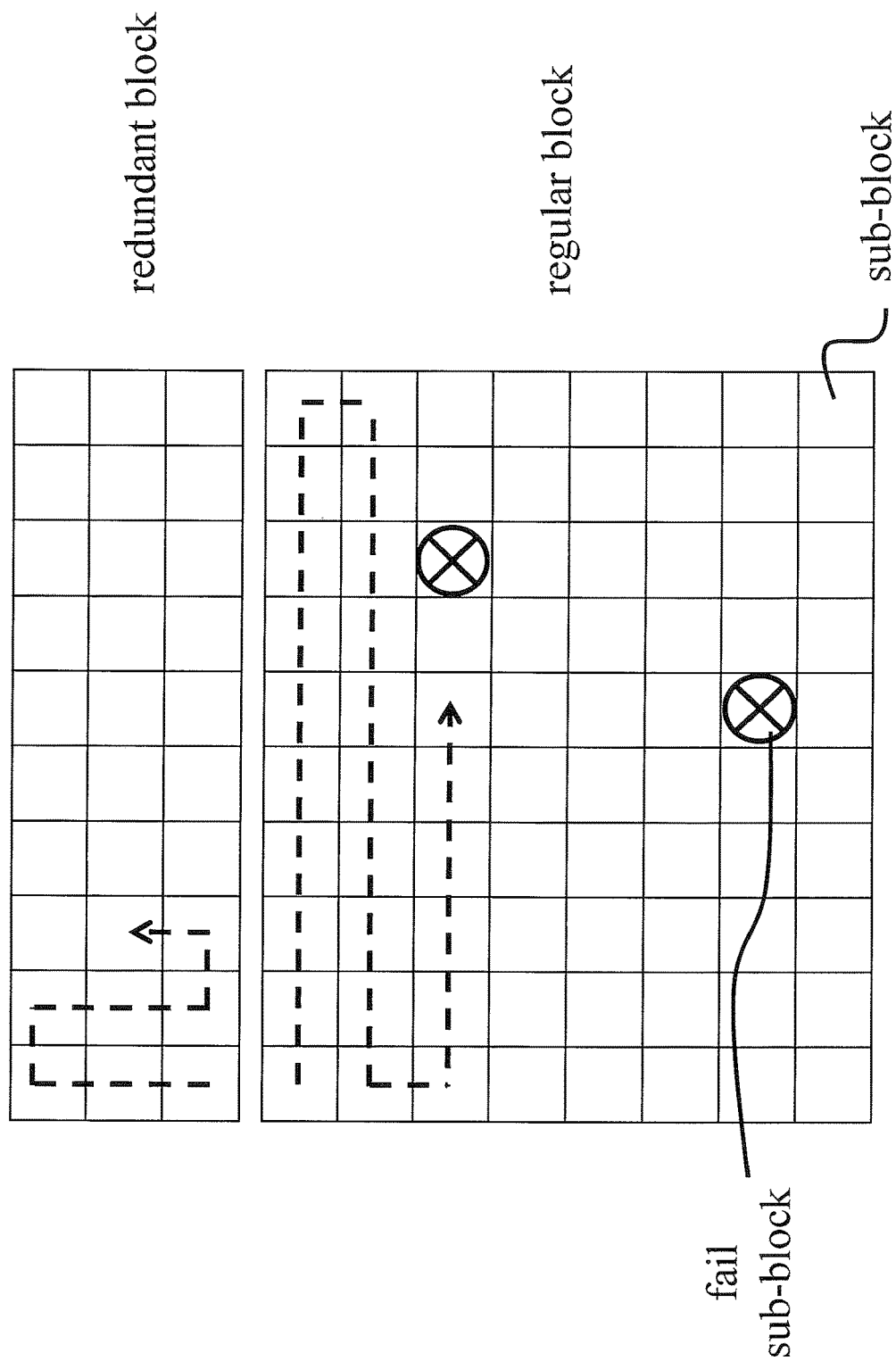
FIG. 43 shows an example of respectively scanning the redundant block and the regular block.
Figure 44:
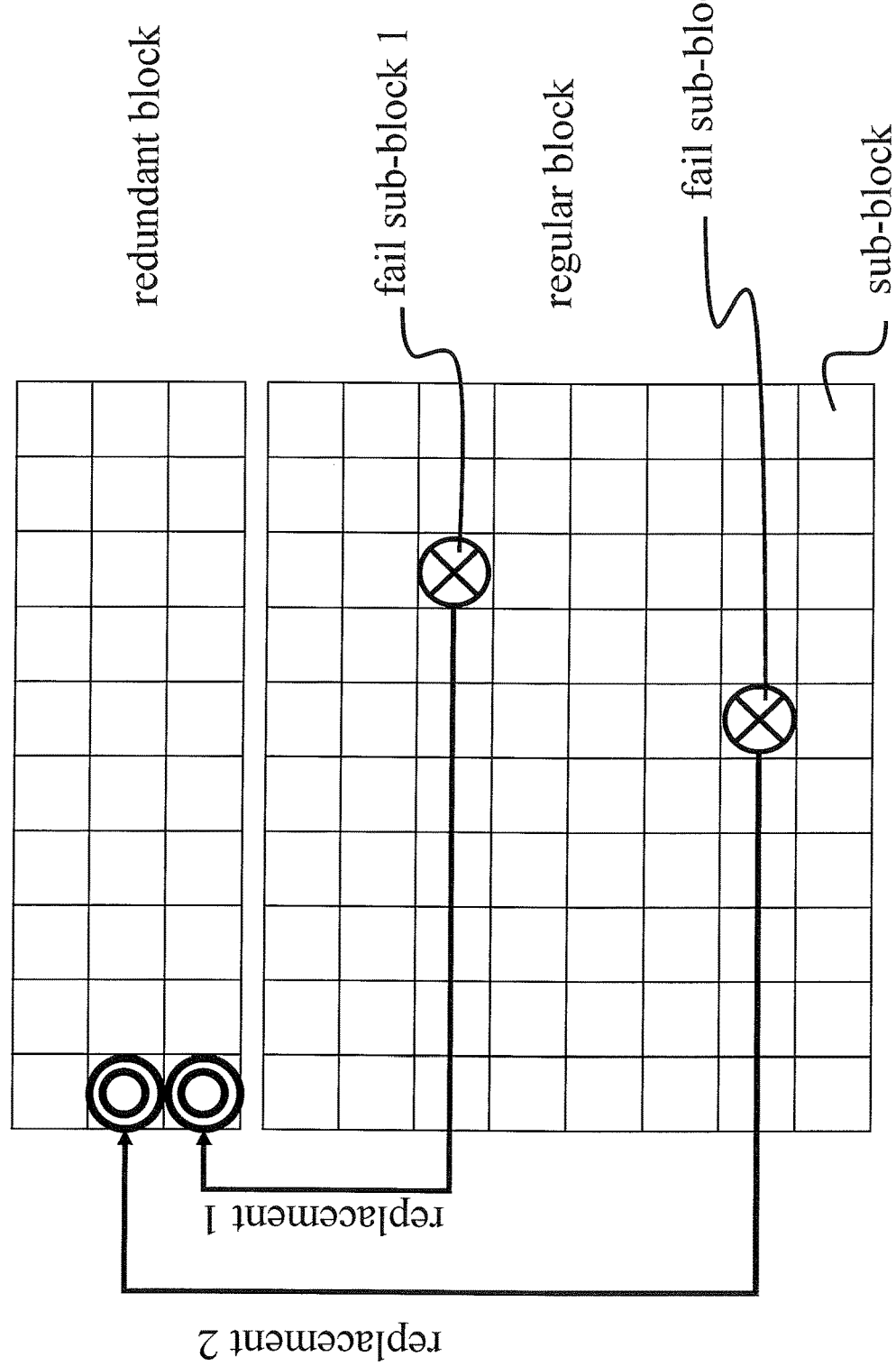
FIG. 44 shows an example of replacing a fail sub-block in the regular block to a sub-block in the redundant block.

There may be more block scanning methods of the pre-shipment inspection other than those shown in FIGS. 43 and 45. They may have certain characteristics. However, as long as the regular and redundant blocks are independently scanned while the scanning of the regular block has the priority, any variation of the scanning may be possible. More specifically, a possible procedure is provided as follow.

1) Scan the regular block and then select the sub-blocks in the regular block in a predetermined order.

2) Suspend the scanning of the regular block if a fail sub-block is found in the regular block.

3) Execute the scanning of the redundant block, and then select sub-blocks in the redundant block according to a predetermined order. If an un-replaced redundant sub-block is found, the block address of the fail sub-block is replaced with the block address of this redundant sub-block.

4) Suspend the scanning of the redundant block.

5) Return to step 1) after completing the replacement and then re-start the scanning of the regular block.

After that, steps 2)-5) are repeated. Then, the replacement is iterated until the all sub-blocks in the regular block are selected. However, the number of the redundant sub-blocks is assumed to be larger than or equal to the number of fail sub-blocks. If this condition is not satisfied, the inspected chip may be regarded as disqualified for being a product by the inspection.

FIG. 44 shows the result after completing the replacements of the example of FIG. 42 according to the scanning method shown in FIG. 43. FIG. 46 shows the result after completing the replacements of the example of FIG. 42 according to the scanning method shown in FIG. 45.

In order to execute the replacement as mentioned above, it is necessary to record the block addresses of the fail blocks and the block addresses of the redundant sub-blocks to be respectively allocated to those fail sub-blocks. Practically, it is possible for the inner special memory to record, with the inner special memory embedded into a peripheral area in the semiconductor chip.

Alternatively, another example is provided as follow.

1) Scan the regular block and then select the sub-blocks in the regular block in a predetermined order.

2) At the moment that a fail sub-block is found in the regular block, record the block address at which the fail sub-block is found with a test equipment or with an inner register of a memory product, and then execute the scanning through the whole of the regular block.

3) Scan the redundant block and then select the sub-blocks in the redundant block in a predetermined order.

4) At the moment that a fail sub-block is found in the redundant block, record the block address of the selected redundant sub-block to be used to replace the fail sub-block with a test equipment or with an inner register of a semiconductor chip.

However, it is assumed that the number of the redundant sub-blocks is larger than or at least equal to the number of the fail sub-blocks. If this condition is not satisfied, the corresponding chip is regarded as disqualified for being a product.

Based on the fail sub-block information recorded in the test equipment or in the inner register of the semiconductor chip, the fail sub-block information is recorded in an inner special memory embedded into the semiconductor chip.

There is a plurality of fail sub-blocks. The aggregation of the block addresses of the fail sub-blocks {(iB, jB)} is physically random and secured by the identification chip. Accordingly, it may be regarded as a physical random number code being secured by the chip. The physical random number code is converted to a code in an appropriate format so as to generate a physical address of an identification chip. Alternatively, it may also be allowed to regard the physical random number code as a physical address of an identification chip.

DRAM may be considered as a memory chip product to generate a physical random number code related to the present embodiment. In other words, it is possible to adopt a mass-product DRAM chip as an identification chip with no tune-up. In addition, it may also be possible to similarly adopt as an identification chip, a flash memory chip, a phase change random-access memory (PCRAM) chip, a resistivity change random-access memory (ReRAM) chip, a magnetic resistance change random-access memory (MRAM) chip, a spin-torque type MRAM chip, a Ferroelectric random-access memory (FRAM) chip and so forth.

The N may be the number of the regular sub-blocks forming the regular block. The m may be the number of irreversible fail sub-blocks to be found in the pre-shipment inspection. The number of the cases that those fail sub-blocks are generated from the whole regular block is the combination to select m among N, that is, C(N, m). Moreover, L may be the number of the redundant sub-blocks forming the redundant block. It may be necessary to further consider which redundant sub-block may respectively replace those fail sub-blocks, which results in the permutation that m is selected to be aligned among L. That is, the number of cases is C(N, m)P(L, m). If the number of the fail sub-block m is smaller than or equal to that of the redundant sub-blocks, the identification chip is deemed as a qualified item as memory chip product.

It is assumed that the identification chip is qualified as a memory chip product. The number of the physical random number code is the summation of C(N, L)P(L,L), C(N, L−1)P(L,L−1), C(N,L−2)P(L,L−2), . . . , C(N,2)P(L,2), C(N,1)P(L,1), and C(N,0)P(L,0). It is noted that the term with in being identical to the maximum L dominates the other terms as long as N is large enough. Then, the term C(N, L) may be the indicator of the number of cases of the physical random number code. This may be the information quantity of the physical random number code.

It is assumed that the number of the redundant sub-blocks is 3 percent of the number of the regular sub-blocks. Additionally, it is assumed that the number of the identification cells forming each sub-block is 1000. A qualified 1 Giga bit memory chip may be considered as an example here. Since the redundant block is not included into the bit quantity, the number of the regular sub-blocks is at least one million and the number of the redundant sub-blocks is 30 thousand. In other words, in the case that an identification chip is a qualified 1 Giga bit memory chip, the information quantity of the physical random number code is roughly estimated to be the number of cases that 30 thousand are selected among one million, e.g., 1.4E58,515. Since the information quantities of the physical random number code and the physical address are equivalent, the possibility that any two different identification chips have an identical physical address by chance is 7.1E-58,502, even though 100 trillion identification chips are shipped. This is practically almost zero.

In the case of a qualified 4 Giga bits memory chip, the information quantity is equivalent to the number of cases that 120 thousand are selected among 4 million. In this way, the information quantity of physical random number code is increased as the bit quantity is increased. It is self-evident that this trend is general. Even though 100 trillion identification chips are shipped, the possibility that two different identification chips have an identical physical address by chance is 6.7E-234,055. Accordingly, it is practically almost zero.

Figure 47:
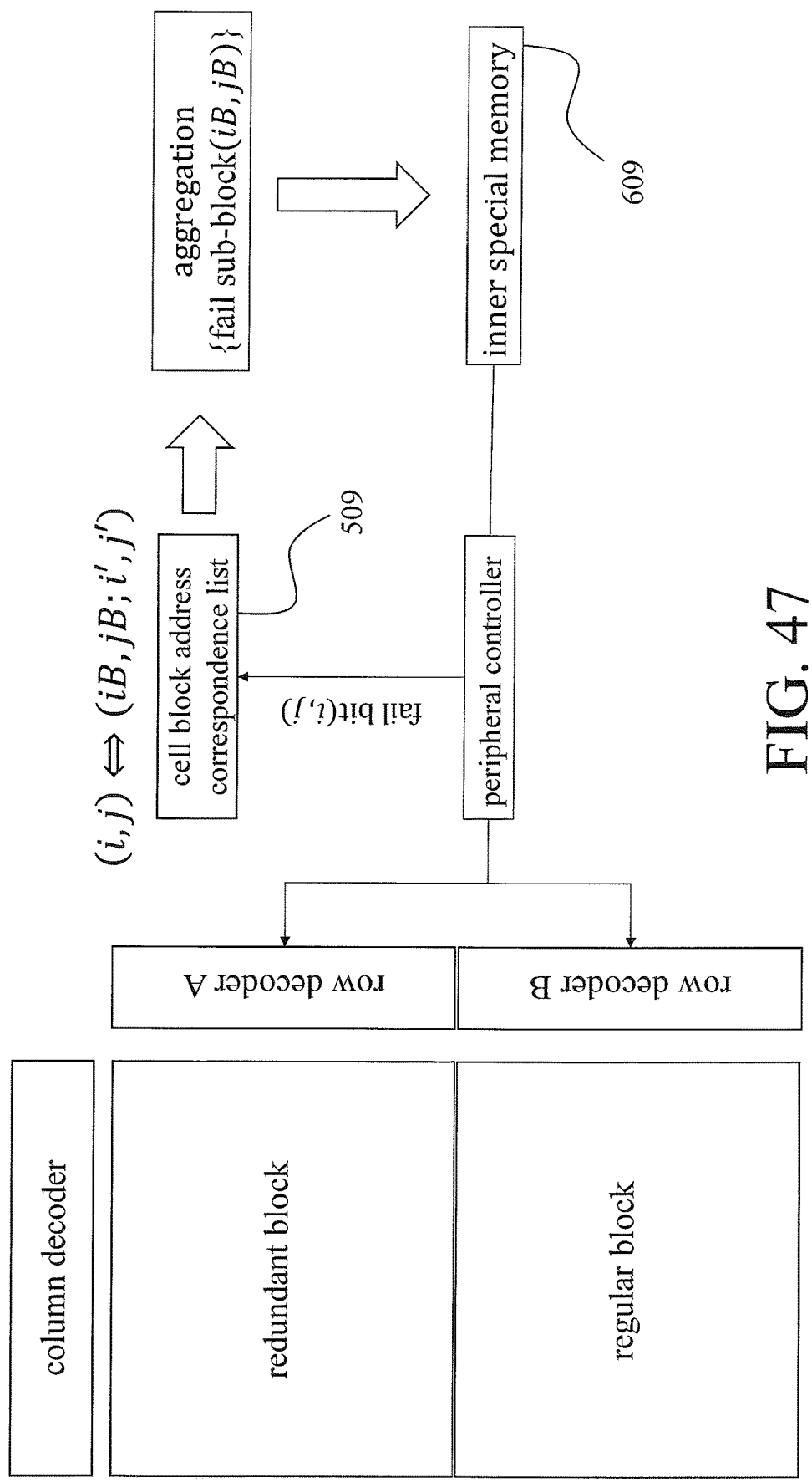
FIG. 47 is a diagrammatic view of a circuit configuration realizing the present invention.

FIG. 47 explains the concept of the circuit configuration to realize the present embodiment. A semiconductor chip of the present invention has an area for peripheral circuits at the periphery of the cell array. On the cell array, the redundant and regular blocks are layout along the column axis, and then an identical column decoder selects a selected column. The area for peripheral circuits includes the row decoder A, the row decoder B, the column decoder, the peripheral controller, the cell block address correspondence list 509, and the inner special memory 609. The row decoder A selects a selected row in the redundant block. The row decoder B selects a selected row in the regular block. Those decoders are controlled by the peripheral controller. The peripheral controller refers to the cell block address correspondence list 509 and then identifies the (iB, jB; j') corresponding to the cell address (i, j) selected by the column decoder and the row decoder B. In the case that the selected cell address (i, j) is included in a fail sub-block, the corresponding block address (iB, jB) is a fail sub-block address. Since there is a plurality of fail sub-blocks, an aggregation of fail sub-block addresses {(iB, jB)} may be obtained by searching the cell array. More specifically, in the order that a fail sub-block is found, the corresponding block address may be appended to the inner special memory 609. As mentioned above, the aggregation of those fail sub-block addresses is the physical random code being secured by the identification chip. This may be converted to the physical address with a certain code conversion.

Figure 48:
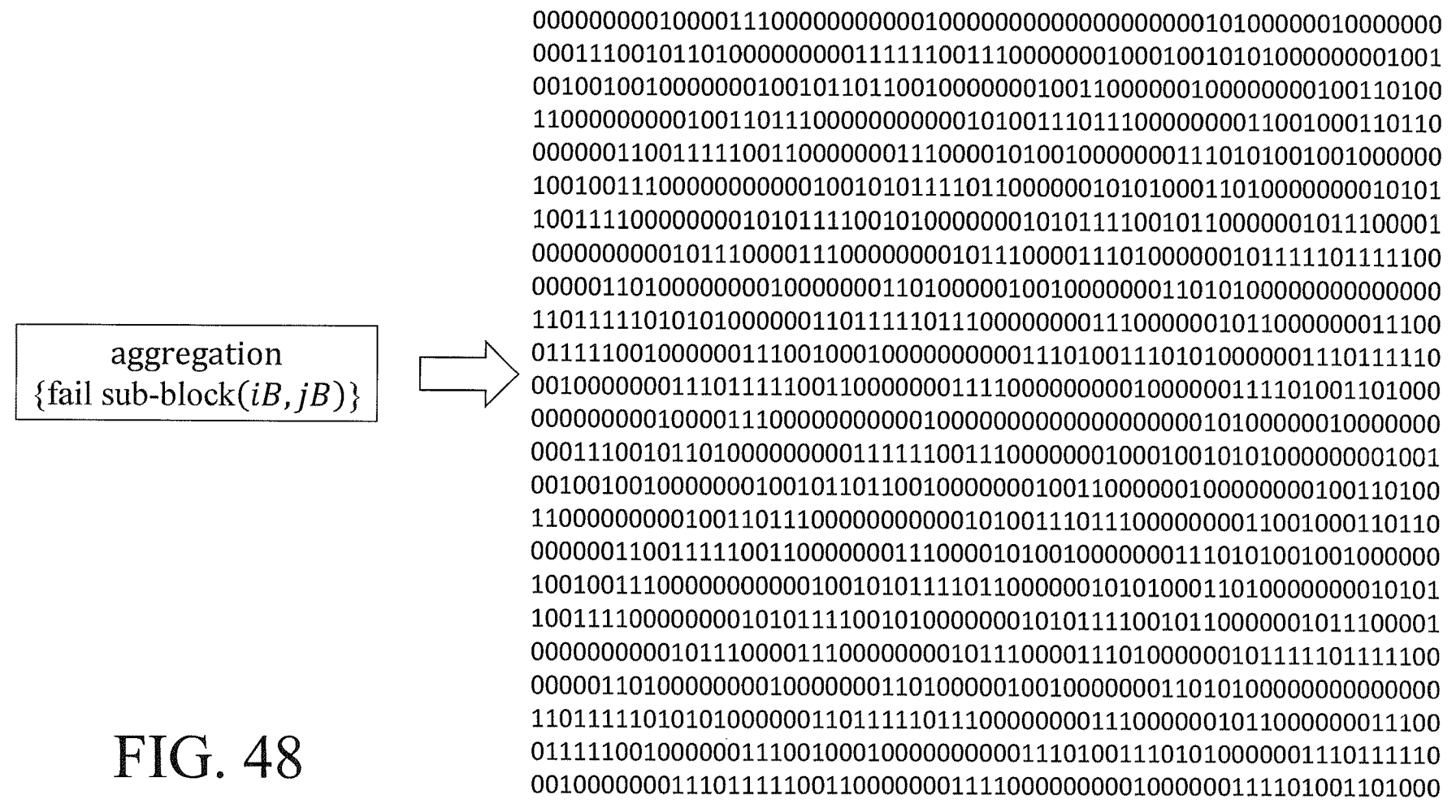

FIG. 48 is an example of physical random number code generated from an aggregation of the fail sub-block addresses. In this figure, it is represented in binary of 0 and 1. As an example, the elements of the aggregation of fail sub-block addresses {(iB, jB)} may be aligned as follows: iB1jB1iB2jB2iB3jB3iB4jB4 . . . . Furthermore, the numeric of iB1, jB1, iB2, jB2 . . . is respectively represented in binary.

Figure 49:
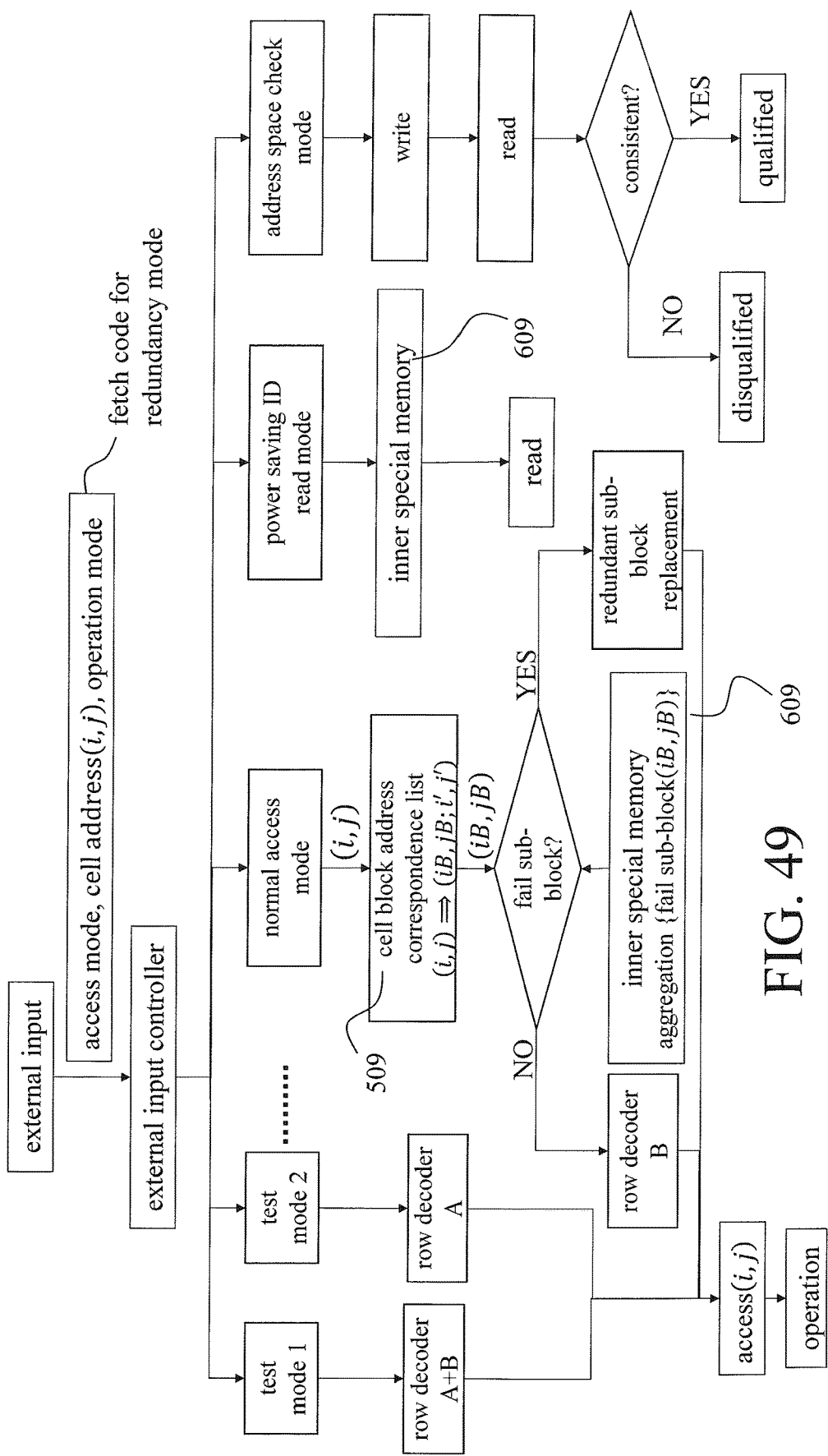
FIG. 49 is a drawing illustrating a classification of access modes to access the cell array related to the present invention.

FIG. 49 shows the classification of access modes to the cell array. A fetch code for redundancy mode is input through the external input of the chip. The redundancy mode includes an access mode to assign a method to select (access), a cell address of an identification cell to be selected (accessed), and an operation mode to assign an operation to a selected (accessed) cell address. The input fetch code for redundancy mode is partitioned regarding access mode by the external input controller. The access mode may be a plurality of test modes (test mode 1, test mode 2 . . . as an example), the normal test mode, the power saving ID read mode, address space check mode and so forth.

The test mode 1 is the access mode for test to assign both the row decoder A and the row decoder B. In other words, to an arbitrary selected column number, any row numbers aligned along the column axis are able to be accessed (selected) throughout the redundancy block and the regular block, and the corresponding cell addresses can be accessed (selected). Practically, each one of or a plurality of cell addresses is accessed in order. Anyway, one or a plurality of cell addresses may be selected and then an operation is applied to selected cell address(es) according to the operation mode defined by the fetch code for redundancy mode.

Figure 51:
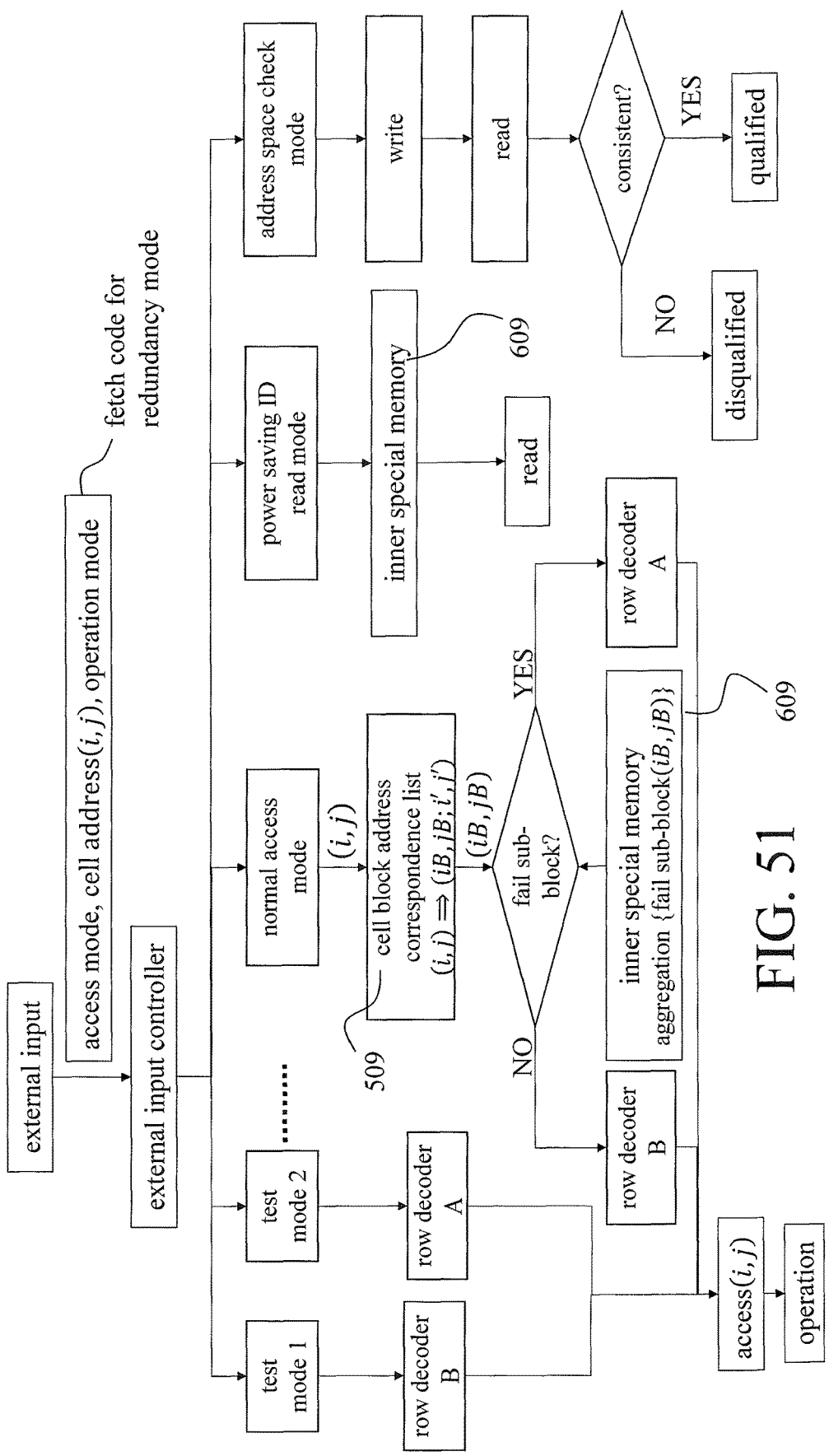
FIG. 51 is a drawing illustrating a classification of access modes to access the cell array related to the present invention.

Or as another example, the test mode 1 is an access mode for testing, which assigns only the decoder B, as shown in FIG. 51. In other words, to an arbitrarily selected column number, any row numbers aligned along the column direction throughout a regular block can be selected, and then a corresponding cell addresses may be accessed (selected). Actually, each one of or a plurality of cell addresses can be accessed in order. Anyway, those cell addresses may be selected and then an operation which is defined by a fetch code for redundant mode is executed at the selected cell address(es). In the case that this test mode 1 is adopted, the following illustrations may be similar.

The test mode 2 is the access mode for test to assign the row decoder A. In other words, to an arbitrary selected column number, any row numbers aligned along the column axis are able to be accessed (selected) throughout the redundancy block, and the corresponding cell addresses can be accessed (selected). Practically, each one of or a plurality of cell addresses are accessed in order. Anyway, one or a plurality of cell addresses may be selected and then an operation is applied to the selected cell address(es) according to the operation mode defined by the fetch code for redundancy mode.

In the normal access mode, to an arbitrary selected column number, at first, any row numbers may be selected throughout the regular block, and the corresponding cell addresses may be accessed (selected). However, it is unnecessary to actually access any identification cell. Next, a block address of sub-block including this selected cell address may be read according to the cell block address correspondence list. In the case that this block address corresponds to a fail sub-block, this block address may be replaced with the block address of the redundant sub-block to be replaced with the fail sub-block. Thus, the replacement to the redundant sub-block is executed. In addition, while the row decoder A is assigned, the column decoder and the row decoder A are controlled such that the inner addresses in the fail sub-block and the inner addresses in the redundant sub-block to be replaced are identical. In the case that this block address does not correspond to any fail sub-block (correspond to a regular sub-block), the row decoder B is assigned with no change of the selected cell address. At last, an operation is executed on the selected cell address according to the operation mode defined by the fetch code for redundancy mode.

Alternatively, as another example, in a normal access mode, at first, a block address of a sub-block including this cell address is assigned according to the cell block address correspondence list. Next, an inner special memory recording the block addresses of fail sub-blocks is accessed to compare the block address with this list. If the block address which has been assigned is not found in the list, a corresponding column number is selected in the block address which has been assigned. Next, the row decoder B is assigned and then a corresponding row number is selected in the block address which has been assigned. Thus, the corresponding inner address can be assigned to access (select) the corresponding cell address. On the other hand, if the block address which has been assigned is found in the list, the block address which has been assigned may be replaced with a block address of a redundant sub-block to replace the fail sub-block. Thus, the replacement to the sub-block is executed. In addition, the row decoder A is assigned, a corresponding inner address in the redundant sub-block to replace the fail sub-block is selected in a similar manner mentioned above. For example, a corresponding row number is selected in the redundant sub-block replacing the fail sub-block. In addition, a corresponding column number is selected in the block address which has been assigned. Thus, the corresponding cell address may be accessed (selected).

In a power saving ID read mode, information recoded in the inner special memory is read with no access to any cell address on the cell array. In the address space check mode, at first, a plurality of cell addresses is arbitrarily selected. The identification cells at those addresses are written and then read. Next, the read data and the written data are respectively compared. If the number of identification cells which are consistent between written and read data is sufficient, the corresponding semiconductor chip passes the inspection. Otherwise, it doesn't pass the inspection.

Subsequently, the method to extract a block address (iB, jB) of a fail sub-block by using the test mode 1, the test mode 2 and the normal access mode is briefly explained as follows.

Figure 50:
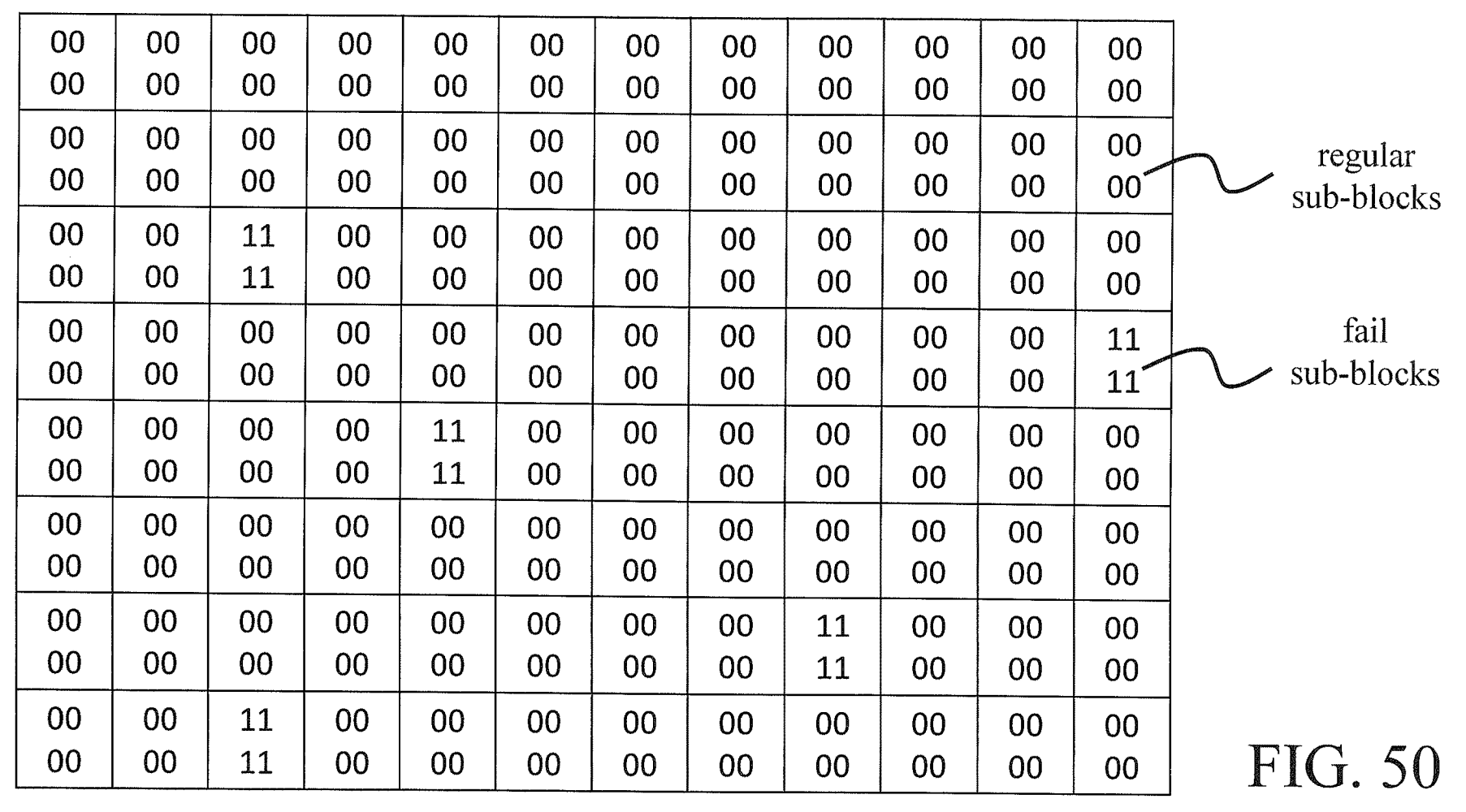

At first, the test mode 1 is assigned and then any cell addresses which are able to be selected is written with 0. Subsequently, the test mode 2 is assigned and then any cell addresses which are able to be selected are written with 1. At last, the normal access mode is assigned and then data of identification cell at cell addresses to be arbitrarily selected are read (0 or 1). Thus, if and only if a fail sub-block is selected, the read data is 1. Otherwise, it is 0. This procedure is repeated while the cell address to be arbitrarily selected is changed, and this results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

The 0 and 1 may be exchanged. The test mode 1 is assigned and then any cell addresses which are able to be selected are written with 1. Subsequently, the test mode 2 is assigned and then any cell addresses which are able to be selected are written with 0. At last, the normal access mode is assigned and then data of identification cell at cell addresses to be arbitrarily selected are read (0 or 1). Thus, if and only if a fail sub-block is selected, the read data is 0. Otherwise, it is 1. This procedure is repeated while cell address to be arbitrarily selected is changed, and this results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawings since it may be self-evident. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

In the above-mentioned method, all of the identification cells are necessary to be accessed on the cell array. This causes the increase of the power consumption. Then, an example for reducing the power consumption is provided as follows. At first, the test mode 1 is assigned and then any cell addresses which are able to be selected are written with 0. Subsequently, the test mode 2 is assigned and then any cell addresses which are able to be selected are written with 1. At last, the normal access mode is assigned. Referring to the cell block address correspondence list 509, data written in at least an identification cell in a block address to be arbitrarily selected are read (0 or 1). Thus, if and only if a fail sub-block is selected, the read data is 1. Otherwise, it is 0. This procedure is repeated while block address to be arbitrarily selected is changed, and this results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of one or a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48. By doing so, the power consumption in the normal access mode is reduced as the number of identification cells included in a sub-block is increased.

The 0 and 1 may be exchanged. At first, the test mode 1 is assigned and then any cell addresses which are able to be selected are written with 1. Subsequently, the test mode 2 is assigned and then any cell addresses which are able to be selected are written with 0. At last, the normal access mode is assigned. Referring to the cell block address correspondence list 509, data written in at least an identification cell in a block address to be arbitrarily selected are read (0 or 1). Thus, if and only if a fail sub-block is selected, the read data is 0. Otherwise, it is 1. This procedure is repeated while block address to be arbitrarily selected is changed, and this results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawings since it may be self-evident. More specifically, this pattern can be represented by an aggregation of block addresses of one or a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

Moreover, an example for further reducing the power consumption is provided as follows. At first, an inner address (i', j') is assigned. Furthermore, the test mode 1 is assigned and then identification cell at the inner address (i', j') at any block addresses which are able to be selected is written with 0. Subsequently, the test mode 2 is assigned and then identification cell at the inner address (i', j') at any block addresses which are able to be selected is written with 1. At last, the normal access mode is assigned. The data written in an identification cell at the inner address (i', j') in a block address to be arbitrarily selected is read (0 or 1). Thus, if and only if a fail sub-block is selected, the read data is 1. Otherwise, it is 0. This procedure is repeated while block address to be arbitrarily selected is changed, and this results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of one or a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48. By doing so, the power consumption in the test mode 1, the test mode 2 and the normal access mode may be further reduced, as the number of identification cells included in a sub-block is increased.

The 0 and 1 may be exchanged. At first, the inner address (i', j') is assigned. Furthermore, the test mode 1 is assigned and then identification cell at the inner address (i', j') at any block addresses which are able to be selected is written with 1. Subsequently, the test mode 2 is assigned and then identification cell at the inner address (i', j') at any block addresses which are able to be selected is written with 0. At last, the normal access mode is assigned. The data written in an identification cell at the inner address (i', j') in a block address to be arbitrarily selected is read (0 or 1). Thus, if and only if a fail sub-block is selected, the read data is 0. Otherwise, it is 1. This procedure is repeated while block address to be arbitrarily selected is changed, and this results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawings since it may be self-evident. More specifically, this pattern can be represented by an aggregation of block addresses of one or plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

In FIG. 50, the number of bits in a sub-block is 4. This is only for an exemplar drawing. The number of bits in a sub-block is not limited to 4 and able to be much larger than 4. It was 1000 in the above example. The power consumption to read a physical random number code of the present invention may be reduced, as this number is large.

The operation method in the normal access mode is illustrated as follows.

If the signal to assign the normal access mode is input to the external input controller, the normal access mode is selected. If the cell address (i, j) is also input to the external input controller, the cell address (i, j) is selected in the normal access mode. Referring to the cell block address correspondence list, the corresponding (iB, jB; j') is selected. Thus, the selected block address (iB, jB) may be checked if it is a fail sub-block or not.

As an example, this judging method is performed by comparing the selected block address (iB, jB) with codes recoded in the inner special memory 609. For example, if the code corresponding to the selected block address (iB, jB) is found in the codes recoded in the inner special memory 609, the corresponding sub-block is a fail sub-block. Otherwise, it is a regular sub-block.

Another example to obtain block address of a fail sub-block (iB, jB) is briefly explained as follows.

At first, the normal mode is assigned to write any cell addresses to be able to be selected 0. Next, the test mode 2 is assigned to write any cell addresses to be able to be selected 1. Subsequently, returning back to the normal access mode, the data of identification cell at arbitrarily selected cell address is read (0 or 1). In this case, the read data is 1 if and only if a fail sub-block is selected. Otherwise, it is 0. This procedure is repeated while changing selected cell addresses. This results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

The 0 and 1 may be exchanged. The normal mode is assigned to write any cell addresses to be able to be selected 1. Next, the test mode 2 is assigned to write any cell addresses to be able to be selected 0. Subsequently, returning back to the normal access mode, the data of identification cell at arbitrarily selected cell address is read (0 or 1). In this case, the read data is 0 if and only if a fail sub-block is selected. Otherwise, it is 1. This procedure is repeated while changing selected cell addresses. This results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawings since it may be self-evident. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

In the above-mentioned method, all of the identification cells are necessary to be accessed on the cell array. This causes the increase of the power consumption. Then, an example for reducing the power consumption is provided as follows. At first, the normal mode is assigned to write any cell addresses to be able to be selected 0. Next, the test mode 2 is assigned to write any cell addresses to be able to be selected 1. Subsequently, returning back to the normal access mode and then referring to the cell block address correspondence list 509, the data of at least an identification cell in arbitrarily selected block address is read (0 or 1). In this case, the read data is 1 if and only if a fail sub-block is selected. Otherwise, it is 0. This procedure is repeated while changing selected block addresses. This results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented by binary number, as shown in FIG. 48. By doing so, the power consumption in the normal access mode is further reduced as the number of identification cells included in a sub-block is increased.

The 0 and 1 may be exchanged. The normal mode is assigned to write any cell addresses to be able to be selected 1. Next, the test mode 2 is assigned to write any cell addresses to be able to be selected 0. Subsequently, returning back to the normal access mode and then referring to the cell block address correspondence list 509, the data of at least an identification cell in arbitrarily selected block address is read (0 or 1). In this case, the read data is 0 if and only if a fail sub-block is selected. Otherwise, it is 1. This procedure is repeated while changing selected block addresses. This results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawings since it may be self-evident. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

Moreover, another example for further reducing the power consumption is provided as follows. At first, an inner address (i', j') is assigned. Furthermore, the normal access mode is assigned and then an identification cell at the inner address (i', j') in any block addresses which are able to be selected is written with 0. Next, the test mode 2 is assigned and then an identification cell at the inner address (i', j') in any block addresses which are able to be selected is written with 1. Subsequently, returning back to the normal access mode, the data of the identification cell at the inner address (i', j') at arbitrarily selected block address is read (0 or 1). In this case, the read data is 1 if and only if a fail sub-block is selected. Otherwise, it is 0. This procedure is repeated while changing selected block addresses. This results in a pattern in which sub-blocks including only 0 (regular sub-blocks) and sub-blocks including only 1 (fail sub-blocks) are randomly distributed on checker-board, as shown in FIG. 50. More specifically, this pattern can be represented by an aggregation of block addresses of plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48. By doing so, the power consumption in the test mode 2 and the normal access mode may be further reduced, as the number of identification cells included in a sub-block is increased.

The 0 and 1 may be exchanged. At first, the inner address (i', j') is assigned. Furthermore, the normal access mode is assigned and then identification cell at the inner address (i', j') in any block addresses which are able to be selected is written with 1. Next, the test mode 2 is assigned and then identification cell at the inner address (i', j') in any block addresses which are able to be selected is written with 0. Subsequently, returning back to the normal access mode, the data of the identification cell at the inner address (i', j') at arbitrarily selected block address is read (0 or 1). In this case, the read data is 0 if and only if a fail sub-block is selected. Otherwise, it is 1. This procedure is repeated while changing selected block addresses. This results in a pattern in which sub-blocks including only 1 (regular sub-blocks) and sub-blocks including only 0 (fail sub-blocks) are randomly distributed on checker-board. By doing so, the pattern in which 0 and 1 are exchanged in FIG. 50 is obtained but not shown in the drawing since it may be self-evident. More specifically, this pattern can be represented by an aggregation of block addresses of a plurality of fail sub-blocks. The pattern formed like this is coded in a designed manner and then recorded in the inner special memory 609. As an example, the aggregation of the block addresses {(iB, jB)} is recorded in the inner special memory 609. This can be represented with binary number, as shown in FIG. 48.

As an example, the inner special memory 609 is a fuse memory.

Thus, it is able to generate physical address having extremely large information entropy. It is noted here that every 1 bit is used to generate physical address in the present embodiment. In other words, the redundant block may have been incorporated into the commercial memory chips. The inner special memory 609 to recode the replacement information may be similar.

The hash values in FIGS. 13 and 16 are the transaction information transferred among logical nodes. If it has a monetary value, it may be a cryptocurrency like bit coin. However, it is merely an example and not limiting. Furthermore, with FIG. 13 or with FIG. 16, any procedures necessary to complete the transmission (N, N+1) can be executed by the logical node (N). Accordingly, it is unnecessary to expose a secret key to the external of identification core 10000. Alternatively, a secret key may be generated in every transaction and then deleted after completing the corresponding transaction. It may be identical to that a secret key is not exposed to the external of identification core. Since a secret key is not exposed to the external of the identification core 1000 indeed, it may be regarded as being confined thereof.

Referring to FIGS. 13 and 16, it detailed illustration is provided as follows. For example, the method to generate the electronic signature (N) with the secret key (N) may be explained first. The logical node (N) hashes the hash value (N−1) which is the content of the logical node (N), the public key (N) and the electronic signature (N−1) altogether, so as to generate the hash value (N). This may be temporarily stored in the logical node (N). Next, the logical node (N) may obtain the public key (N+1) from on the network, i.e., the logical address of the logical node (N+1) that is the destination of the transaction. Subsequently, using the secret key (N) generated in the chip of the identification core 10000 linking to the logical node (N), the key generator in the identification core encrypts the hash value (N) and the public key (N+1) altogether. Thus, the electronic signature (N) is generated. At last, the generated electronic signature (N) is appended to the hash value (N) and then transferred to the logical address (N+1).

The code converter in FIG. 14 is to convert a physical random number code to in a suitable form to be input to the key generator. Although not shown since it may be self-evident, the code converter may be a dummy device if such a conversion is not necessary. Alternatively, the code converter may be removed from FIG. 14. In this case, the identification may directly input a physical random number code to the key generator.

Thus, a unique pair of secret key and public key is generated from a physical random number code which is secured by a semiconductor chip. It may be preferred that the public key is used as a logical address on the network and the secret key is not exposed into the external of the identification core 10000. That is, it may be able for the identification core 10000 of the present invention to functionally link a semiconductor chip which is a physical substance (hardware) to the logical network (software).

In addition, it may be able for hardware to functionally corporate with a public ledger system which is represented by blockchain with the electronic signature technology. As a result, it may produce a network system which is excellent in security and reliability.

There may be a plurality of concrete algorithms which can realize the key generation methods of RSA-type or ElGamal-type. Among them, the DSA method and its revised version, which is ECDSA method, are extensively used for the electronic signature recently. Furthermore, there may be various methods such as: Schnorr method, Random Oracle method, Cramer-Shoup method and so forth. They are common in that it is practically hard to generate a secret key from a public key. (It is not proved in terms of mathematics but regarded as practically impossible to do so.) Moreover, they may also be common in that an electronic signature is to generated by encrypting a hash value and so forth. It differs in that a public key is generated from a secret key or a pair of secret key and public key is generated from another variable. Otherwise, there may be difference related to algebra which is used to convert variables. For example, there may be the factorization in prime numbers, the discrete logarithm problem, the random oracle problem, the elliptic curve problem and so forth.

Furthermore, the identification controller to control the identification device related to the present invention may be a peripheral controlling device to control the column decoder, the row decoder A and the row decoder B, which are shown in FIG. 47. It may also carry a controlling device of a memory chip into which the identification device is incorporated.

Meanwhile, the method to read physical random number code which is secured by an identification chip by using the test mode 1 or test mode 2 may consume a large power since it is necessary to access the whole cell array. According to the condition or circumstances to use a device including an identification chip, it may be necessary to reduce the power consumption as possible. In this case, it may adopt the power saving ID read mode.

INDUSTRIAL APPLICABILITY

The present invention may provide an infrastructure of more secured and useful information technologies at lower cost.

Furthermore, the scope of technology of the present invention may not be limited to the above-mentioned embodiments. Without surpassing the aim or concept of the present invention, various revisions may be added.

What is claimed is:
1. A semiconductor device comprising:
a semiconductor chip including a cell array, with the cell array having a group of row lines and a group of column lines, with the group of row lines and the group of column lines intersect and form cross-points;
wherein the cell array includes a plurality of identification cells distributed at the cross-points;
wherein each row line in the group of row lines is respectively assigned with a row number and each column line in the group of column lines is respectively assigned with a column number;
wherein the cell array is divided into a plurality of sub-blocks, with each of the plurality of sub-blocks respectively includes a portion of the plurality of identification cells;
wherein each of the plurality of identification cells has a cell address defined by a set of the row number and the column number of the cross-point at which the identification cell is located;
wherein each of the plurality of sub-blocks has a block address defined by sets of the row numbers and the column numbers of the cross-points encompassed in the sub-block;
wherein the cell address is related to the block address and an inner address of a sub-block, with the inner address related to the block address;
wherein a portion of the block addresses includes at least one of the cell addresses at which an identification cell exhibiting a predetermined characteristic is located, with the predetermined characteristic based on a physical randomness which is intrinsic of the semiconductor chip;
and wherein the semiconductor chip further has a physical random number code including the portion of the block address, with the physical random number code being secured by the semiconductor chip,
each of the plurality of identification cells respectively comprises a resistor cell having a resistance with a measurable resistivity, a conductor cell having a conductance with a measurable conductivity, a capacitor having a dielectric or a ferroelectric with a measurable permittivity sandwiched between conductive components, and an element selected from a PN junction, a Schottky junction, a transistor, and a nonvolatile memory cell including a charge storage layer,
wherein each of the plurality of identification cells respectively comprises a combination of the transistor and the resistor cell, with the resistor cell comprising magnetic resistor cell.
2. A semiconductor device comprising:
a semiconductor chip including a cell array, with the cell array having a group of row lines and a group of column lines, with the group of row lines and the group of column lines intersect and form cross-points;
wherein the cell array includes a plurality of identification cells distributed at the cross-points;
wherein each row line in the group of row lines is respectively assigned with a row number and each column line in the group of column lines is respectively assigned with a column number;
wherein the cell array is divided into a plurality of sub-blocks, with each of the plurality of sub-blocks respectively includes a portion of the plurality of identification cells;
wherein each of the plurality of identification cells has a cell address defined by a set of the row number and the column number of the cross-point at which the identification cell is located;
wherein each of the plurality of sub-blocks has a block address defined by sets of the row numbers and the column numbers of the cross-points encompassed in the sub-block;
wherein the cell address is related to the block address and an inner address of a sub-block, with the inner address related to the block address;

wherein a portion of the block addresses includes at least one of the cell addresses at which an identification cell exhibiting a predetermined characteristic is located, with the predetermined characteristic based on a physical randomness which is intrinsic of the semiconductor chip;

and wherein the semiconductor chip further has a physical random number code including the portion of the block address, with the physical random number code being secured by the semiconductor chip, each of the plurality of identification cells respectively comprises a resistor cell having a resistance with a measurable resistivity, a conductor cell having a conductance with a measurable conductivity, a capacitor having a dielectric or a ferroelectric with a measurable permittivity sandwiched between conductive components, and an element selected from a PN junction, a Schottky junction, a transistor, and a nonvolatile memory cell including a charge storage layer, wherein each of the plurality of identification cells respectively comprises a combination of the transistor and the capacitor having the ferroelectric with the measurable permittivity sandwiched between the conductive components.

3. A semiconductor device comprising:
a semiconductor chip including a cell array, with the cell array having a group of row lines and a group of column lines, with the group of row lines and the group of column lines intersect and form cross-points;
wherein the cell array includes a plurality of identification cells distributed at the cross-points;
wherein each row line in the group of row lines is respectively assigned with a row number and each column line in the group of column lines is respectively assigned with a column number;
wherein the cell array is divided into a plurality of sub-blocks, with each of the plurality of sub-blocks respectively includes a portion of the plurality of identification cells;
wherein each of the plurality of identification cells has a cell address defined by a set of the row number and the column number of the cross-point at which the identification cell is located;
wherein each of the plurality of sub-blocks has a block address defined by sets of the row numbers and the column numbers of the cross-points encompassed in the sub-block;
wherein the cell address is related to the block address and an inner address of a sub-block, with the inner address related to the block address;
wherein a portion of the block addresses includes at least one of the cell addresses at which an identification cell exhibiting a predetermined characteristic is located, with the predetermined characteristic based on a physical randomness which is intrinsic of the semiconductor chip;
and wherein the semiconductor chip further has a physical random number code including the portion of the block address, with the physical random number code being secured by the semiconductor chip,
wherein a fail bit is assigned to a cell address at which an identification cell exhibiting a characteristic with a deviation more than a predetermined range is located, wherein the sub-block is a fail sub-block if the sub-block includes the cell address assigned with the fail bit, and the sub-block is a regular sub-block if the sub-block does not include the cell address assigned with the fail bit, with the cell array comprising a plurality of fail sub-blocks and a plurality of regular sub-blocks.

4. The semiconductor device as claimed in claim 3, wherein the plurality of identification cells respectively has a first terminal and a second terminal, with one of the first terminal and the second terminal connected to a row line of the group of row lines, and the other one of the first terminal and the second terminal connected to a column line of the group of column lines.

5. The semiconductor device as claimed in claim 3, wherein each of the plurality of identification cells is respectively connected to a first control gate and a second control gate, with one of the first control gate and the second control gate connected to a row line of the group of row lines, and the other one of the first control gate and the second control gate connected to a column line of the group of column lines.

6. The semiconductor device as claimed in claim 3, wherein each of the plurality of identification cells respectively comprises a resistor cell having a resistance with a measurable resistivity, a conductor cell having a conductance with a measurable conductivity, a capacitor having a dielectric or a ferroelectric with a measurable permittivity sandwiched between conductive components, and an element selected from a PN junction, a Schottky junction, a transistor, and a nonvolatile memory cell including a charge storage layer.

7. The semiconductor device as claimed in claim 6, wherein each of the plurality of identification cells respectively comprises a combination of the transistor and the resistor cell, with the resistance of the resistor cell varies with heating.

8. The semiconductor device as claimed in claim 6, wherein each of the plurality of identification cells respectively comprises a combination of the transistor and the resistor cell, with the resistance of the resistor cell varies with an application of voltage.

9. The semiconductor device as claimed in claim 3, wherein a portion of the plurality of sub-blocks belongs to a first block, and the rest of the plurality of the sub-blocks belongs to a second block, with the sub-blocks in the first block and the sub-blocks in the second block being scanned independently, and if any of the plurality of fail sub-blocks is found in the first block, the block address of the found fail sub-block is replaced with the block address of any of the sub-blocks in the second block.

10. The semiconductor device as claimed in claim 9, wherein the sub-blocks in the first block and the sub-blocks in the second block are scanned by scanning the first block with the sub-blocks in the first block selected in a predetermined order, suspending the scanning of the first block if the selected sub-block is a fail sub-block, scanning the second block with the sub-blocks in the second block selected in a predetermined order and if the selected sub-block in the second block is unused for a replacement, the block address of the sub-block selected while scanning the first block is replaced with the block address of the selected sub-block which is unused for the replacement, suspending the scanning of the second block, and return to the scanning of the first block, wherein the scanning of the sub-blocks in the first block and the sub-blocks in the second block stops when all of the sub-blocks in the first block are selected.

11. The semiconductor device as claimed in claim 9, wherein a quantity of the sub-blocks in the first block is greater than or equal to a quantity of the sub-blocks in the second block.

12. The semiconductor device as claimed in claim 9, wherein the plurality of fail sub-blocks and the plurality of regular sub-blocks are physically randomly distributed in the first block, with an aggregation of block addresses of the plurality of fail sub-blocks coded as a physical random number code, with the physical random number code being secured by the semiconductor chip.

13. The semiconductor device as claimed in claim 12, wherein the semiconductor device in encompassed in a logical network comprising a plurality of logical nodes, with each of the plurality of logical nodes respectively links to an identification core, with the identification core comprising the semiconductor chip, with the semiconductor chip outputs the physical random number code and forming a physical node, wherein each of the plurality of logical nodes respectively includes a transmission unit, with the transmission unit administering an information communication among the plurality of logical nodes, wherein the identification core administers identifications of the plurality of physical nodes, wherein the identification core generates a secret key and a public key, which form a unique pair, from the physical random number code, with the public key forwarded to the transmission unit and serving as a logical address which is secured by the logical node, with the secret key serving as a physical address which is secured by the semiconductor chip, with the logical node and the physical node uniquely linked by the public key and the secret key.

14. The semiconductor device as claimed in claim 13, wherein the identification core includes a key generator and an identification device, with the identification device including a code convertor and the semiconductor chip, with the semiconductor chip transferring the physical random number code to the code convertor, with the code convertor converts a format of the physical random number code as necessary, and wherein after being converted, the physical random number code is forwarded to the key generator.

15. The semiconductor device as claimed in claim 14, wherein the key generator generates the unique pair of the public key and the secret key from the physical random number code received from the code convertor.

16. The semiconductor device as claimed in claim 14, wherein the code convertor generates the secret key from the physical random number code received from the semiconductor chip, and the key generator generates the public key, which forms the unique pair with the secret key, from the secret key.

17. The semiconductor device as claimed in claim 9, wherein a correspondence relationship between the cell address and the block address is recorded in a cell block address correspondence list.

18. The semiconductor device as claimed in claim 17, wherein the semiconductor chip further comprises an area for a peripheral circuit, with the area for the peripheral circuit having a peripheral controller, the cell block address correspondence list, and an inner special memory, wherein the first block and the second block are arrayed along a column direction and share a column decoder, with a first row decoder corresponding to the first block and a second row decoder corresponding to the second block, and wherein the peripheral controller controls at least one of the first row decoder and the second row decoder while referring to the cell block address correspondence list.

19. The semiconductor device as claimed in claim 18, wherein the inner special memory records an aggregation of block addresses of the plurality of fail sub-blocks.

20. The semiconductor device as claimed in claim 19, wherein the semiconductor chip receives a fourth access mode from an external of the semiconductor chip, with the fourth access mode reading an aggregation of the block addresses corresponding to the plurality of fail sub-blocks in the inner special memory.

21. The semiconductor device as claimed in claim 18, wherein the semiconductor chip receives a fetch code for a redundancy mode from an external input, with the fetch code for the redundancy mode comprising an access mode, the cell address, and an operation mode, wherein the access mode comprises a first access mode, a second access mode, and a third access mode, with the first access mode accessing any of the plurality of identification cells in the first block and the second block according to an arbitrarily selected column number, or accessing any of the plurality of identification cells in the first block according to an arbitrarily selected column number, with the second access mode accessing any of the plurality of identification cells in the second block according to an arbitrarily selected column number, with the third access mode reading the block address of the sub-block to which the accessed identification cell in the first block with the first mode belongs, according to the cell block address correspondence list, wherein if the block address corresponds to a fail sub-block, the block address is replaced with the block address of any of the sub-blocks in the second block, and then the cell address of the access identification cell in the second block is accessed, and wherein if the block address corresponds to a regular block, the cell address of the accessed identification cell is accessed.

22. The semiconductor device as claimed in claim 21, wherein the first access mode designates at least a first row decoder, and the second access mode designates a second row decoder, with the first row decoder corresponding to the first block and the second row decoder corresponding to the second block.

23. The semiconductor device as claimed in claim 21, wherein the first access mode is assigned and arbitrary cell addresses being able to be selected are written with a first value, the second access mode is assigned and arbitrary cell addresses being able to be selected are written with a second value, the third access mode is assigned and data of the identification cell at the cell address being accessed is read, wherein the first access mode, the second access mode, and the third access mode are repeatedly assigned while changing the cell address being arbitrarily selected, and wherein if the data is written with the second value, an aggregation of the block addresses respectively corresponding to the selected cell addresses of the accessed identification cell is coded as a physical random number code.

24. The semiconductor device as claimed in claim 21, wherein the first access mode is assigned and the cell address of the identification cell being accessed is written with a first value, the second access mode is assigned and the cell address of the identification cell being accessed is written with a second value, the third access mode is assigned and, referring to the cell block address correspondence list, data of the identification cell at at least one cell address at an arbitrarily block address is read, wherein the first access mode, the second access mode, and the third access mode are repeatedly assigned while changing the block address being arbitrarily selected, and wherein if the data is written with the second value, an aggregation of the selected block addresses is coded as a physical random number code.

25. The semiconductor device as claimed in claim 21, wherein the inner address is designated, and the inner address designates a cell address in an arbitrarily selected sub-block, wherein the first access mode is assigned and arbitrary cell addresses being able to be selected are written with a first value, the second access mode is assigned and arbitrary cell addresses being able to be selected are written with a second value, the third access mode is assigned and the data of the identification cell at the inner address in the block address of the arbitrarily selected sub-block is read, wherein the first access mode, the second access mode, and the third access mode are repeatedly assigned while changing the block address being arbitrarily selected, and wherein if the data is written with the second value, an aggregation of the selected block addresses is coded as a physical random number code.

26. The semiconductor device as claimed in claim 21, wherein the third access mode is assigned and arbitrary cell addresses being able to be selected are written with a first value, the second access mode is assigned and arbitrary cell addresses being able to be selected are written with a second value, the third access mode is assigned and the data of the identification cell at the cell address being accessed is read, wherein the second access mode and the third access mode are repeatedly assigned while changing the cell address being arbitrarily selected, and wherein if the data is written with the second value, an aggregation of the block addresses respectively corresponding to the selected cell addresses is coded as a physical random number code.

27. The semiconductor device as claimed in claim 21, wherein the third access mode is assigned and arbitrary cell addresses being able to be selected are written with a first value, the second access mode is assigned and arbitrary cell addresses being able to be selected are written with a second value, the third access mode is assigned and, referring to the cell block address correspondence list, data of the identification cell at at least one cell address at an arbitrarily block address is read, wherein the second access mode and the third access mode are repeatedly assigned while changing the block address being arbitrarily selected, and wherein if the data is written with the second value, an aggregation of the selected block addresses is coded as a physical random number code.

28. The semiconductor device as claimed in claim 21, wherein the inner address is designated, and the inner address designates a cell address in an arbitrarily selected sub-block, wherein the third access mode is assigned and arbitrary cell addresses being able to be selected are written with a first value, the second access mode is assigned and arbitrary cell addresses being able to be selected are written with a second value, the third access mode is assigned and the data of the identification cell at the inner address in the block address of the arbitrarily selected sub-block is read, wherein the second access mode and the third access mode are repeatedly assigned while changing the block address being arbitrarily selected, and wherein if the data is written with the second value, an aggregation of the selected cell addresses is coded as a physical random number code.

29. The semiconductor device as claimed in claim 9, wherein the sub-blocks in the first block and the sub-blocks in the second block are scanned by scanning the first block with the sub-blocks in the first block selected in a predetermined order, recording the block address at which a fail sub-block is found in the first block upon finding, with a test equipment or an inner register included in the semiconductor chip, and continuing the scanning throughout the first block, scanning the second block with the sub-blocks in the second block selected in a predetermined order, recording the block address of the selected block in the second block, which is used to replace the fail sub-block in the first block upon finding of the fail sub-block, with the test equipment of the inner register of the semiconductor chip, and continuing the scanning throughout the second block, and recording an information of the fail sub-block in an inner special memory included in the semiconductor chip, based on the block address of the fail sub-block recorded in the test equipment or the inner register of the semiconductor chip.

30. The semiconductor device as claimed in claim 3, wherein the cell array is projected to a block array which is formed with a group of block row lines, with each neighboring two of the block row lines separated in an interval, and a group of block column lines, with each neighboring two of the block column lines separated in an interval, with the group of block row lines and the group of block column lines intersect and form cross-points, wherein the plurality of sub-blocks are distributed at the cross-points, wherein each block row line in the group of block row lines is respectively assigned with a block row number, and each block column line in the group of block column lines is respectively assigned with a block column number, wherein block addresses of the plurality of sub-blocks on the block array are respectively defined by sets of the block row numbers and the block column numbers of the respective one of the plurality of sub-blocks.

31. The semiconductor device as claimed in claim 30, wherein a product of a quantity of the row lines in the interval of two neighboring block row lines and a quantity of the column lines in the interval between two neighboring block column lines is identical to a quantity of the identification cells included in the sub-block.

32. The semiconductor device as claimed in claim 30, wherein the plurality of fail sub-blocks and the plurality of regular sub-blocks are physically randomly distributed on the block array, and a physical random number code which is secured by the semiconductor chip is an aggregation of the block addresses of the plurality of fail sub-blocks.

33. The semiconductor device as claimed in claim 3, wherein the semiconductor chip receives a fetch code for a redundant mode from an external input, with the fetch code for the redundancy mode comprising an access mode, the cell address, and an operation mode, wherein the access mode comprises a fifth access mode, with the fifth access mode arbitrarily selecting sets of cell addresses from the cell array, with the identification cells at the selected cell addresses being written and subsequently read to check if a read data and a written data are identical, and wherein if a sufficient amount of identification cells have identical data, the semiconductor chip including the cell array is regarded as qualified, otherwise, the semiconductor chip is regarded as disqualified.

34. The semiconductor device as claimed in claim 3, wherein the row lines in the group of row lines are bit lines, and the column lines in the group of columns are word lines.

35. The semiconductor device as claimed in claim 3, wherein the row lines in the group of row lines are word lines, and the column lines in the group of columns are bit lines.

* * * * *